(12) United States Patent
Kamon et al.

(10) Patent No.: US 8,427,575 B2
(45) Date of Patent: *Apr. 23, 2013

(54) IMAGE SENSING APPARATUS WITH EXPOSURE CONTROLLER

(75) Inventors: Koichi Kamon, Osaka (JP); Kazuchika Sato, Kobe (JP); Jun Minakuti, Osaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/523,403

(22) Filed: Jun. 14, 2012

(65) Prior Publication Data

US 2012/0268632 A1 Oct. 25, 2012

Related U.S. Application Data

(62) Division of application No. 11/138,247, filed on May 26, 2005, now Pat. No. 8,233,059.

(30) Foreign Application Priority Data

May 31, 2004 (JP) ................................ 2004-160800
Mar. 17, 2005 (JP) ................................ 2005-77563

(51) Int. Cl.
*H04N 5/225* (2006.01)
*H04N 9/04* (2006.01)

(52) U.S. Cl.
USPC .......................................... 348/372; 348/281

(58) Field of Classification Search ............... 348/221.1, 348/229.1, 296, 362–366
See application file for complete search history.

(56) References Cited

U.S. PATENT DOCUMENTS 3,724,349 A 4/1973 Von Belvard et al.
5,861,621 A 1/1999 Takebe et al.
(Continued)

FOREIGN PATENT DOCUMENTS

JP 7110505 4/1995
JP 7298132 A 11/1995
(Continued)

OTHER PUBLICATIONS

Japanese Office Action drafted Jan. 14, 2010 in related Patent Application No. 2005-077563 with translation.

(Continued)

*Primary Examiner* — Roberto Velez
*Assistant Examiner* — Joel Fosselman
(74) *Attorney, Agent, or Firm* — Brinks Hofer Gilson & Lione

(57) ABSTRACT

An image sensing apparatus includes: an image sensor which generates an electrical signal commensurate with an amount of incident light, and has a photoelectric conversion characteristic comprised of a linear characteristic area where the electrical signal is outputted after being linearly converted in relation to the amount of incident light, and a logarithmic characteristic area where the electrical signal is outputted after being logarithmically converted in relation to the amount of incident light; an exposure evaluation value detector which detects an exposure evaluation value based on luminance information acquired from a subject in sensing an image of the subject; and an exposure controller which acquires a setting value for exposure based on the exposure evaluation value detected by the exposure evaluation value detector to control exposure of the image sensing apparatus, wherein the exposure controller determines a subject luminance for exposure setting based on the exposure evaluation value, and controls the exposure in such a manner that an output of the image sensor corresponding to the subject luminance for exposure setting is obtained from the linear characteristic area of the image sensor.

12 Claims, 28 Drawing Sheets

U.S. PATENT DOCUMENTS

| | | | |
|---|---|---|---|
| 6,160,532 A | 12/2000 | Kaburagi et al. | |
| 6,191,408 B1 * | 2/2001 | Shinotsuka et al. | ....... 250/208.1 |
| 6,323,479 B1 | 11/2001 | Hynecek et al. | |
| 6,573,927 B2 | 6/2003 | Parulski et al. | |
| 6,836,288 B1 | 12/2004 | Lewis | |
| 6,853,806 B2 | 2/2005 | Nakata et al. | |
| 7,190,402 B2 | 3/2007 | Ban et al. | |
| 7,256,378 B2 | 8/2007 | Furukawa et al. | |
| 7,545,412 B2 | 6/2009 | Minakuti et al. | |
| 7,714,928 B2 | 5/2010 | Kamon et al. | |
| 7,956,903 B2 | 6/2011 | Takayama | |
| 8,213,063 B2 | 7/2012 | Kamon et al. | |
| 2002/0021121 A1 | 2/2002 | Nakamura | |
| 2002/0036697 A1 | 3/2002 | Mori et al. | |
| 2002/0054389 A1 | 5/2002 | Takada et al. | |
| 2003/0016214 A1 | 1/2003 | Sukeno et al. | |
| 2004/0046101 A1 | 3/2004 | Nakamura et al. | |
| 2004/0101296 A1 | 5/2004 | Nakata et al. | |
| 2005/0052547 A1 | 3/2005 | Minakuti et al. | |
| 2005/0052557 A1 * | 3/2005 | Kusaka et al. | ................ 348/308 |
| 2005/0264683 A1 | 12/2005 | Kamon et al. | |
| 2005/0264684 A1 | 12/2005 | Kamon et al. | |
| 2005/0280868 A1 | 12/2005 | Kamon et al. | |
| 2006/0001748 A1 | 1/2006 | Kamon et al. | |
| 2006/0044436 A1 | 3/2006 | Watanabe | |

FOREIGN PATENT DOCUMENTS

| | | | |
|---|---|---|---|
| JP | 2000059678 | | 2/2000 |
| JP | 2001008111 | | 1/2001 |
| JP | 2001028712 | | 1/2001 |
| JP | 2001054014 | A | 2/2001 |
| JP | 2001197370 | | 7/2001 |
| JP | 2002-077733 | | 3/2002 |
| JP | 2002084455 | | 3/2002 |
| JP | 2002223392 | | 8/2002 |
| JP | 2002-300476 | | 10/2002 |
| JP | 2003324656 | | 11/2003 |
| JP | 2004088312 | A | 3/2004 |
| JP | 2004145022 | A | 5/2004 |
| JP | 2010263647 | | 11/2010 |
| JP | 4661285 | | 3/2011 |

OTHER PUBLICATIONS

Japanese Office Action issued Apr. 3, 2012 for Patent Application No. JP2010-132750 with translation.

Non-final Office Action dated Sep. 3, 2008, issued in related U.S. Appl. No. 11/142,037.

Final Office Action dated May 7, 2009, issued in related U.S. Appl. No. 11/142,037.

Non-final Office Action dated Nov. 9, 2009, issued in related U.S. Appl. No. 11/142,037.

Final Office Action dated May 10, 2010, issued in related U.S. Appl. No. 11/142,037.

Non-final Office Action dated Dec. 7, 2010, issued in related U.S. Appl. No. 11/142,037.

Final Office Action dated Jun. 23, 2011, issued in related U.S. Appl. No. 11/142,037.

Notice of Allowance dated Mar. 30, 2012, issued in related U.S. Appl. No. 11/142,037.

Non-final Office Action dated Apr. 30, 2008, issued in related U.S. Appl. No. 11/138,247.

Final Office Action dated Dec. 3, 2008, issued in related U.S. Appl. No. 11/138,247.

Non-final Office Action dated Jul. 21, 2009, issued in related U.S. Appl. No. 11/138,247.

Final Office Action dated Feb. 16, 2010, issued in related U.S. Appl. No. 11/138,247.

Non-final Office Action dated Nov. 4, 2010, issued in related U.S. Appl. No. 11/138,247.

Final Office Action dated May 3, 2011, issued in related U.S. Appl. No. 11/138,247.

Notice of Allowance dated Apr. 5, 2012, issued in related U.S. Appl. No. 11/138,247.

* cited by examiner

FIG.3

COLOR FILTER FORMAT

| R00 | Gr10 | R20 | Gr30 |
|-----|------|-----|------|
| Gb01 | B11 | Gb21 | B31 |
| R02 | Gr12 | R22 | Gr32 |
| Gb03 | B13 | Gb23 | B33 |

G:GREEN PIXEL
R:RED PIXEL
B:BLULE PIXEL
※NUMERAL SHOWS PIXEL ADDRESS NUMBER

FIG.6

| | CONTROL FACTOR | EXAMPLES OF CONTROLLING MEANS |
|---|---|---|
| EXPOSURE CONTROL = AE CONTROL | PHOTOELECTRIC CONVERSION CHARACTERISTICS OF IMAGE SENSOR (DYNAMIC RANGE) | ○ CONTROL OF SWITCHING POINT (INFLECTION POINT) OF LINEAR CHARACTERISTIC AREA AND LOGARITHMIC CHARACTERISTIC AREA |
| | EXPOSURE AMOUNT (TOTAL AMOUNT OF LIGHT THAT REACHES IMAGE SENSING PLANE WHILE PHOTOELECTRIC CONVERSION FUNCTION IS EFFECTIVE) | ○ CONTROL OF APERTURE VALUE<br>○ CONTROL OF INTEGRATION TIME SUCH AS SHUTTER SPEED |

FIG.15

| 1 | 2 | 3 | 4 | 5 | |
|---|---|---|---|---|---|
| 6 | A | B | C | D | E | F | 7 |
| | G | H | I | J | K | L | |
| 8 | M | N | O | P | Q | R | 9 |
| | S | T | U | V | W | X | |
| 10 | Y | Z | AA | AB | AC | AD | 11 |
| | AE | AF | AG | AH | AI | AJ | |
| 12 | 13 | 14 | 15 | 16 | |

330
331
332
333

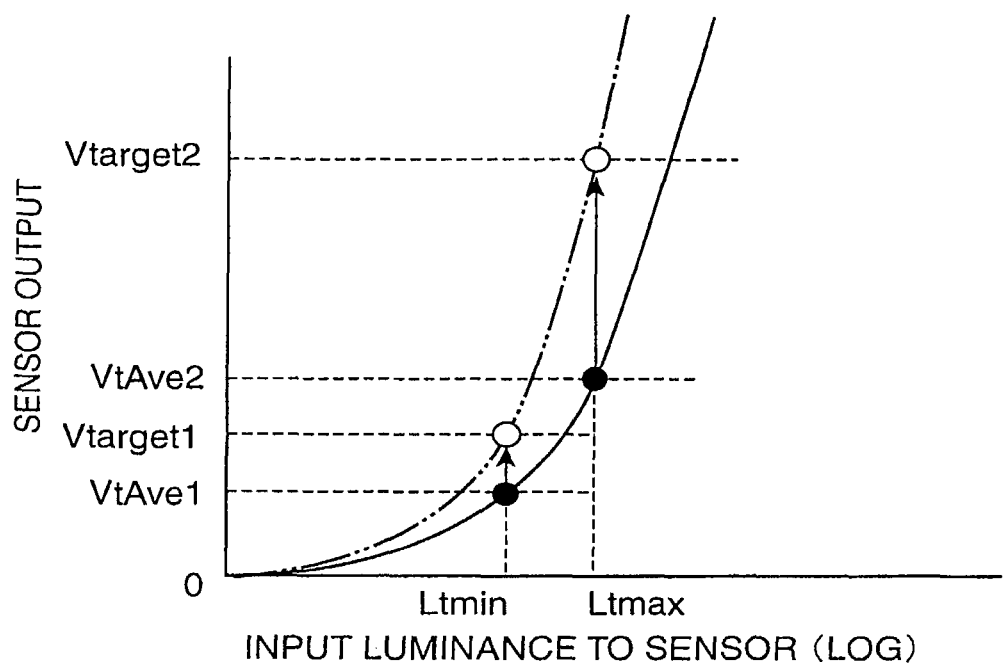

DURING VERTICAL BLANK PERIOD (DRIVE ALL PIXELS SIMULTANEOUSLY)

DURING HORIZONTAL BLANK PERIOD (CONTROL ROW BY ROW)

IMAGE SENSING APPARATUS WITH EXPOSURE CONTROLLER

This application is a divisional application of and claims the benefit of priority from application Ser. No. 11/138,247 filed May 26, 2005, entitled "Image Sensing Apparatus," and currently pending, which is based on Japanese Patent Application No. 2004-160800 filed on May 31, 2004, and No. 2005-77563 filed on Mar. 17, 2005, the contents of which are hereby incorporated by reference.

BACKGROUND OF THE INVENTION

1. Field of the Invention

The present invention relates to an image sensing apparatus provided with an image sensor for generating an electrical signal commensurate with the amount of incident light, and particularly relates to an image sensing apparatus using an image sensor which has a photoelectric conversion characteristic comprised of a linear characteristic area where the electrical signal is outputted after being linearly converted in relation to the amount of incident light, and a logarithmic characteristic area where the electrical signal is outputted after being logarithmically converted in relation to the amount of incident light, namely, an image sensor that is switchable between a linear operative state and a log operative state.

2. Description of the Related Art

Heretofore, there has been known an image sensor (also called as "log sensor") constructed such that a logarithm conversion circuit provided with a MOSFET or a like device is added to a solid-state image sensing device comprised of photoelectric conversion elements such as photodiodes arrayed in a matrix, wherein an output characteristic of the solid-state image sensing device are converted in such a manner that an electrical signal is logarithmically converted according to the amount of incident light by utilizing a sub-threshold characteristic of the MOSFET. Among such image sensors, there is known an image sensor that is switchable between a linear operative state in which an electrical signal is outputted after being linearly converted according to the amount of incident light, and the aforementioned log operative state, according to the output characteristic inherent to the solid-state image sensing device, namely, according to the amount of incident light.

For instance, Japanese Unexamined Patent Publication No. 2002-77733 discloses an image sensing apparatus constructed such that the apparatus is automatically switchable from a linear operative state to a log operative state by applying a specific reset voltage to a MOSFET, and that the switching point of the linear operative state and the log operative state is substantially identical to each other in all the pixels. Further, Japanese Unexamined Patent Publication No. 2002-300476 discloses an image sensing apparatus constructed such that the apparatus is automatically switchable from a linear operative state to a log operative state, and that the potential state of a MOSFET is controllable by controlling the reset time of the MOSFET.

The aforementioned image sensor has a merit that, in the linear operative state thereof, a high contrast image signal is obtainable from a low luminance subject image because the output proportional to the amount of electric charge generated in the photoelectric conversion elements is obtained. However, the image sensor has a demerit that the dynamic range is narrow. On the other hand, in the log operative state of the image sensor, although a wide dynamic range is secured because the output that has been natural-logarithmically converted according to the amount of incident light is obtained, contrast becomes poor because the image signal is logarithmically compressed.

The image sensing apparatuses recited in the above publications merely disclose that the image sensor is automatically switchable from the linear operative state to the log operative state. In light of the merits and demerits of the linear operative state and the log operative state, it is desirable to provide an image sensing apparatus which not only enables to perform automatic switching but also enables to perform a sensing operation by positively utilizing the merits of the linear operative state and the log operative state. For instance, in automatic exposure control, controlling the exposure in association with the subject luminance, and with the switching point from the linear operative state to the log operative state enables to perform optimal automatic exposure control, utilizing the merits of the linear operative state and the log operative state.

SUMMARY OF THE INVENTION

In view of the problems residing in the prior art, it is an object of the present invention to provide an image sensing apparatus that enables to capture a subject in an optimal exposure state, with a certain dynamic range being secured, commensurate with the amount of light from the subject, namely, according to a subject luminance by correlating exposure control of the image sensing apparatus with a photoelectric conversion characteristic of an image sensor in the image sensing apparatus.

One aspect of the invention is directed to an image sensing apparatus comprising: an image sensor which generates an electrical signal commensurate with an amount of incident light, and has a photoelectric conversion characteristic comprised of a linear characteristic area where the electrical signal is outputted after being linearly converted in relation to the amount of incident light, and a logarithmic characteristic area where the electrical signal is outputted after being logarithmically converted in relation to the amount of incident light; an exposure evaluation value detector which detects an exposure evaluation value based on luminance information acquired from a subject in sensing an image of the subject; and an exposure controller which acquires a setting value for exposure based on the exposure evaluation value detected by the exposure evaluation value detector to control exposure of the image sensing apparatus, wherein the exposure controller determines a subject luminance for exposure setting based on the exposure evaluation value, and controls the exposure in such a manner that an output of the image sensor corresponding to the subject luminance for exposure setting is obtained from the linear characteristic area of the image sensor.

These and other objects, features and advantages of the present invention will become more apparent upon reading of the following detailed description along with the accompanying drawings.

BRIEF DESCRIPTION OF THE DRAWINGS

FIGS. 1A through 1C are illustrations showing an external appearance of a digital camera to which an image sensing apparatus as a first embodiment of the invention is applied, wherein FIG. 1A is a top plan view, FIG. 1B is a front view, and FIG. 1C is a rear view.

FIG. 3 is an illustration showing an example of a color filter format of an image sensor used in the digital camera.

FIG. 6 is a chart for explaining definitions of terms relating to exposure control.

FIG. 15 is a diagram showing how an image sensing area to be metered is divided into blocks according to multi-pattern metering by the image sensor.

FIGS. 16A and 16B are graphs showing examples of luminance histograms by the multi-pattern metering, wherein FIG. 16A is a main subject entire luminance histogram, and FIG. 16B is a peripheral subject entire luminance histogram.

FIGS. 18A and 18B are graphs showing how the photoelectric conversion characteristic of the image sensor is changed in performing AE control by exposure amount control, wherein FIG. 18A shows a case that the exposure amount is controlled to sense the subject image in a linear characteristic area if the subject luminance for exposure setting based on AE evaluation values is located in a logarithmic characteristic area, and FIG. 18B shows a case that the exposure amount is controlled to sense the subject image in a relatively high output level area of a linear characteristic area if the subject luminance for exposure setting based on AE evaluation values is located in a relatively low output level area of the linear characteristic area.

FIG. 22 is a graph for explaining a process in calculating the exposure amount control parameter.

FIGS. 23A and 23B are graphs each for explaining a process for calculating the position of an inflection point of a photoelectric conversion characteristic in calculating a dynamic range control parameter, wherein FIG. 23A shows a case that the photoelectric conversion characteristic is changed to achieve a predetermined sensor output corresponding to the luminance Lt1, and FIG. 23B shows a case that the photoelectric conversion characteristic is modeled.

FIGS. 26A and 26B are examples of timing charts concerning an image sensing operation of each pixel constituting the image sensor shown in FIG. 25, wherein FIG. 26A is a timing chart concerning a charge accumulating operation or an exposing operation in a vertical blank period of all the pixels, and FIG. 26B is a timing chart concerning electric charge sweeping operation of pixels in each row by vertical scanning in a horizontal blank period after termination of the charge accumulation.

DETAILED DESCRIPTION OF THE PREFERRED EMBODIMENTS

Brief Description on Embodiments

Figure 1A:
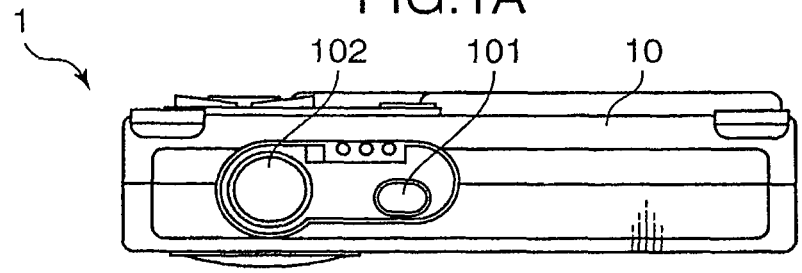

First, preferred embodiments of the invention are described briefly.

(1) An image sensing apparatus according to an aspect of the invention is directed to an image sensing apparatus comprising: an image sensor which generates an electrical signal commensurate with an amount of incident light, and has a photoelectric conversion characteristic comprised of a linear characteristic area where the electrical signal is outputted after being linearly converted in relation to the amount of incident light, and a logarithmic characteristic area where the electrical signal is outputted after being logarithmically converted in relation to the amount of incident light; an exposure evaluation value detector which detects an exposure evaluation value based on luminance information acquired from a subject in sensing an image of the subject; and an exposure controller which acquires a setting value for exposure based on the exposure evaluation value detected by the exposure evaluation value detector to control exposure of the image sensing apparatus, wherein the exposure controller determines a subject luminance for exposure setting based on the exposure evaluation value, and controls the exposure in such a manner that an output of the image sensor corresponding to the subject luminance for exposure setting is obtained from the linear characteristic area of the image sensor.

In the arrangement (1), the exposure controller controls the exposure in such a manner that the subject luminance for exposure setting, namely, the output of the image sensor corresponding to the target subject luminance is obtained from the linear characteristic area of the image sensor. Sensing a subject image under the above exposure control enables to acquire a high contrast image signal by utilizing the feature of the linear characteristic area, namely, a feature of a linear conversion operation. Further, it is possible to obtain a wide dynamic range image signal, namely, a log-compressed image signal from a portion of a subject luminance which has not been used for exposure setting, namely, an area having a substantially higher luminance than the target area, by utilizing the feature of the logarithmic characteristic area, namely, a feature of a log conversion operation.

Here, the definition of the term "exposure control (hereinafter, also called as "AE control") is described referring to FIG. 6. In image sensing apparatuses such as digital cameras and digital movie cameras, unlike so-called silver halide cameras, there are two factors in AE control: one is a control in association with a photoelectric conversion characteristic of an image sensor, namely, a control by intentionally changing the photoelectric conversion characteristic; and the other is a control on the total amount of light that reaches the image sensing plane of the image sensor, and the integration time of photocurrent after photoelectric conversion. Throughout the specification and the claims, the former is called as "dynamic range control", and the latter is called as "exposure amount control". The dynamic range control is executed, for instance, by controlling the switching point (hereinafter, called as "inflection point") of the linear characteristic area and the logarithmic characteristic area of the image sensor. Further, the exposure amount control is executed by controlling the aperture amount of a diaphragm, controlling the shutter speed of a mechanical shutter, or controlling the integration time of electric charge by control of resetting operation to the image sensor.

According to the arrangement (1), a target image signal representing the subject is constantly acquired from the linear characteristic area of the image sensor, and also, a predetermined dynamic range is secured by utilizing the feature of the logarithmic characteristic area. For instance, even if the overall subject luminance is relatively low, a high contrast image signal is obtained by utilizing the feature of the linear characteristic area, and also, a dynamic range of a high luminance area is secured from the logarithmic characteristic area. With this arrangement, an optimal sensing output and video output commensurate with the amount of light from the subject are obtained from the image sensor.

(2) In the arrangement (1), preferably, the exposure evaluation value is detected, by the exposure evaluation value detector, each from a main subject image area, and a peripheral subject image area of an image sensing area of the image sensor, the image sensing area being comprised at least of the main subject image area, and the peripheral subject image area located in a periphery of the main subject image area, and the subject luminance for exposure setting is selected from the exposure evaluation value detected in the main subject image area.

In the embodiments of the invention, there is no constraint on a process for acquiring the exposure evaluation value (hereinafter, also called as "AE evaluation value"). It is possible to meter the subject luminance with use of a metering device or an equivalent element equipped in an image sensing device, or to detect an exposure evaluation value based on an image signal derived from an image actually captured by the image sensor in light of simplifying the mechanism of the image sensing apparatus. In any case, a high contrast image signal utilizing the feature of the linear characteristic area is obtained concerning the main subject by dividing the image sensing area into the main subject image area and the peripheral subject image area, and by selecting the subject luminance for exposure setting based on the exposure evaluation value detected in the main subject image area.

According to the arrangement (2), a high contrast image signal utilizing the feature of the linear characteristic area is obtained regarding a main subject such as an individual whose image is captured. This arrangement enables to obtain a high-quality image with high gradation performance from the image sensor.

(3) In the arrangement (1) or (2), preferably, the exposure controller includes a photoelectric conversion characteristic information storage which stores the photoelectric conversion characteristic of the image sensor acquired at the time of detecting the exposure evaluation value by the exposure evaluation value detector.

In the arrangement (3), the photoelectric conversion characteristic information storage stores the photoelectric conversion characteristic or dynamic range information of the image sensor acquired at the time of detecting the exposure evaluation value. With this arrangement, a more accurate control parameter, as compared with the conventional arrangement, can be obtained by referring to the dynamic range information in calculating the AE control parameter based on the detected AE evaluation value.

According to the arrangement (3), since the AE control parameter can be calculated by referring to the dynamic range information of the image sensor acquired at the time of detecting the AE evaluation value, and a more accurate control parameter can be obtained, optimal AE control can be securely executed.

(4) In any of the arrangements (1) through (3), preferably, the exposure controller includes an exposure amount controller which controls an exposure amount to the image sensor, and the exposure amount controller performs exposure amount control in such a manner that the output of the image sensor corresponding to the subject luminance for exposure setting is obtained from the linear characteristic area of the image sensor.

In the arrangement (4), the output of the image sensor corresponding to the target subject luminance is obtained from the linear characteristic area of the image sensor by control of the aperture value or control of the integration time. For instance, if the detected AE evaluation value indicates that the subject is relatively bright, the exposure amount controller performs exposure amount control such as reducing of the aperture area or shortening of the integration time to obtain the output of the image sensor corresponding to the subject luminance from the linear characteristic area, so that the sensor output of the image sensor corresponding to the subject luminance is not outputted from the logarithmic characteristic area.

According to the arrangement (4), the AE control is executed in such a manner that the output of the image sensor corresponding to the target subject luminance is obtained from the linear characteristic area of the image sensor by control of the aperture value or control of the integration time. This arrangement enables to achieve the AE control according to the embodiments of the invention by optimally controlling the aperture value, the shutter speed, or the integration time of the image sensor, without involving complexity in mechanical arrangement or control program of the image sensor.

(5) In the arrangement (4), preferably, the exposure amount controller includes a photoelectric conversion characteristic information storage which stores the photoelectric conversion characteristic of the image sensor acquired at the time of detecting the exposure evaluation value detected by the exposure evaluation value detector, and an exposure amount control parameter calculator which calculates a control parameter for optimizing the exposure amount, and the exposure amount control parameter calculator calculates an exposure amount control parameter based on the exposure evaluation value detected by the exposure evaluation value detector, and the photoelectric conversion characteristic stored in the photoelectric conversion characteristic information storage.

In the arrangement (5), the photoelectric conversion characteristic information storage stores the dynamic range information of the image sensor acquired at the time of detecting the exposure evaluation value. With this arrangement, a more accurate exposure amount control parameter, as compared with the conventional arrangement, can be obtained by referring to the dynamic range information in calculating the exposure amount control parameter based on the detected AE evaluation value.

According to the arrangement (5), a more accurate exposure amount control parameter can be obtained by referring to the dynamic range information stored in the photoelectric conversion characteristic storage in calculating the exposure amount control parameter. This arrangement enables to securely perform AE control based on the optimal exposure amount control.

(6) In the arrangement (4) or (5), preferably, the exposure amount control is performed in such a manner that the output of the image sensor corresponding to the subject luminance for exposure setting is outputted from a relatively high output level area in the linear characteristic area.

In the arrangement (6), for instance, if the detected AE evaluation value indicates that the subject is relatively dark, the exposure amount control is performed in such a manner that the output of the image sensor corresponding to the subject luminance is obtained from a relatively high output level area of the linear characteristic area. This arrangement enables to obtain a high contrast image even from a low luminance subject image.

According to the arrangement (6), a high contrast image is obtained even from a low luminance subject image by fully utilizing the linear characteristic area, which makes it possible to obtain a high-quality image.

(7) In any of the arrangements (1) through (3), preferably, the exposure controller includes a dynamic range controller which controls the photoelectric conversion characteristic of the image sensor; and the dynamic range controller controls the photoelectric conversion characteristic of the image sensor in such a manner that the output of the image sensor corresponding to the subject luminance for exposure setting is obtained from the linear characteristic area of the image sensor.

In the arrangement (7), the output of the image sensor corresponding to the target subject luminance can be obtained from the linear characteristic area of the image sensor by controlling the inflection point of the linear characteristic area and the logarithmic characteristic area. For instance, if the detected AE evaluation value indicates that the subject is relatively bright, the dynamic range controller performs photoelectric conversion characteristic control such as setting of the inflection point to the position corresponding to a relatively high output level of the image sensor to obtain the output of the image sensor corresponding to the subject luminance from the linear characteristic area, so that the sensor output of the image sensor corresponding to the subject luminance is not outputted from the logarithmic characteristic area.

According to the arrangement (7), the AE control is executed in such a manner that the output of the image sensor corresponding to the target subject luminance is obtained from the linear characteristic area of the image sensor by controlling the photoelectric conversion characteristic of the image sensor. This arrangement enables to achieve the AE control according to the embodiments of the invention by changing the operation state of the image sensor by a bias voltage or the like, without involving complexity in mechanical arrangement or control program of the image sensing apparatus.

(8) In the arrangement (7), preferably, the dynamic range controller includes a photoelectric conversion characteristic information storage which stores the photoelectric conversion characteristic of the image sensor acquired at the time of detecting the exposure evaluation value by the exposure evaluation value detector, and a dynamic range control parameter calculator which calculates a control parameter for optimizing the photoelectric conversion characteristic of the image sensor according to the subject luminance, and the dynamic range control parameter calculator calculates a dynamic range control parameter based on the exposure evaluation value detected by the exposure evaluation value detector, and the photoelectric conversion characteristic stored in the photoelectric conversion characteristic information storage.

In the arrangement (8), the photoelectric conversion characteristic information storage stores the dynamic range information of the image sensor acquired at the time of detecting the exposure evaluation value. Accordingly, a more accurate dynamic range control parameter, as compared with the conventional arrangement, can be obtained by referring to the dynamic range information in calculating the dynamic range control parameter based on the detected AE evaluation value.

According to the arrangement (8), a more accurate dynamic range control parameter can be obtained by referring to the dynamic range information stored in the photoelectric conversion characteristic information storage in calculating the exposure amount control parameter. This arrangement enables to securely perform AE control based on the optimal dynamic range.

(9) In the arrangement (4), preferably, the image sensor is configured in such a manner as to execute photoelectric conversion in the logarithmic characteristic area independently of an exposure time, the image sensing apparatus further comprises a diaphragm, the exposure amount controller includes an aperture controller which controls the exposure amount based on an aperture setting value relating to control of an aperture area of the diaphragm, and/or an exposure time controller which controls the exposure amount based on an exposure time setting value relating to control of the exposure time to the image sensor, and the exposure amount controller performs control of the exposure amount by the aperture controller and/or by the exposure time controller in such a manner that the output of the image sensor corresponding to the subject luminance for exposure setting is obtained from the linear characteristic area of the image sensor, and the aperture controller and the exposure time controller are configured to control the exposure amount independently of each other.

In the arrangement (9), the aperture control and the exposure time control are independently operative for exposure amount control, namely, exposure control. The aperture controller and/or the exposure time controller capable of obtaining respective setting values, namely, control parameters by changing the photoelectric conversion characteristic in accordance with the aperture control and/or the exposure time control, respectively, control the aperture value or the exposure time such as the integration time or the shutter opening time. Thereby, the output of the image sensor corresponding to the target subject luminance can be obtained from the linear characteristic area of the image sensor. For instance, if the detected AE evaluation value indicates that the subject is relatively bright, exposure amount control such as reducing of the aperture area or shortening of the exposure time is performed to obtain the output of the image sensor corresponding to the subject luminance from the linear characteristic area. Further, in this arrangement, the exposure amount control for obtaining the output of the image sensor corresponding to the subject luminance for exposure setting from the linear characteristic area of the image sensor can be executed with use of the aperture control and/or the exposure time control independently of each other. This arrangement enables to efficiently execute the exposure amount control with high latitude depending on combination of the aperture control and the exposure time control.

According to the arrangement (9), the output of the image sensor corresponding to the target subject luminance is obtained from the linear characteristic area of the image sensor by controlling the aperture value by the aperture controller, and/or by controlling the exposure time by the exposure time controller, wherein the aperture controller and the exposure time controller are capable of performing exposure amount control, namely, exposure control, independently of each other. Further, the exposure amount control for obtaining the output of the image sensor corresponding to the subject luminance for exposure setting from the linear characteristic area can be executed with use of the aperture control and/or the exposure time control independently of each other. This arrangement enables to efficiently execute the exposure amount control with high latitude depending on combination of the aperture control and the exposure control.

(10) In the arrangement (9), preferably, the exposure amount control is performed in such a manner that the output of the image sensor corresponding to the subject luminance for exposure setting is obtained from a relatively high output level area in the linear characteristic area of the image sensor.

In the arrangement (10), for instance, if the detected AE evaluation value indicates that the subject is relatively dark, the exposure amount control by the aperture control and/or by the exposure time control is performed to obtain the output of the image sensor corresponding to the subject luminance for exposure setting from a relatively high output level area of the linear characteristic area. This arrangement enables to obtain a high contrast image even from a low luminance subject image.

According to the arrangement (10), the exposure amount control by the aperture control and/or by the exposure time control is performed in such a manner that the output of the image sensor corresponding to the subject luminance for exposure setting is obtained from a relatively high output level area of the linear characteristic area. This arrangement enables to obtain a high contrast image even from a low luminance subject image.

(11) In the arrangement (9) or (10), preferably, the exposure controller includes a dynamic range controller which controls the photoelectric conversion characteristic of the image sensor, and the dynamic range controller controls the photoelectric conversion characteristic of the image sensor in such a manner that the output of the image sensor corresponding to the subject luminance for exposure setting is obtained from the linear characteristic area of the image sensor.

In the arrangement (11), the output of the image sensor corresponding to the target subject luminance can be obtained from the linear characteristic area of the image sensor by controlling the photoelectric conversion characteristic with use of the dynamic range controller, namely, by controlling the inflection point of the linear characteristic area and the logarithmic characteristic area. For instance, if the detected AE evaluation value indicates that the subject is relatively bright, the dynamic range controller performs photoelectric conversion characteristic control such as setting of the inflection point to the position corresponding to a relatively high output level of the image sensor to obtain the output of the image sensor corresponding to the subject luminance from the linear characteristic area. Further, in this arrangement, the exposure amount control for obtaining the output of the image sensor corresponding to the subject luminance for exposure setting from the linear characteristic area can be executed by the dynamic range control, in addition to the aperture control and/or the exposure time control independently of each other. This arrangement enables to efficiently execute the exposure amount control with high latitude, and in accordance with combination of the aperture control, the exposure time control, and the dynamic range control.

According to the arrangement (11), the output of the image sensor corresponding to the target subject luminance can be obtained from the linear characteristic area of the image sensor by controlling of the photoelectric conversion characteristic, namely, the inflection point, by the dynamic range controller. Further, in this arrangement, the exposure amount control for obtaining the output of the image sensor corresponding to the subject luminance for exposure setting from the linear characteristic area can be executed by the dynamic range control, in addition to the aperture control and/or the exposure time control independently of each other. This arrangement enables to efficiently execute the exposure amount control with high latitude depending on combination of the aperture control, the exposure control, and the dynamic range control.

First Embodiment

In the following, a first embodiment of the invention is described referring to the drawings.

(Description on External Construction of Image Sensing Apparatus)

Figure 1B:
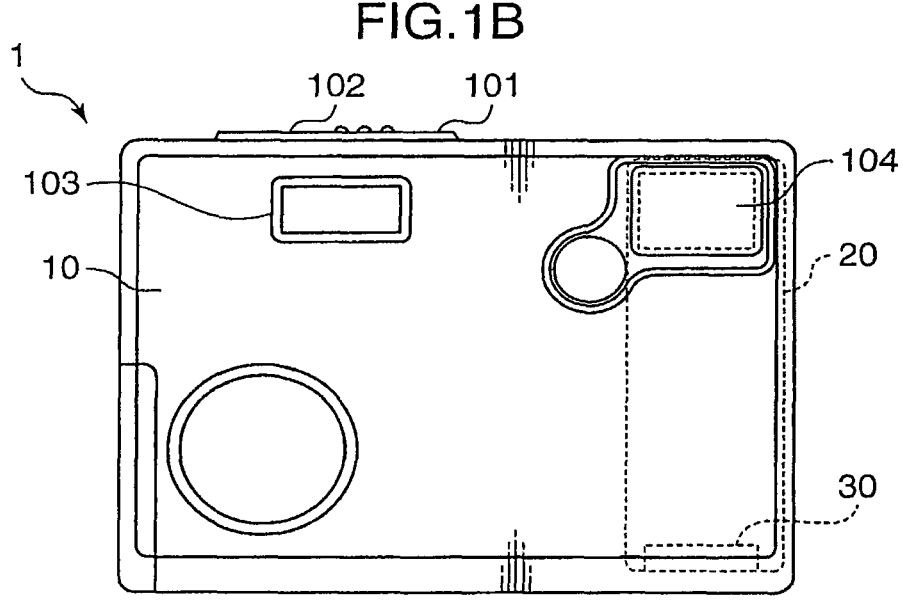
Figure 1C:
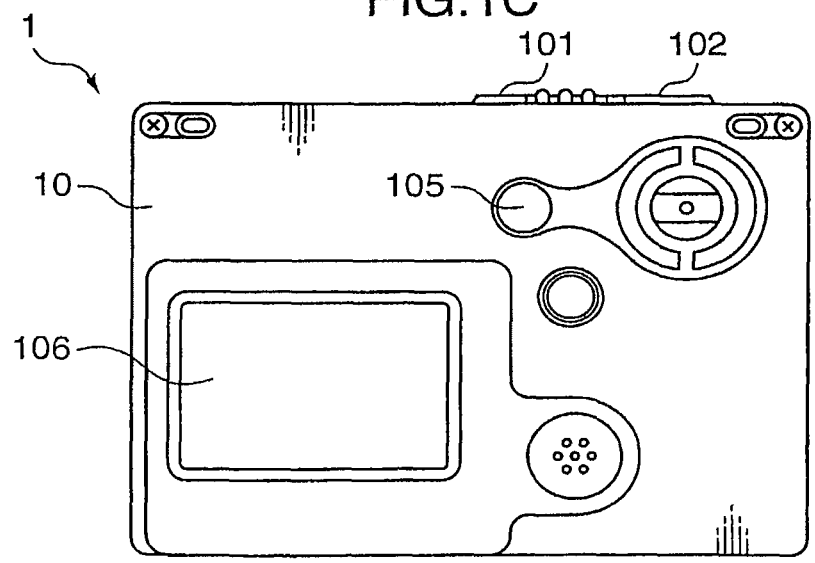

FIGS. 1A through 1C are diagrams showing external appearance of a compact digital camera 1 to which an image sensing apparatus as the first embodiment is applied, wherein FIG. 1A is a top plan view, FIG. 1B is a front view, and FIG. 1C is a rear view. The digital camera 1, as an example of image sensing apparatuses, has a power supply switch 101 and a release switch 102 on a top part of a camera body 10, a flash section 103 and a taking lens aperture 104 on a front part thereof, and various operation buttons such as a mode setting switch 105, and a LCD section 106 comprised of a liquid crystal display (LCD) monitor on a rear part thereof. A retractable lens barrel 20 is provided inside the camera body 10, as well as various parts constituting the camera body 10.

The power supply switch 101 is a pressable type switch used to turn on and off the power source of the camera 1 to start and stop power supply of the camera 1. Every time the power supply switch 101 is pressed, the power source of the camera 1 is alternately and repeatedly turned on and off. The mode setting switch 105 is adapted to set two modes, namely, a still image shooting mode of shooting a still image, and a moving image shooting mode of shooting a moving image.

The release switch 102 is a pressable type switch, and is settable to a halfway pressed state where the release switch 102 is pressed halfway down, and to a fully pressed state where the release switch 102 is pressed fully down. When the release switch 102 is pressed halfway down in the still image shooting mode, for example, a preparatory operation of shooting a still image of a subject such as automatic exposure control and automatic focal adjustment, which will be described later, is executed. Subsequently, when the release switch 102 is pressed fully down, an image shooting operation, namely, a series of operations comprising exposing an image sensor, which will be described later, applying a predetermined image processing to an image signal acquired by the exposure, and recording the processed signal in a memory card or a like device, are executed. On the other hand, when the release switch 102 is pressed fully down in the moving image shooting mode, a predetermined moving image shooting operation is started. Subsequently, when the release switch 102 is pressed fully down again, the moving image shooting operation is terminated.

While the release switch 102 is pressed halfway down in the still image shooting mode, the flash section 103 flashes light to illuminate the subject if the subject image is dark. The taking lens aperture 104 is an opening for guiding the subject light image to the retractable lens barrel 20 provided inside the camera body 10. The LCD section 106 is adapted to playback or display an image recorded in a recording medium mounted in the camera body 10, or to display a through-image or a live-view image of the subject which has been video-shot in a shooting standby period or in the moving image shooting mode. The camera body 10 has a group of push switches such as a zoom switch, a menu selection switch, and a selection determination switch in addition to the mode setting switch 105.

The retractable lens barrel 20 constitutes a taking lens system which guides the subject image through the taking lens aperture 104 to the image sensor 30 arranged inside the camera body 10. The lens barrel 20 is a lens barrel whose length is not changed even in zooming or focusing driving. Namely, the lens barrel 20 does not protrude outside of the camera body 10. Inside the lens barrel 20, there are provided a lens group 21 (see FIG. 2) constituting a taking optical system comprised of a zoom lens block and a fixed lens block arrayed in series along an optical axis, and a diaphragm 22 arranged at an appropriate position of the lens group 21. A shutter 23 is arranged at an appropriate position of the lens group 21 to allow or block incidence of light along the optical path of the taking optical system by opening/closing the shutter 23. In other words, the exposure amount of the image sensor 30 is controlled based on the setting degree of the aperture area of the diaphragm 22, an opening/closing operation of the shutter 23, or other factor.

(Description on Entire Electrical Configuration of Image Sensing Apparatus)

Figure 2:
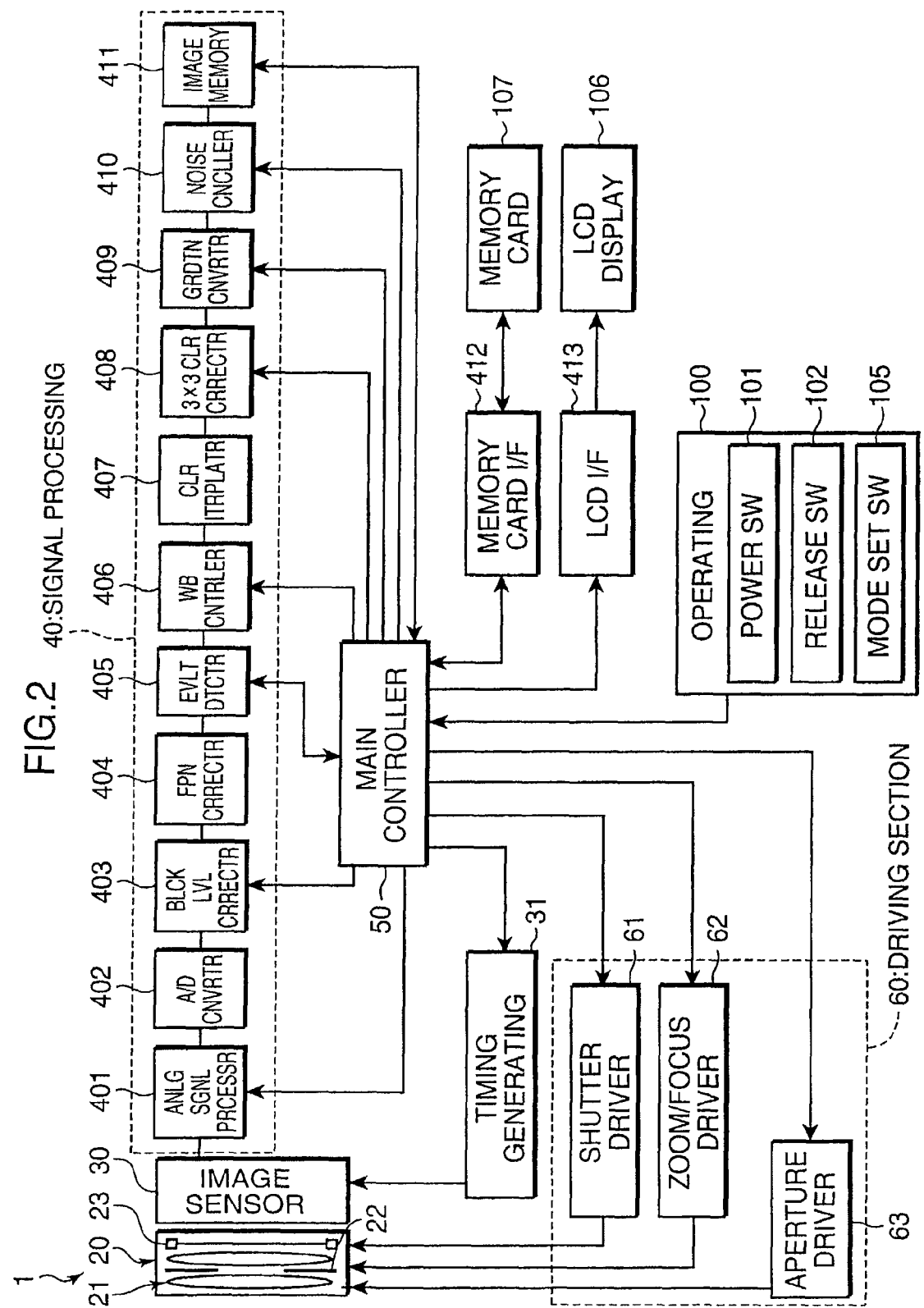
FIG. 2 is a block diagram of an image sensing process to be implemented by the digital camera.

FIG. 2 is a block diagram of an imaging process to be implemented by the digital camera 1 as the first embodiment. The digital camera 1 has an operating section 100, the retractable lens barrel 20, the image sensor 30, a signal processing section 40, a main controller 50, and a driving section 60. The operating section 100 is constituted of the power supply switch 101, the release switch 102, and the mode setting switch 105.

The image sensor 30 photo-electrically converts the subject light image formed through the lens group 21 in the lens barrel 20 into image signals of respective color components of red (R), green (G), and blue (B), namely, signals comprised of signal arrays representing pixel signals received on the respective pixels of the image sensor 30 according to the amount of light from the subject for outputting to the signal processing section 40. In this embodiment, a log conversion type solid-state image sensing device is used as the image sensor 30. The image sensor 30 is constructed such that output pixel signals, or output electrical signals generated by photoelectric conversion are outputted in relation to the amount of incident light, after being logarithmically converted. The image sensor 30 has such an output characteristic that output pixel signals are outputted after being linearly converted when the amount of incident light is lower than a predetermined level. The image sensor 30 comprises a linear characteristic area where its photoelectric conversion characteristic is linear while the subject image is dark, and a logarithmic characteristic area where its photoelectric conversion characteristic is logarithmic while the subject image is bright. Further, the switching point, namely, the inflection point of the linear characteristic area and the logarithmic characteristic area is controllable by a specific control signal, namely, a dynamic range control signal to be described later. The construction, the operation and the like of the image sensor 30 will be described later in detail.

A timing generating circuit or a timing generator 31 controls an image sensing operation by the image sensor 30 such as electric charge accumulation based on exposure and readout of the accumulated electric charge. The timing generating circuit 31 generates a predetermined timing pulse such as a pixel drive signal, a horizontal scanning signal, a vertical scanning signal, a horizontal scanning circuit drive signal, and a vertical scanning circuit drive signal based on a sensing control signal sent from the main controller 50, outputs the generated signals to the image sensor 30, reads out a frame image every 1/30 second, for example, in the moving image shooting mode, namely, in the through-image display mode, and outputs the signals successively to the signal processing section 40. Further, during exposure in the still image shooting mode, the timing generating circuit 31 accumulates electric charge in association with the exposure operation of the image sensor 30, namely, photoelectrically converts the subject light image into image signals, and outputs the accumulated electric charge to the signal processing section 40. Further, the timing generating circuit 31 generates a clock for analog-to-digital (A/D) conversion to be used in an ND converter 402, which will be described later.

The signal processing section 40 applies a predetermined analog signal processing and a predetermined digital signal processing to the image signals outputted from the image sensor 30. The image signal processing is implemented with respect to each of the pixel signals constituting the image signals. The signal processing section 40 includes an analog signal processor 401, the A/D converter 402, a black level corrector 403, a fixed pattern noise (FPN) corrector 404, an evaluation value detector 405, a white balance (WB) controller 406, a color interpolator 407, a 3×3 color corrector 408, a gradation converter 409, a noise canceller 410, and an image memory 411.

The analog signal processor 401 applies a predetermined analog signal processing to the image signals outputted from the image sensor 30, namely, an analog signal group representing light received on the respective pixels of the image sensor 30, and includes a correlation double sampling (CDS) circuit for reducing a reset noise included in each analog image signal, and an auto gain control (AGC) circuit for correcting the level of the analog image signal. The AGC circuit has an amplifying function of amplifying the analog image signal with an adequate amplification ratio to compensate for insufficiency in signal level of a captured image, in the case where adequate exposure was not obtained, so that the amplified analog signal level lies in the input voltage range of the A/D converter 402, which will be described later.

The A/D converter 402 has a function of converting the analog image signal outputted from the analog signal processor 401 into a digital image signal, namely, image data of 12 bits, for instance. The A/D converter 402 converts the analog image signal into a digital image signal based on the clock for A/D conversion sent from the timing generating circuit 31.

The black level corrector 403 implements computation: SD1-SD2 where SD1 represents the level of the image signal outputted from the A/D converter 402, and SD2 represents the level of the image signal at a dark time to correct the black level of the digital image signal outputted from the A/D converter 402, namely, the image signal level at the dark time, to a reference value e.g. 0 in terms of digital signal level after A/D conversion. The black level correction is performed based on dynamic range information of the image sensor 30 commensurate with the photoelectric conversion characteristic of the image sensor 30 outputted from the main controller 50. This is for the following reasons. In the digital camera 1 according to the embodiment of the invention, the photoelectric conversion characteristic of the image sensor 30 is controllable, and the level of the digital image signal outputted from the A/D converter 402 at the dark time is changed in response to change of the photoelectric conversion characteristic of the image sensor 30. Thereby, accurate black level correction in accordance with the change of the image signal level can be conducted.

The FPN corrector 404 removes a fixed pattern noise in the image signal outputted from the black level corrector 403. The fixed pattern noise is a noise due to a variation among threshold values of field effect transistors equipped in respective pixel circuits of the image sensor 30, and results from a variation among output values of the pixel signals generated by the respective pixels. The FPN corrector 404 implements computation: SD3-SD4 where SD3 represents the level of the image signal outputted from the black level corrector 403, and SD4 represents the fixed pattern component of the image signal outputted from the black level corrector 403.

The evaluation value detector 405 detects, based on the image signal actually acquired by the image sensing operation of the image sensor 30, evaluation values based on which automatic exposure (AE) control, auto focusing (AF) control, white balance (WB) control, or a like control is to be implemented, namely, based on AE evaluation values, AF evaluation values, white balance evaluation values (hereinafter, called as "WB evaluation values"), or the like. In case of conducting AE control, generally, the following steps are implemented:

(1) measuring the luminance level and the luminance range of a subject as a target whose image is to be captured;

(2) calculating an exposure control amount necessary for securing an output from the image sensor commensurate with the luminance level and the luminance range; and (3) controlling the exposure amount and the like based on the calculation result before actual shooting.

The evaluation value detector 405 calculates the luminance level and the luminance range of the subject based on the image signal actually acquired by the image sensor 30 to carry out the step (1), and outputs them as AE evaluation values to the main controller 50, so that they can be used for AE control, which will be described later.

In case of AF control, driving of the focus lens of the lens group 21 along an optical axis direction, and an image sensing operation by the image sensor 30 are alternately conducted to set the focus lens to such a position that makes it possible to maximize the contrast of the image acquired by the sensing operation, namely, a so-called hill-climbing search technique is adopted. The detected position of the focus lens is outputted to the main controller 50 as an AF evaluation value, which, in turn, is used for AF control, which will be described later. Further, white balance control is implemented to correct the colors of the output image to those conforming to a light source color of the subject. In this embodiment, the luminance ratios and the luminance differences of the respective color components R, G, and B are calculated by the evaluation value detector 405 based on the image signal outputted from the FPN corrector 404, and the calculated luminance ratios and the calculated luminance differences are outputted to the main controller 50 as WB evaluation values. Exemplified methods for acquiring the AE evaluation values, the AF evaluation values, and the WB evaluation values will be described later in detail.

The white balance controller 406 conducts level conversion of the pixel data of the respective color components R, G, and B, based on the dynamic range information of the image sensor 30, and the WB evaluation values outputted from the main controller 50, so that the image signal has a predetermined color balance. In this embodiment, since the image sensor 30 comprises a linear characteristic area and a logarithmic characteristic area, it is preferable to conduct white balance correction suitable for each of the linear characteristic area and the logarithmic characteristic area by acquiring the WB evaluation values with respect to each of the linear characteristic area and the logarithmic characteristic area.

The color interpolator 407 interpolates pixel data at the pixel position where there is no color information in a frame image with respect to each of the color components R, G, and B of the image signal outputted from the white balance controller 406. Specifically, since a color filter format of the log conversion type image sensor 30 used in the embodiment adopts a so-called Bayer system in which green is arrayed in a checker pattern, and red and blue are each arrayed linearly, color information is not sufficient. In view of this, the color interpolator 407 interpolates pixel data at the pixel positions where there is no image data, using a plurality of existing pixel data.

More specifically, regarding a frame image of the color component G having pixels up to a high bandwidth, the color interpolator 407 masks image data constituting the frame image with a predetermined filter pattern, and calculates an average of pixel data by excluding pixel data having a maximum value and a minimum value out of the pixel data existing around the target pixel position to be interpolated, with use of a median filter, and interpolates this average value as the pixel data to be interpolated at the target pixel position. Regarding frame images of the color components R and B, the color interpolator 407 masks image data constituting each frame image with a predetermined filter pattern, calculates an average of pixel data existing in the vicinity of the pixel position, and implements interpolation by using the average as pixel data at the target pixel position.

FIG. 3 shows an example of the color filter format of the image sensor 30. Image signals of the respective color components R, G, and B in respective pixels are generated by the color interpolation with use of the color filter format, as shown below, for instance:

(i) Color interpolation equation for address 11 (B11):

$R11=(R00+R20+R02+R22)/4$ $G11=(Gr10+Gb01+Gb21+Gr12)/4$ $B11=B11$ (ii) Color interpolation equation for address 12 (Gr12):

$R12=(R02+R22)/2$ $G12=Gr12$ $B12=(B11+B13)/2$ (iii) Color interpolation equation for address 21 (Gb21):

$$R21 = (R20 + R22)/2$$

$$G21 = Gb21$$

$$B21 = (B11 + B31)/2$$

(iv) Color interpolation equation for address 22 (R22):

$$R22 = R22$$

$$G22 = (Gb21 + Gr12 + Gr32 + Gb23)/4$$

$$B22 = (B11 + B31 + B13 + B33)/4$$

The 3×3 color corrector 408 corrects the saturation or the tint of the image signals of the respective color components R, G, and B outputted from the color interpolator 407. The 3×3 color corrector 408 has three kinds of conversion coefficients with respect to each of the color components R, G, and B for converting the level ratio of image signals of the color components R, G, and B, and corrects the saturation of image data by converting the level ratio with use of a conversion coefficient conforming to a scene to be shot. For instance, the 3×3 color corrector 408 linearly converts the image signals with use of nine conversion coefficients, namely, a1, a2, a3, b1, b2, b3, c1, c2, and c3, as follows:

$$R' = a1 \cdot R + a2 \cdot G + a3 \cdot B$$

$$G' = b1 \cdot R + b2 \cdot G + b3 \cdot B$$

$$B' = c1 \cdot R + c2 \cdot G + c3 \cdot B$$

The gradation converter 409 non-linearly converts and offset-adjusts the level of the image signal with respect to each of the color components R, G, and B using a specified gamma characteristic, so that the image signals of the respective color components R, G, and B outputted from the 3×3 color corrector 408 attain appropriate output levels, respectively. Specifically, the gradation converter 409 corrects the gradation characteristic such as gamma curve and digital gain of the image signals after the white balance adjustment and the color correction to a gradation characteristic of the LCD section 106 or an externally connected television monitor or the like. The gradation converter 409 changes the gradation characteristic of the image signal based on the dynamic range information outputted from the main controller 50, and the AE evaluation values and the like detected by the evaluation value detector 405.

The noise canceller 410 removes a noise component in the image signal outputted from the gradation converter 409, and correctively acquires desired sharpness of the image by extracting/emphasizing an edge component. The noise canceller 410 performs adequate correction by changing a coring factor, which is a factor to be used in removing the noise component in the image signal, extracting and emphasizing the edge component based on the dynamic range information outputted from the main controller 50.

The image memory 411 includes a memory such as an ROM and an RAM, and temporarily stores image data after the signal processing in the signal processing section 40. The image memory 411 has a capacity capable of storing image data corresponding to one frame, for instance.

A memory card interface (I/F) 412 is an interface for recording image data that has been generated in the signal processing section 40 in a memory card 107 for output. The memory card 107 is a memory in which image data such as a still image and a moving image is to be recorded for storage. The memory card 107 is detachable from the digital camera 1 to allow exchange of image data with an external recording medium. An LCD display interface (I/F) 413 is an interface for converting the image data that has been generated in the signal processing section 40 for LCD display into an image signal in compliance with NTSC standards or PAL standards, for instance, for outputting to the LCD section 106.

The main controller 50 comprises a central processing unit (CPU) and is adapted to centrally control shooting operation of the digital camera 1. Specifically, the main controller 50 controls operations of the respective elements of the signal processing section 40 based on the information sent from the respective elements of the signal processing section 40 such as the AE evaluation values, the AF evaluation values, and the WB evaluation values, as well as on the operation mode of the digital camera 1, by calculating and outputting operation information such as parameters necessary for operating the respective elements of the signal processing section 40. Further, the main controller 50 controls the timing generating circuit 31 for shooting operation, controls the driving section 60 for zooming and focusing driving of the lens group 21, and for driving of the diaphragm 22 and the shutter 23, and controls image signal outputting operation.

Figure 4:
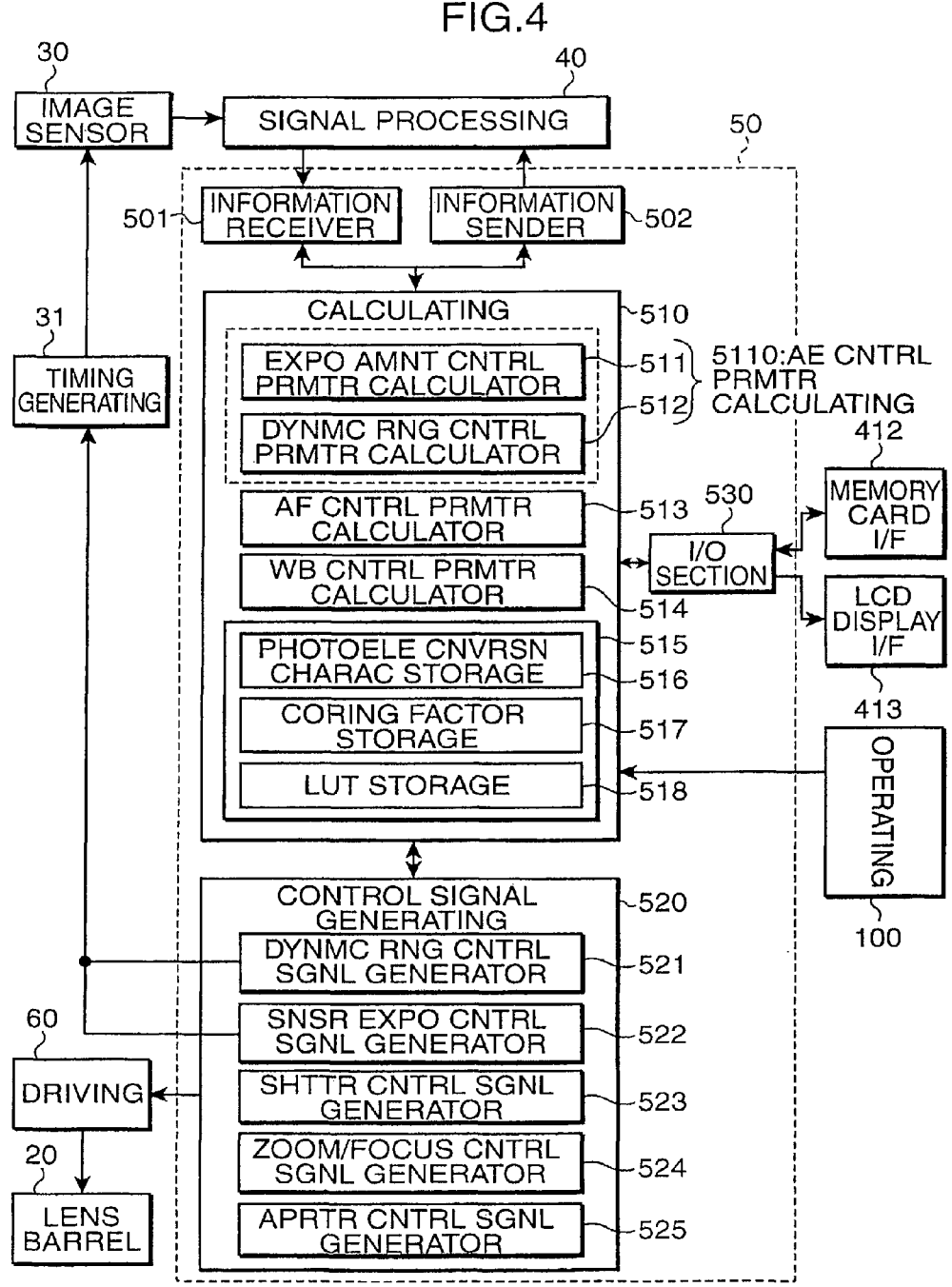
FIG. 4 is a functional block diagram for explaining functions of a main controller equipped in the digital camera.

FIG. 4 is a functional block diagram for explaining functions of the main controller 50. The main controller 50 includes an information receiver 501, an information sender 502, a calculating section 510 with a memory unit 515, a control signal generating section 520, and an input/output section 530.

The information receiver 501 acquires the AE evaluation values, the AF evaluation values, and the WB evaluation values which are detected by the evaluation value detector 405 of the signal processing section 40, and distributes the respective evaluation values to corresponding parameter calculators provided in the calculating section 510. On the other hand, the information sender 502 reads out, from the memory unit 515, the information necessary for the signal processing section 40 such as the dynamic range information and the coring factor according to needs, and distributes the information to the respective elements in the signal processing section 40 according to needs.

The calculating section 510 calculates control parameters based on the evaluation values sent from the information receiver 501, and includes an AE control parameter calculating unit 5110 comprised of an exposure amount control parameter calculator 511, and a dynamic range control parameter calculator 512, an AF control parameter calculator 513, a white balance control parameter calculator 514, and the memory unit 515.

Figure 10:
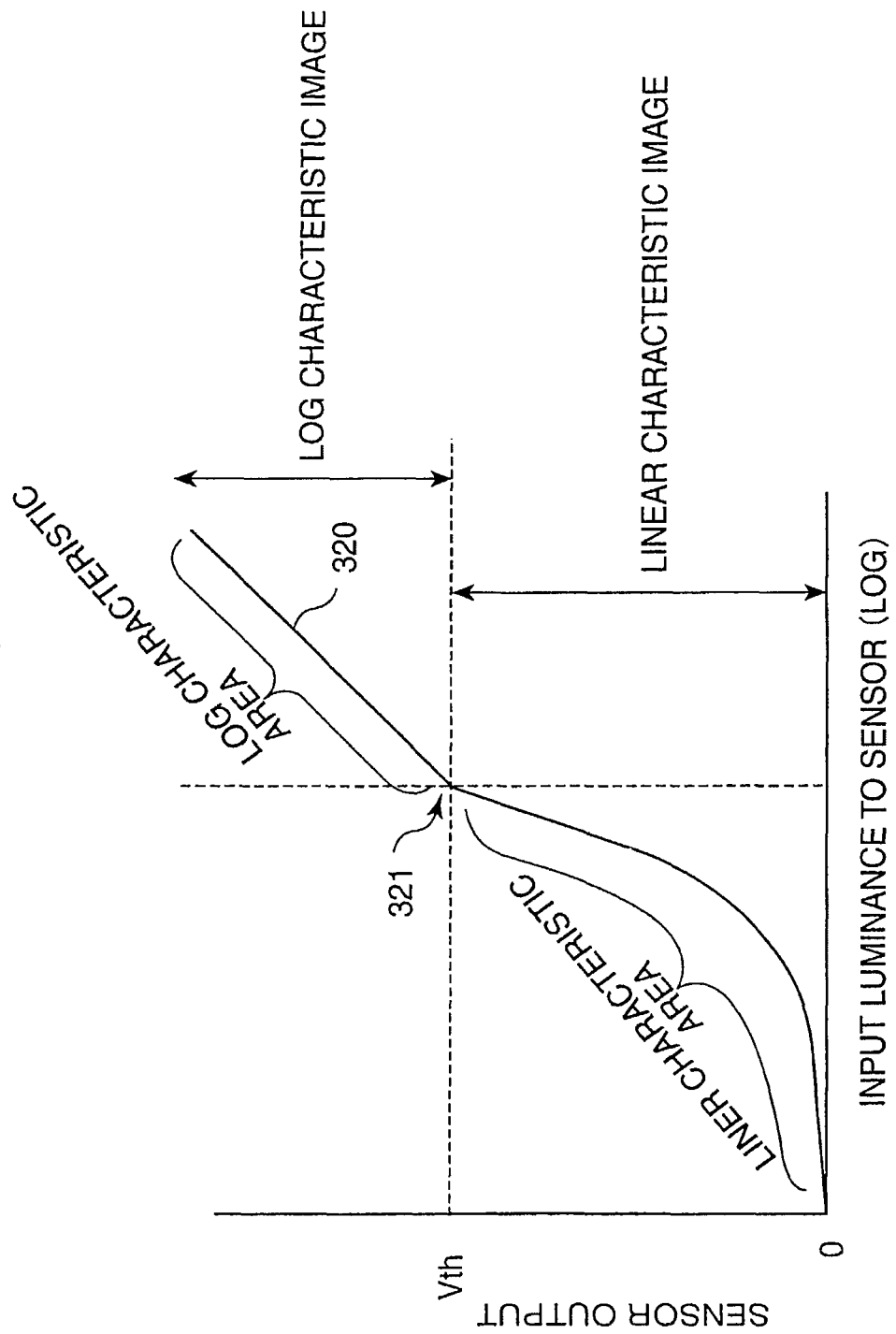
FIG. 10 is a graph showing a photoelectric conversion characteristic of the image sensor.

The memory unit 515 includes an ROM and an RAM, and is comprised of a photoelectric conversion characteristic storage 516 for storing dynamic range information of the image sensor 30, namely, a setting value of a photoelectric conversion characteristic, a coring factor storage 517 for storing a setting position of the coring factor to be used in the noise canceller 410, and an LUT storage 518 for storing a lookup table (LUT) with which data acquired from the linear characteristic area and the logarithmic characteristic area of the image sensor 30 are interchangeably converted. The photoelectric conversion characteristic information storage 516 may store a photoelectric conversion characteristic itself, namely, a photoelectric conversion characteristic curve as shown in FIG. 10, which will be described later. Further, the LUT storage 518 stores therein, other than the above lookup table, various lookup tables for data conversion such as a lookup table with which data is converted between the value of an exposure time and the value of an aperture area of the diaphragm, and the exposure time setting value and the aperture setting value, a lookup table with which data is converted between the value of the inflection point, namely, the output level of the photoelectric conversion characteristic, and the photoelectric conversion characteristic setting value, a lookup table with which data is converted between the number of saturated pixels, and the value of change of the inflection point, a lookup table with which the photoelectric conversion characteristic setting value is outputted based on the maximum luminance level, and a lookup table with which a change of the photoelectric conversion characteristic setting value is outputted based on a change of the maximum luminance level. Further, as described above, the data stored in the photoelectric conversion information storage 516, the coring factor storage 517, and the LUT storage 518 are sent to an appropriate processor in the signal processing section 40 from the information sender 502 according to needs.

The AE control parameter calculating unit 5110 calculates a control parameter for setting an optimal exposure amount for shooting and the photoelectric conversion characteristic of the image sensor 30 to execute exposure control or AE control commensurate with a subject luminance. Specifically, the exposure amount control parameter calculator 511 of the AE control parameter calculating unit 5110 calculates a control parameter for optimizing the exposure time and the aperture value, and calculates the exposure time setting value and the aperture setting value commensurate with the subject luminance based on the AE evaluation values detected by the evaluation value detector 405, and the dynamic range information or the photoelectric conversion characteristic of the image sensor 30 at the time when the AE evaluation values stored in the photoelectric conversion characteristic information storage 516 were obtained.

The dynamic range control parameter calculator 512 calculates a control parameter for optimizing the photoelectric conversion characteristic of the image sensor 30 commensurate with the subject luminance. The dynamic range control parameter calculator 512 calculates the photoelectric conversion characteristic setting value based on which the subject luminance used in setting the dynamic range of the image sensor 30 can attain a desired saturation output level of the image sensor 30. In such a calculation, the dynamic range information of the image sensor 30 at the time when the AE evaluation values stored in the photoelectric conversion characteristic information storage 516 were obtained is referred to. The operation of the AE control parameter calculating unit 5110 will be described later in detail.

The AF control parameter calculator 513 calculates a control parameter for setting the optimal focal length in shooting a subject image, based on the AF evaluation values detected by the evaluation value detector 405. In calculating the control parameter, it is preferable to acquire the AF evaluation values for reference from each of the logarithmic characteristic area and the linear characteristic area of the image sensor 30 and to calculate a control parameter for rough metering, namely, for the AF evaluation values acquired from the logarithmic characteristic area, and a control parameter for precise metering, namely, for the AF evaluation value acquired from the linear characteristic area, respectively, by utilizing the features of the respective characteristic areas.

The white balance control parameter calculator 514 calculates a control parameter for setting the color balance of the image signal to a desired color balance based on the WB evaluation values detected by the evaluation value detector 405. In calculating the control parameter, it is preferable to acquire the WB evaluation values for reference from each of the logarithmic characteristic area and the linear characteristic area of the image sensor 30 and to calculate control parameters suitable for the respective characteristic areas.

The control signal generating section 520 generates control signals for driving the respective controllable elements based on the various control parameters calculated in the calculating section 510, and includes a dynamic range control signal generator 521, a sensor exposure time control signal generator 522, a shutter control signal generator 523, a zoom/focus control signal generator 524, and an aperture control signal generator 525.

The dynamic range control signal generator 521 generates a drive signal for the image sensor 30 for controlling the output level point or the inflection point at which the photoelectric conversion characteristic is switched from the linear characteristic area to the logarithmic characteristic area based on the photoelectric conversion characteristic setting value of the image sensor 30 which has been calculated in the dynamic range control parameter calculator 512, and sends the drive signal to the timing generating circuit 31. The timing generating circuit 31 generates a timing signal for controlling the dynamic range of the image sensor 30 in response to the inputted drive signal, and drives the image sensor 30. Specifically, as will be described later, the photoelectric conversion characteristic of the image sensor 30 has a property that the inflection point is changed by controlling a signal φVPS to the image sensor 30, namely, the intensity of the voltage VPH or the duration of the time ΔT of the signal φVPS. In view of this, the dynamic range control signal generator 521 controls the dynamic range of the image sensor 30 in accordance with the subject luminance by controlling the drive signal inputted to the timing generating circuit 31 for controlling the signal φVPS.

The sensor exposure time control signal generator 522 generates a control signal for controlling the exposure time, namely, the integration time of the image sensor 30 by controlling operations of the electronic circuitry, not by mechanical manipulation of the diaphragm 22, the shutter 23, or a like device. The sensor exposure time control signal generator 522 generates a drive signal for the image sensor 30, specifically, a signal for controlling a time ΔS, with which the signal φVPS can attain a middle potential M, to secure a predetermined exposure time, based on the optimal exposure amount calculated by the exposure amount control parameter calculator 511, and sends the drive signal to the timing generating circuit 31. The timing generating circuit 31 generates a timing signal for controlling the exposure time of the image sensor 30 in response to the inputted drive signal, and drives the image sensor 30.

Similarly, the shutter control signal generator 523 generates a drive signal for setting the shutter speed of the shutter 23 in accordance with the exposure time based on the optimal exposure amount calculated by the exposure amount control parameter calculator 511. The zoom/focus control signal generator 524 generates a control signal for driving the lens group 21 based on the optimal focal length calculated by the AF control parameter calculator 513. Further, the aperture control signal generator 525 generates a control signal for setting the aperture area of the diaphragm 22 based on the optimal exposure amount calculated by the exposure amount control parameter calculator 511. The control signals generated in the shutter control signal generator 523, the zoom/focus control signal generator 524, and the aperture control signal generator 525 are sent to the corresponding elements of the driving section 60, respectively.

The input/output section 530 is connected to the memory card I/F 412 and to the LCD display I/F 413, and executes input/output operations such as recording an image signal representing a captured image in the memory card 107, displaying the captured image on the LCD section 106, or reading out the image signal from the memory card 107 after implementing a predetermined image processing with respect to the captured image in response to a command signal or the like sent from the operating section 100.

Referring back to FIG. 2, the driving section 60 drives mechanical driving elements equipped in the digital camera 1, based on the control signals generated in the control signal generating section 520, and includes a shutter driver 61, a zoom/focus driver 62, and an aperture driver 63.

The shutter driver 61 drivingly opens and closes the shutter 23 to open the shutter 23 for a predetermined time in response to a control signal sent from the shutter control signal generator 523. The zoom/focus driver 62 drives a motor for operating the zoom lens block or a focus lens block of the lens group 21 in response to the control signal sent from the zoom/focus control signal generator 524 to move the lens block to a focal point. The aperture driver 63 drives the diaphragm 22 in response to a control signal sent from the aperture control signal generator 525 to set the aperture amount of the diaphragm 22 to a predetermined value.

(Description on Overall Flow of Operation)

Figure 5:
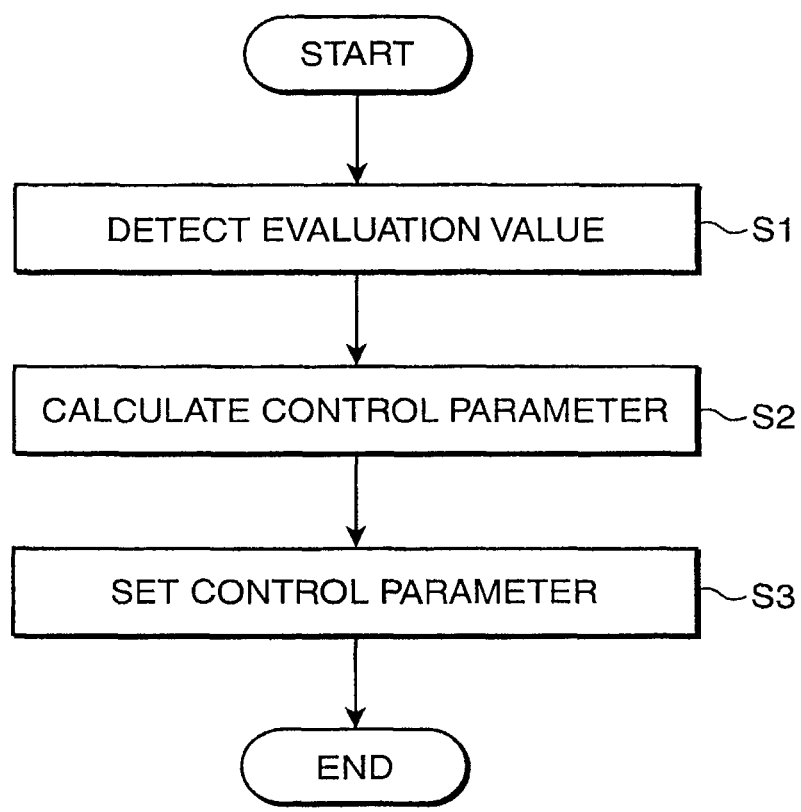
FIG. 5 is a flowchart showing an example of an overall operation of the digital camera.

An overall flow is described on the operation of the digital camera 1 having the above construction. FIG. 5 is a flowchart showing an example of the overall operation of the digital camera 1. As shown in FIG. 5, the operation of the digital camera 1 roughly comprises an evaluation value detecting step (step S1) of detecting evaluation values such as AE evaluation values, AF evaluation values, and WB evaluation values, a control parameter calculating step (step S2) of calculating various control parameters based on the evaluation values, and a control parameter setting step (step S3) of setting the control parameters for driving the respective elements of the digital camera 1, so that the digital camera 1 is brought to a photographable state corresponding to the control parameters.

In this embodiment, the aforementioned operation flow has features that the subject luminance for exposure setting is determined based on the AE evaluation values, and that AE control is performed in such a manner that the output of the image sensor 30 corresponding to the subject luminance for exposure setting is obtained from the linear characteristic area of the image sensor 30 in calculating a control parameter for AE control in step S2 based on the AE evaluation values detected in step S1. In the following, the respective steps S1 through S3 are described one by one by highlighting the features when need arises to do so.

In steps S1 through S3, the following processings are implemented. First, in the evaluation value detecting step S1, information relating to evaluation values based on which various controls are implemented is acquired, and evaluation values are calculated based on the evaluation value information. In case of AE control, the luminance level of the subject whose image is to be captured is measured or detected, and AE evaluation values are calculated based on the measured luminance level. The luminance level and the luminance range are detected as follows since it is rational to detect the luminance level and the luminance range based on the subject image that has been actually captured by the image sensor 30, and the image sensor 30 can shoot both still images and moving images. In view of this, there are proposed two sub-steps S1-1 and S1-2 as a step of acquiring luminance information:

(Step S1-1) Detection Based on Still Image:

A still image captured by the image sensor 30 before actual shooting is used as the image for detecting the evaluation values to measure the luminance level and the luminance range; and (Step S1-2) Detection Based on Moving Image:

A moving image captured by the image sensor 30 before actual shooting is used as the image for detecting the evaluation values to measure the luminance level and the luminance range. Thereafter, the following sub-step S1-3 is carried out.

(Step S1-3) Calculation of Evaluation Value:

Various evaluation values including AE evaluation values are calculated by the evaluation value detector 405 based on the acquired luminance information.

Next, in step S2, various parameters are calculated based on the evaluation values. Since the exposure amount or the dynamic range is a parameter for AE control, these control parameters are calculated based on the AE evaluation values. Specifically, as the step S2, there are proposed two sub-steps S2-1 and S2-2 of calculating parameters:

(Step S2-1) Calculation of Exposure Amount Control Parameter:

An exposure amount control parameter is calculated by the main controller 50 based on the AE evaluation values; and (Step S2-2) Calculation of Dynamic Range Control Parameter:

A dynamic range control parameter is calculated by the main controller 50 based on the AE evaluation values.

Lastly, in step S3, the control parameters for driving the respective elements of the digital camera 1 are set. In case of AE control, the control parameter setting is conducted based on sub-step S2-1 or S2-2. Accordingly, there are proposed two sub-steps S3-1 and S3-2 of setting parameters:

(Step S3-1) Setting of Exposure Amount Control Parameter:

The parameters for the memory unit 515, the control signal generating section 520 and the like are set based on the calculated exposure amount control parameter to operate the timing generating circuit 31 and the driving section 60; and (Step S3-2) Setting of Dynamic Range Control Parameter:

The parameters for the memory unit 515, the control signal generating section 520 and the like are set based on the calculated dynamic range control parameter to operate the timing generating circuit 31.

(Basic Characteristics of Image Sensor to be Used in Embodiment)

In the following the steps are described one by one in detail. Firstly, an example of basic characteristics of the image sensor 30 to be used in the embodiment is described in detail, in light of a fact that the embodiment is described based on the premise that the image sensor 30 has a linear characteristic area where the electrical signal is linearly converted according to the amount of incident light, and a logarithmic characteristic area where the electrical signal is logarithmically converted according to the amount of incident light.

Figure 7:
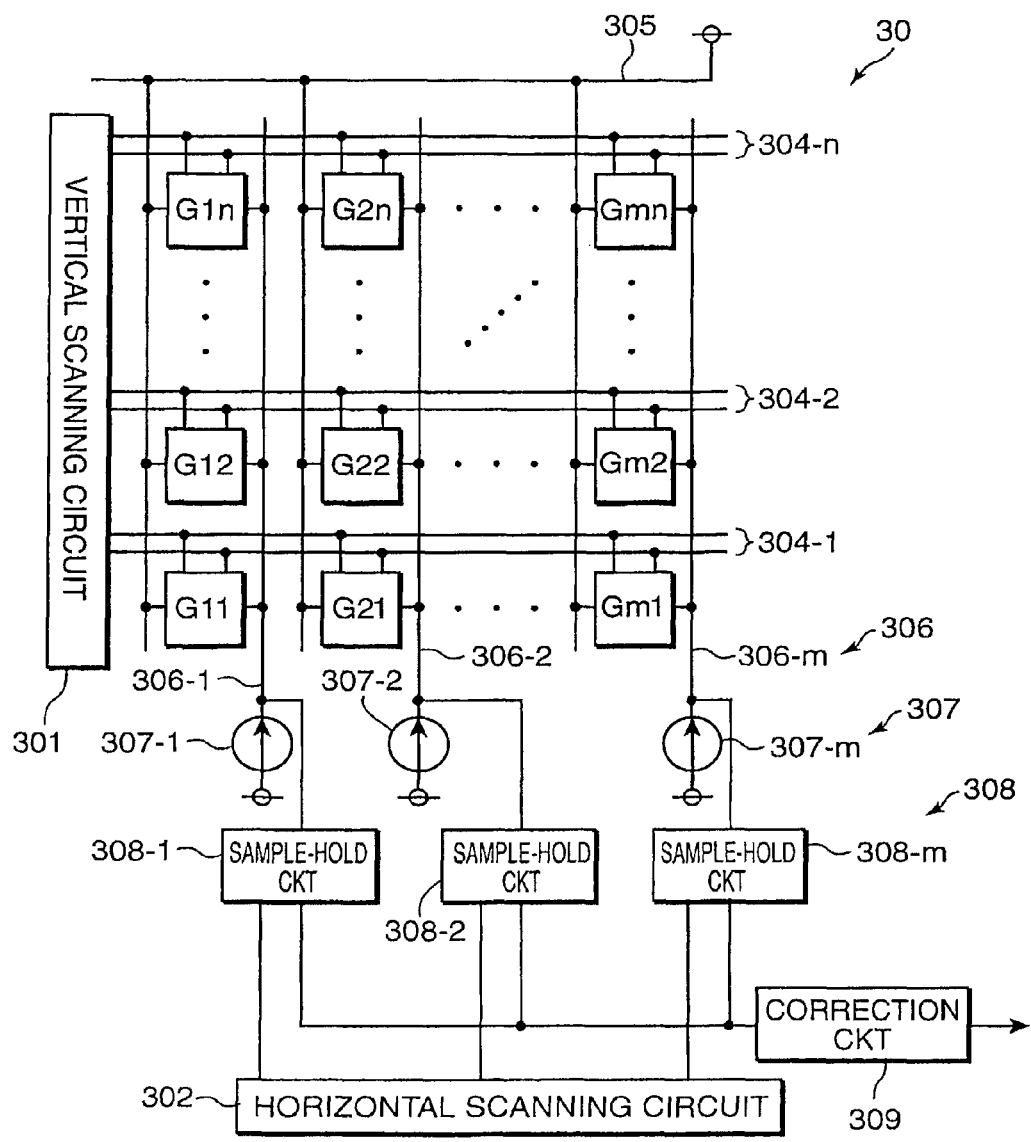
FIG. 7 is a schematic illustration of a two-dimensional MOS solid-state image sensing device, as an example of the image sensor.

FIG. 7 is an illustration schematically showing a two-dimensional MOS type solid-state image sensing device, as an example of the image sensor 30. In FIG. 7, elements G11 through Gmn are pixels arrayed in a matrix. A vertical scanning circuit 301 and a horizontal scanning circuit 302 are arranged in proximity to an outer perimeter of the pixel region comprised of the pixels G11 through Gmn. The vertical scanning circuit 301 successively scans signal lines 304-1, 304-2, . . . , and 304-$n$ arrayed in row direction. Hereinafter, the group of the signal lines 304-1, 304-2, . . . , and 304-*n* is called as "row-direction signal line unit 304". The horizontal scanning circuit 302 successively reads out photoelectric conversion signals which have been outputted from the respective pixels to output signal lines 306-1, 306-2, . . . , and 306-*m* pixel by pixel in horizontal direction. Hereinafter, the group of the output signal lines 306-1, 306-2, . . . , and 306-*m* is called as "output signal line unit 306". A power is supplied to the respective pixels by a power source line 305. Although other lines such as a clock line are connected to the respective pixels, in addition to the row-direction signal line unit 304, the power source line 305, and the output signal line unit 306, illustration of these other lines is omitted in FIG. 7.

Constant current sources 307-1, 307-2, . . . , and 307-*m* (hereinafter, called as "constant current source unit 307" as a group) are arranged in correspondence to the output signal lines 306-1, 306-2, . . . , and 306-*m*, respectively. Each of the constant current sources 307-1, 307-2, . . . , and 307-*m*, and a transistor T5, which will be described later, constitute an amplifying circuit. A resistor or a transistor such as a MOS transistor may constitute an amplifying circuit, in place of the constant current source. Image data outputted from the respective pixels in an image sensing operation by way of the output signal line unit 306, and correction data to be outputted in resetting are successively outputted to sample hold circuits 308-1, 308-2, . . . , and 308-*m* (hereinafter, called as "selection circuit 308" as a group). The image data and the correction data are outputted row by row to the selection circuit 308 for sample-holding. The sample-held image data and the correction data are outputted to a correction circuit 309 column by column. The correction circuit 309 corrects the image data based on the correction data, so that a noise component arising from sensitivity variation is removed. After sensitivity variation of the respective pixels has been corrected, the correction circuit 309 serially outputs the image data pixel by pixel.

Figure 8:
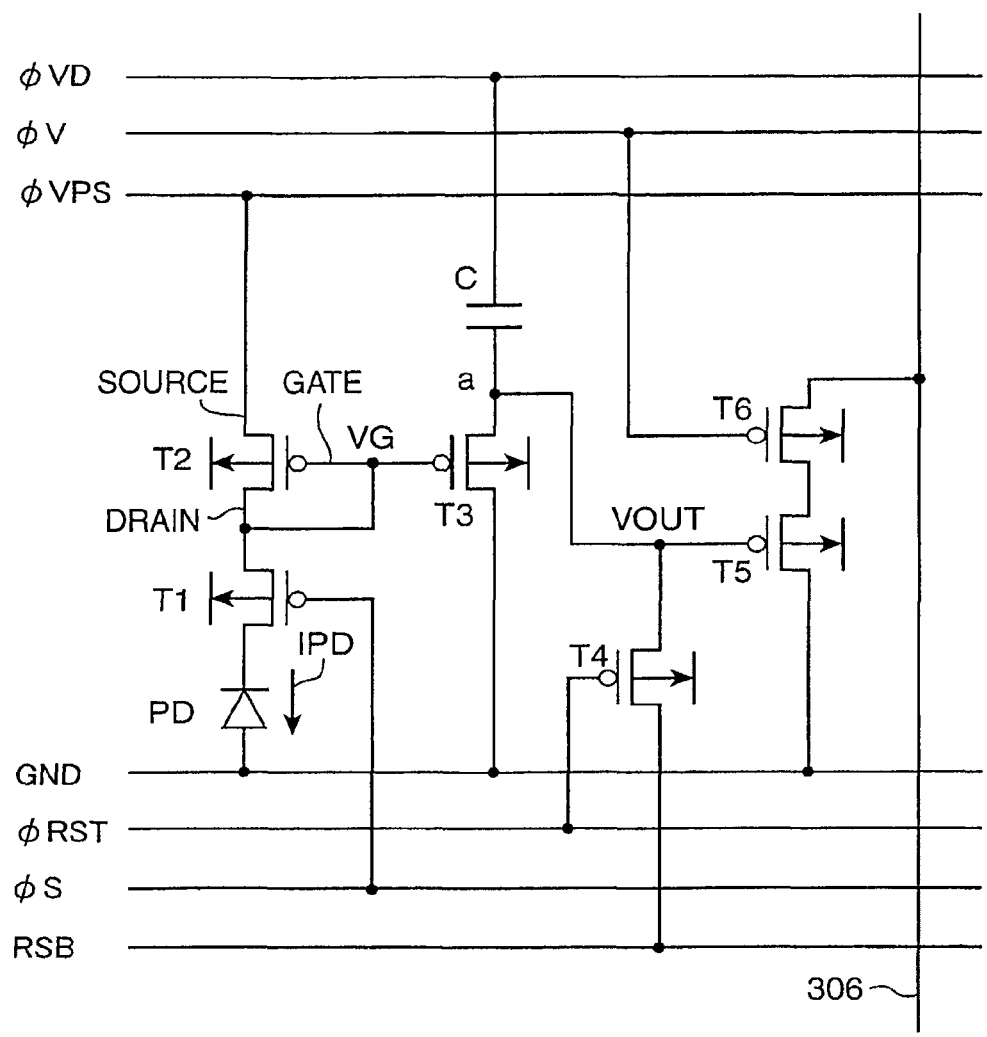
FIG. 8 is a circuitry diagram showing an exemplified arrangement of each pixel constituting the image sensor shown in FIG. 7.

FIG. 8 is an illustration showing an example of a circuit configuration of each of the pixels G11 through Gmn. As shown in FIG. 8, each pixel is comprised of a photodiode PD, transistors T1 through T6, each of which is a metal oxide semiconductor field effect transistor (MOSFET), and a capacitor C for integration. A p-channel MOSFET is adopted as the transistors T1 through T6. The symbols φVD, φV, φVPS, φRST, φS, and RSB represent signals or voltages to the respective transistors T1 through T6 and to the capacitor C, and GND represents the ground.

The photodiode PD is a light sensing section or a photoelectric conversion section, and outputs an electrical signal, namely, a photocurrent IPD commensurate with the amount of incident light from a subject. The transistor T5 and each of the constant current sources shown in FIG. 7 constitute an amplifying circuit, which is a source follower circuit or a source follower amplifier to amplify a voltage VOUT, which will be described later, namely, to conduct current amplification. The transistor T6 is a transistor for reading out a signal, and serves as a switch which is turned on and off in response to a voltage applied to a gate thereof. Specifically, a source of the transistor T6 is connected to the output signal line unit 306 shown in FIG. 7, and the electric current which has been amplified by the transistor T5 is drawn to the output signal line unit 306, as an output current, when the transistor T6 is turned on.

The transistor T2 generates at a gate thereof a voltage obtained by linear conversion or log conversion of the photocurrent IPD. The MOSFET is designed in such a manner that a minute current called a subthreshold current flows when the gate voltage is not larger than a threshold value. The transistor T2 conducts the linear conversion or the log conversion by utilizing the subthreshold characteristic.

Specifically, if the subject luminance is low, or the subject is dark, namely, if the amount of light to be incident onto the photodiode PD is small, the gate potential of the transistor T2 is higher than the source potential thereof. Accordingly, the transistor T2 is in a so-called "cutoff state", and a subthreshold current does not flow in the transistor T2, namely, the transistor T2 is not operated in the subthreshold region. As a result, the photocurrent generated in the photodiode PD flows to the parasitic capacitance of the photodiode PD to thereby accumulate electric charge therein, and a voltage corresponding to the accumulated electric charge is generated. At this time, since the transistor T1 is kept in an ON state, a voltage corresponding to the electric charge accumulated in the parasitic capacitance of the photodiode PD is generated at the gates of the transistors T2 and T3 as a voltage VG. Because of generation of the voltage VG, an electric current flows in the transistor T3, and electric charge proportional to the voltage VG is accumulated in the capacitor C. The transistor T3 and the capacitor C constitute an integration circuit. As a result, a voltage which is linearly proportional to the integration value of the photocurrent IPD is obtained at the connection node a of the transistor T3 and the capacitor C, namely at the output VOUT. At this time, the transistor T4 is in an OFF state. In response to turning on of the transistor T6, the electric charge accumulated in the capacitor C is drawn to the output signal line unit 306 as an output current via the transistor T5. The output current is a value obtained by linear conversion of the integration value of the photocurrent IPD. This is how the image sensor 30 is operated in the linear characteristic area.

On the other hand, if the subject luminance is high or the subject is bright, namely, if the amount of light to be incident onto the photodiode PD is large, the gate potential of the transistor T2 is not larger than the source potential thereof, and a subthreshold current flows in the transistor T2, namely, the transistor T2 is operated in the subthreshold region. As a result, a voltage VG obtained by natural-logarithmic conversion of the photocurrent IPD is generated at the gates of the transistors T2 and T3. Because of generation of the voltage VG, an electric current flows in the transistor T3, and electric charge equivalent to the value obtained by natural-logarithmic conversion of the integration value of the photocurrent IPD is accumulated in the capacitor C. As a result, a voltage which is proportional to the value obtained by natural-logarithmic conversion of the integration value of the photocurrent IPD is generated at the connection node a or at the output VOUT of the capacitor C and the transistor T3. At this time, the transistor T4 is in an OFF state. Then, in response to turning on of the transistor T6, the electric charge accumulated in the capacitor C is drawn to the output signal line unit 306 as an output current via the transistor T5. The output current is the value obtained by natural-logarithmic conversion of the integration value of the photocurrent IPD. This is how the image sensor 30 is operated in the logarithmic characteristic area. As mentioned above, a voltage linearly or natural-logarithmically proportional to the amount of incident light, namely, the subject luminance is outputted with respect to each of the pixels.

The transistor T1 is a switch to be used in extracting noise data or a noise signal arising from a variation in production of transistors T2 at the time of resetting. The transistor T1 is kept in an ON state except for a reset time, and is designed to flow the photocurrent IPD between the drain of the transistor T2 and the photodiode PD. At the time of resetting, the transistor T2 is brought to an OFF state to shut off flow of the photocurrent IPD through the photodiode PD. Thereby, merely the noise data resulting from the production variation is extracted. The extracted variation component or a noise signal is subtracted from a video signal, which will be described later.

The transistor T4 is a transistor for resetting the capacitor C, and serves as a switch which is turned on and off in response to a voltage applied to the gate of the transistor T4. In response to turning on of the transistor T4, a reset voltage or a voltage of the signal RSB is applied to the transistor T4 to thereby return the capacitor C to an initial state before accumulation of electric charge, namely, to a state before start of integration.

Figure 9:
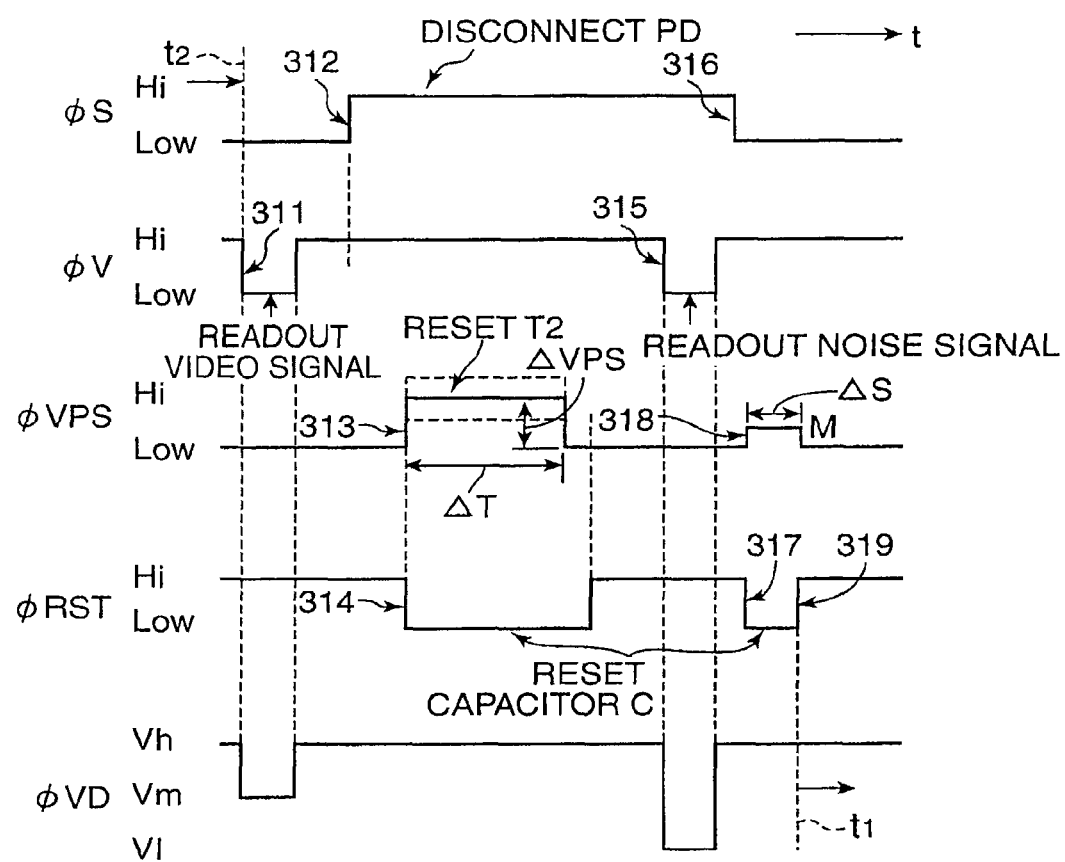
FIG. 9 is an exemplified timing chart concerning a sensing operation of the image sensor.

FIG. 9 is an in illustration showing a timing chart on an image sensing operation of the image sensor 30, namely, a pixel. In this embodiment, in light of polarities of the p-channel MOSFET, the transistor is turned off when the respective signals are set high (Hi), and turned on when the respective signals are set low (Low). First, when the signal φV is set Low at the timing indicated by the arrow 311, the transistor T6 is turned on to read out a video signal. Specifically, the electric charge accumulated in the capacitor C is drawn to the output signal line unit 306 as an output current or a video signal. Then, when the signal φS is set Hi at the timing indicated by the arrow 312, the transistor T1 is turned off to disconnect the photodiode PD. Subsequently, when the signal φVPS is set Hi at the timing indicated by the arrow 313, the transistor T2 is reset. Further, concurrently with the resetting of the transistor T2, the signal φRST is set Low at the timing indicated by the arrow 314, and the transistor T4 is turned on. Thereby, a reset voltage is applied to the capacitor C at the connection node a by the signal RSB, namely, the potential at the connection node a becomes the potential VRSB of the signal RSB to thereby reset charge accumulation of the capacitor C. Thus, after resetting of the transistor T2 and the capacitor C, when the signal φV is set Low at the timing indicated by the arrow 315, the transistor T6 is turned on to thereby draw the noise signal to the output signal line unit 306.

Next, when the signal φS is set Low at the timing indicated by the arrow 316, the transistor T1 is turned on to thereby release disconnection of the photodiode PD. Then, when the signal φVPS is set to the middle potential M at the timing indicated by the arrow 318, the parasitic capacitance of the photodiode PD is reset for reducing signal residue. Then, when the signal φRST is set Low at the timing indicated by the arrow 317 to make a voltage for integration start in a next frame constant, the transistor T4 is turned on to reset charge accumulation of the capacitor C.

Thereafter, when the signal φVPS is set Low at the timing indicated by the arrow 319, resetting of the parasitic capacitance of the photodiode PD is terminated. Concurrently, the signal φRST is set Hi to terminate the resetting operation of the capacitor C. The integration time of the capacitor C is started at the timing t1, and continued for a duration up to the timing of the signal φV indicated by the arrow 311, namely, up to the timing t2 at which readout of a video signal in the next frame is started. The time duration from the timing t1 to the timing t2 corresponds to an integration time of the capacitor C, namely, an exposure time for an image sensing. The exposure time is controlled by controlling the time ΔS with which the signal φVPS can achieve the middle potential M. The time duration ΔS is controlled by the sensor exposure time control signal generator 522 by way of the timing generating circuit 31.

The signal φVD is used to control the potential in such a manner that the potential lies in an operation range of the amplifying circuit, namely, the source follower amplifier, or to perform offset adjustment with respect to a video signal or a noise signal. Vh, Vm, and Vl of the signal φVD respectively represent high potential, middle potential, and low potential of the signal φVD.

As mentioned above, the image sensor 30 is capable of acquiring an output signal obtained by linear conversion or log conversion according to the subject luminance, and has a photoelectric conversion characteristic 320 as shown in FIG. 10. As shown in FIG. 10, the photoelectric conversion characteristic 320 is divided into a linear characteristic area and a logarithmic characteristic area, with an inflection point 321 serving as a boundary. The inflection point 321 is a switching point from the linear characteristic area to the logarithmic characteristic area, and the output value of the image sensor 30 at the inflection point 321 is represented by Vth. Generally, in the linear characteristic area, high gradation performance can be secured with respect to the entirety of an image, namely, high contrast is obtained, although sensing of a subject in a wide luminance range is impossible, namely, the dynamic range is narrow. Accordingly, an image with high gradation performance and high quality can be obtained even from a dark subject, e.g., in a condition that a subject is captured in a cloudy weather or in a shadow. On the other hand, in the logarithmic characteristic area, sensing of a subject image in a wide luminance range is possible, namely, the dynamic range is wide, although the gradation is poor at a high luminance. Accordingly, a high-quality image with a large depth of field including a dark area can be obtained even if a subject is bright, e.g., in a condition that a subject is illuminated with direct sunlight, or direct sunlight is right behind the subject.

Figure 11:
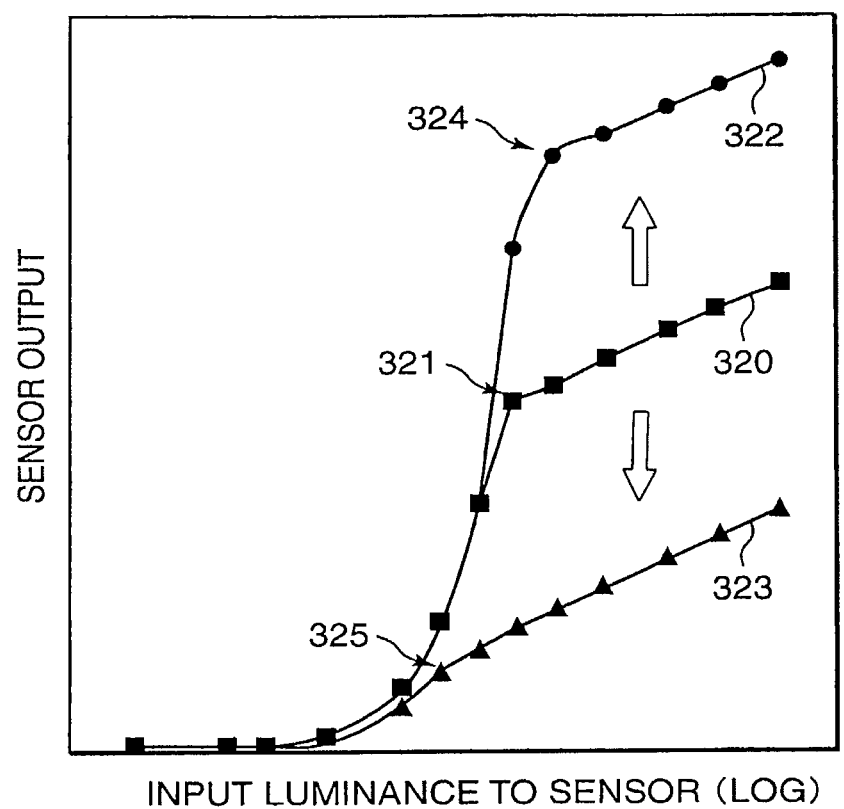
FIG. 11 is a graph for explaining how the photoelectric conversion characteristic of the image sensor is changed.

The photoelectric conversion characteristic 320, namely, the inflection point 321 can be changed or moved by changing a voltage difference of the signal φVPS inputted to the source of the transistor T2 between Hi and Low. Specifically, assuming that the Hi voltage of the signal φVPS is VPH, and the Low voltage thereof is VPL, then, as shown in FIG. 11, the photoelectric conversion characteristic 320, namely, the inflection point 321 can be desirably shifted to a photoelectric conversion characteristic 322, namely, to an inflection point 324 or to a photoelectric conversion characteristic 323, namely, to an inflection point 325 by changing the voltage difference ΔVPS (=VPH−VPL) (see FIG. 9). Thus, by changing the photoelectric conversion characteristic, the ratio of the linear characteristic area to the logarithmic characteristic area can be changed, whereby the photoelectric conversion characteristic having a relatively large ratio of the linear characteristic area, as exemplified by the photoelectric conversion characteristic 322, or the photoelectric conversion characteristic having a relatively large ratio of the logarithmic characteristic area, as exemplified by the photoelectric conversion characteristic 323 can be obtained. The photoelectric conversion characteristic may be changed in such a manner that the linear characteristic area or the logarithmic characteristic area occupies the entirety of the photoelectric conversion characteristic.

In this embodiment, the photoelectric conversion characteristic of the image sensor 30 is changed by changing the voltage difference ΔVPS, namely, by changing the voltage VPH. In FIG. 11, as the voltage VPH is increased, namely, the voltage difference ΔVPS is increased, the ratio of the linear characteristic area is increased, and consequently, the photoelectric conversion characteristic of the image sensor 30 approaches the photoelectric conversion characteristic 322. On the other hand, as the voltage VPH is decreased, namely, the voltage difference ΔVPS is decreased, the ratio of the logarithmic characteristic area is increased, and consequently, the photoelectric conversion characteristic of the image sensor 30 approaches the photoelectric conversion characteristic 323. The voltage VPH is controlled by the dynamic range control signal generator 521 by way of the timing generating circuit 31.

Alternatively, the time ΔT during which the signal φVPS corresponding to the voltage VPH is applied may be changed to change the photoelectric conversion characteristic as mentioned above. In such an altered arrangement, as the time ΔT is increased, the photoelectric conversion characteristic is changed in such a manner that the ratio of the linear characteristic area is increased, and conversely, as the time ΔT is decreased, the photoelectric conversion characteristic is changed in such a manner that the ratio of the logarithmic characteristic area is increased. In FIG. 11, the state that the time ΔT is relatively long corresponds to the photoelectric conversion characteristic 322, and the state that the time ΔT is relatively short corresponds to the photoelectric conversion characteristic 323.

(Evaluation Value Detecting Step S1)

Next, an exemplified process for acquiring evaluation values such as AE evaluation values by the evaluation value detector 405 of the signal processing section 40 is described.

Figure 12:
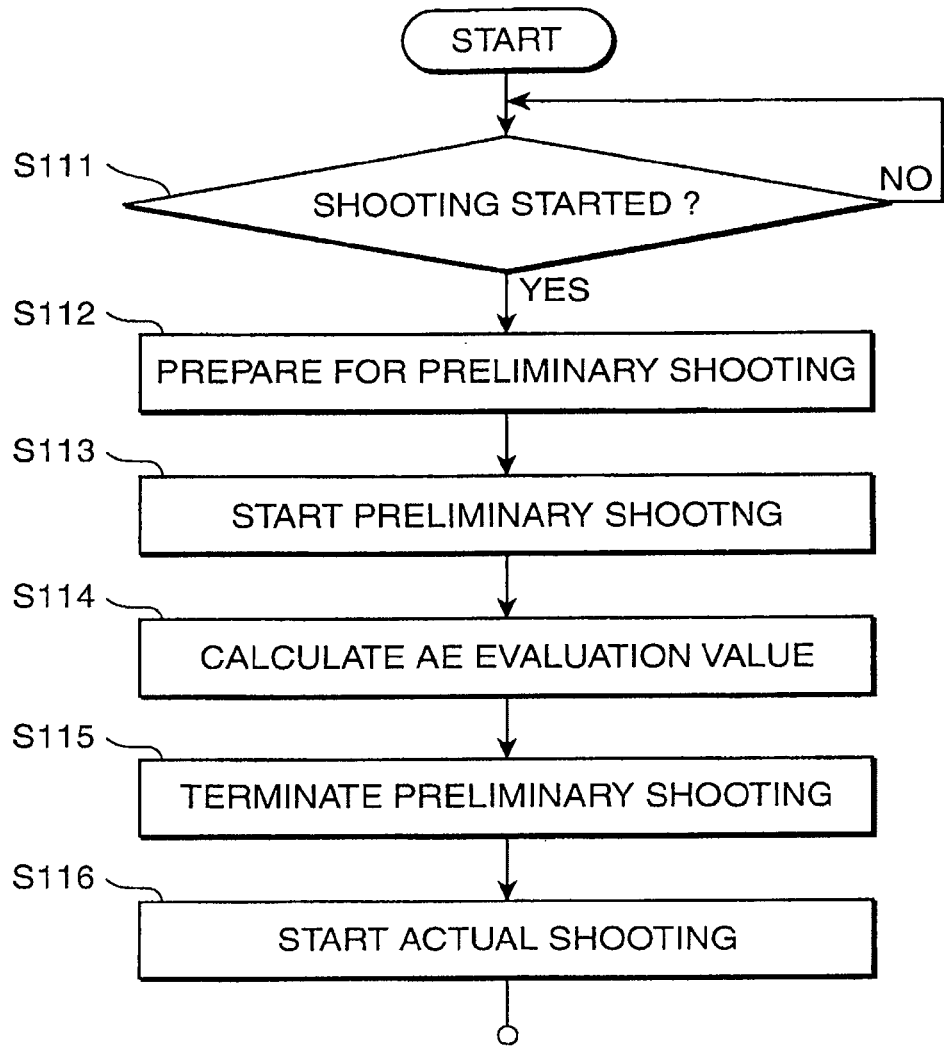
FIG. 12 is a flowchart showing an operation example of detecting evaluation values concerning a subject image such as AE evaluation values based on a still image actually captured by the image sensor.

(Step S1-1) Example of Detecting Evaluation Value Based on Still Image:

FIG. 12 is a flowchart illustrating an operation example of the digital camera 1 in the case where evaluation values such as AE evaluation values of a subject are detected based on a still image actually captured by the image sensor 30. Specifically, FIG. 12 shows a flow of preliminary shooting of capturing a still image for acquiring AE evaluation values, and calculating the AE evaluation values based on the image captured by the preliminary shooting before actual shooting of capturing a still image by the digital camera 1 according to the embodiment of the invention. The evaluation value detecting process is a process suitable for an image sensing apparatus such as a digital single lens reflex camera constructed such that a subject light image is incident onto an optical viewfinder without incident onto the image sensor 30 in preliminary shooting.

Referring to FIG. 12, first, it is confirmed whether shooting start has been designated in a state that the power supply switch 101 of the digital camera 1 is pressed, and the power of the digital camera 1 is turned on (Step S111). In response to manipulation of the release switch 102 e.g., halfway down pressing (YES in Step S111), an operation of preliminary shooting is initiated (Step S112).

In Step S112, dynamic range control for the preliminary shooting is conducted in conducting the preliminary shooting to calculate the AE evaluation values. The dynamic range control is conducted, so that the image sensor 30 has a possible maximum dynamic range to sense the subject luminance in a wide range. Specifically, since the preliminary shooting is conducted only one time before actual shooting in the digital single lens reflex camera or a like apparatus, the digital camera 1 is constructed in such a manner that a wide dynamic range is set to securely detect the subject luminance in whatsoever condition the subject may be.

In view of the above, the operation state of the image sensor 30 is controlled, so that the image sensor 30 implements a log conversion output operation in the entirety of the photoelectric conversion characteristic. Specifically, in response to halfway down pressing of the release switch 102, the main controller 50 outputs commands to the relevant elements to shift the digital camera 1 to the preliminary shooting mode. Upon receiving the command signal from the main controller 50, for example, the dynamic range control signal generator 521 generates a signal for varying the voltage difference ΔVPS of the signal φVPS inputted to the source of the transistor T2 as shown in FIG. 8. In this case, the signal is adapted for reducing the voltage difference ΔVPS (see FIG. 9). Thereby, the image sensor 30 is controlled in such a manner that the ratio of the logarithmic characteristic area is increased. Preferably, a logarithmic characteristic area occupies the entirety of the photoelectric conversion characteristic in the aspect of securing a wide dynamic range. However, it is possible to leave a linear characteristic area in the photoelectric conversion characteristic in place of allowing a logarithmic characteristic area to occupy the entirety of the photoelectric conversion characteristic.

Next, exposure control for preliminary shooting is conducted to execute the preliminary shooting (Step S113). For instance, the sensor exposure time control signal generator 522 generates a drive signal for setting the duration of the time ΔS, with which the signal φVPS can achieve a middle potential M, to a predetermined exposure time, and sends the drive signal to the timing generating circuit 31 to conduct exposure control or exposure amount control for preliminary shooting. Exposure control may be performed by causing the shutter driver 61 to control the shutter speed of the shutter 23 based on a control signal generated in the shutter control signal generator 523, and by causing the aperture driver 63 to control the diaphragm 22 based on a control signal generated in the aperture control signal generator 525. After the exposure control, the preliminary shooting of a still image is conducted. Then, the evaluation value detector 405 calculates AE evaluation values based on the image captured by the preliminary shooting (Step S114). The AE evaluation value calculating step will be described later in detail. After the calculation of the AE evaluation values, the preliminary shooting is terminated (Step S115). After the exposure control based on the AE evaluation values, actual shooting is started (Step S116). The above is what is to be implemented in acquiring the AE evaluation values. Similar steps are implemented to acquire the AF evaluation values and the WB evaluation values.

Figure 13:
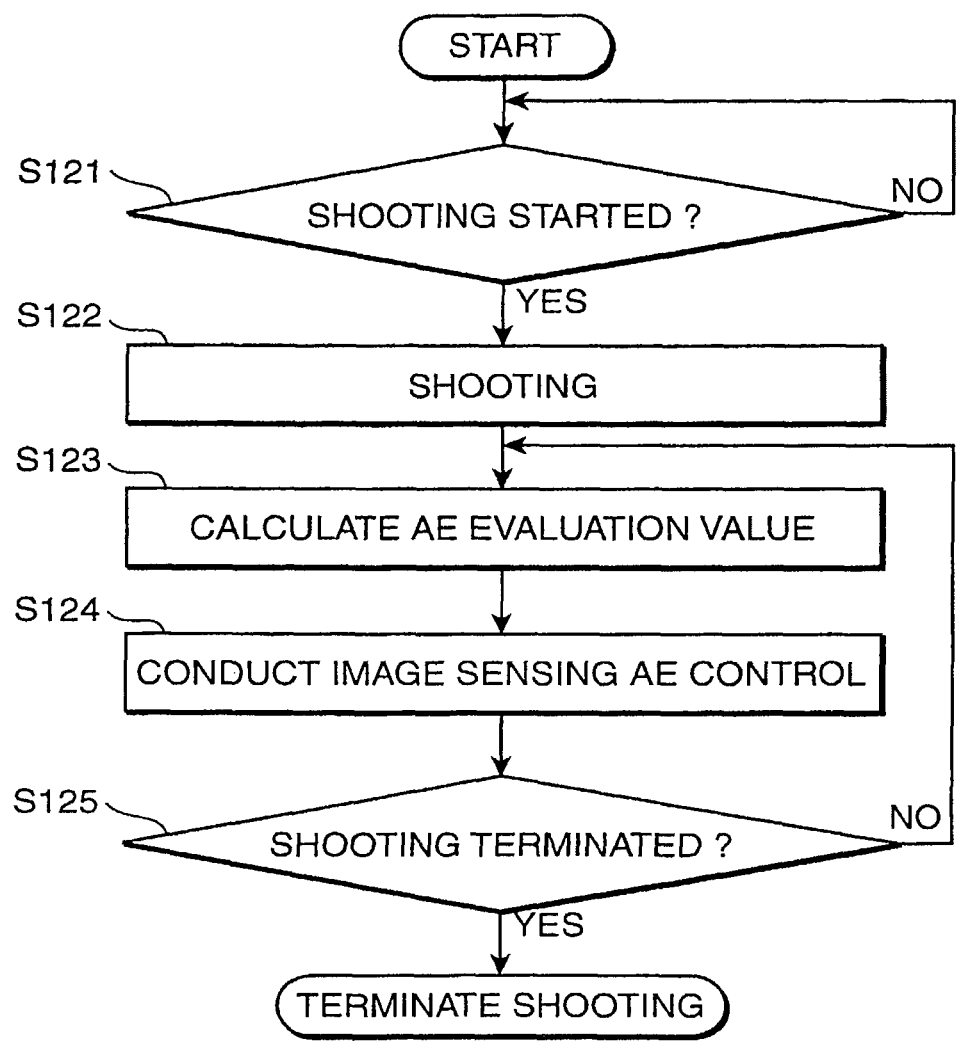
FIG. 13 is a flowchart showing an operation example of detecting evaluation values concerning the subject image such as AE evaluation values based on a moving image continuously captured by the image sensor.

(Step S1-2) Example of Detecting Evaluation Values Based on Moving Images:

FIG. 13 is a flowchart illustrating an operation example of the digital camera 1 in detecting evaluation values such as AE evaluation values of a subject based on a moving image that is continuously captured by the image sensor 30. Specifically, FIG. 13 shows a flow of calculating the AE evaluation values with use of all the frame images captured by the image sensor 30 in the case where the digital camera 1 is in a shooting standby state, or in the moving image shooting mode, or in the case where the image sensing apparatus according to the embodiment of the invention is applied to a digital movie camera.

Referring to FIG. 13, it is confirmed whether shooting start has been designated (Step S121). For instance, if the mode setting switch 105 is pressed to shift the digital camera 1 to the moving image shooting mode, and shooting start is confirmed (YES in Step S121), shooting of a moving image is initiated (Step S122). Respective control values on the image sensing dynamic range, the exposure time, and the aperture value at the time of shooting the moving image are set to initial values.

Subsequently, the evaluation value detector 405 calculates the AE evaluation values based on the image captured in Step S122 (Step S123). Then, based on the detected AE evaluation values, the dynamic range control signal generator 521 changes the setting of the signal φVPS to control the dynamic range, and the shutter 23 and the diaphragm 22 are controlled by control signals generated by the shutter drive signal generator 523 and the aperture control signal generator 525, whereby a specified AE control is carried out (Step S124)

Then, it is confirmed whether the shooting has been terminated (Step S125). If there is no command signal indicative of shooting termination (NO in Step S125), the routine returns to Step S123 to repeat the AE evaluation value calculation, and the AE control in Step S124. Specifically, in the moving image shooting, the steps of utilizing all the captured images as evaluation images for detecting the AE evaluation values, and conducting the AE control for next shooting based on the detected AE evaluation values are cyclically repeated. Alternatively, part of the captured images, e.g., one frame image per several frame images corresponding to the captured images, may be used as an evaluation image, in place of using all the captured images as evaluation images, and AE evaluation values may be acquired based on the evaluation image.

Figure 14:
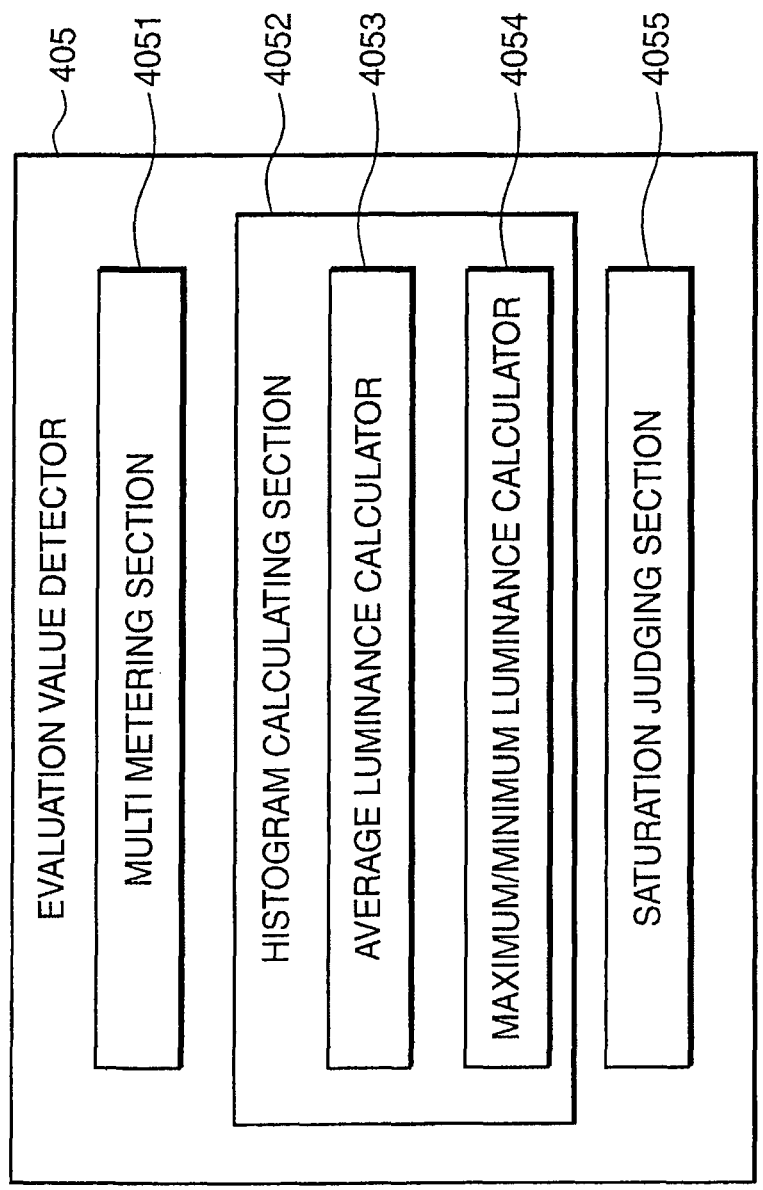
FIG. 14 is a functional block diagram for explaining functions of an evaluation value detector.

(Step S1-3) Calculation of Evaluation Values:

Next, the evaluation value calculating step in the above flow, namely, Steps S113 and S123, are described in detail. FIG. 14 is a block diagram of the evaluation value detector 405. The evaluation value detector 405 includes a multi-pattern metering section 4051, a histogram calculating section 4052, and a saturation judging section 4055.

The multi-pattern metering section 4051 conducts metering of a subject according to a multi-pattern metering system. Specifically, the multi-pattern metering section 4051 divides an image captured by the image sensor 30 into areas and blocks of a predetermined number, and detects the luminance of the captured image in the respective areas and blocks, based on image signals or image data.

FIG. 15 is an illustration showing a state as to how the image sensing area to be metered is divided by multi-pattern metering. Denoted by the reference numeral 330 is an image sensing area obtained by an image sensing operation by the image sensor 30. A subject image is captured or sensed within the image sensing area 330. The image sensing area 330 carries a multitude of pixel information concerning pixels constituting the image sensor 30, namely, luminance information concerning a subject image. The image sensing area 330 is divided into a central area, which is a central part of the image sensing area 330, and a peripheral area, which is a peripheral part around the central part. Further, the central area and the peripheral area are each divided into detection blocks of a predetermined number. For instance, the central area is divided into thirty-six detection blocks comprised of A, B, C, ... Z, AA, ..., and AJ, namely, detection blocks A through AJ, and the peripheral area is divided into sixteen detection blocks comprised of first through sixteenth detection blocks. In this embodiment, a subject image captured in the central area is called as "main subject image", a subject image captured in the peripheral area is called as "peripheral subject image", the central area is called as "main subject image area 331", and the peripheral area is called as "peripheral subject image area 332". The area defined by the detection blocks O, P, U, and V in the central part of the main subject image area 331 is called as "AF detecting area 333" where AF evaluation values are detected for focusing control. Further, the luminance of the captured image in the main subject image area 331 is called as "main subject luminance", and the luminance of the captured image in the peripheral subject image area 332 is called as "peripheral subject luminance".

Figure 16A:
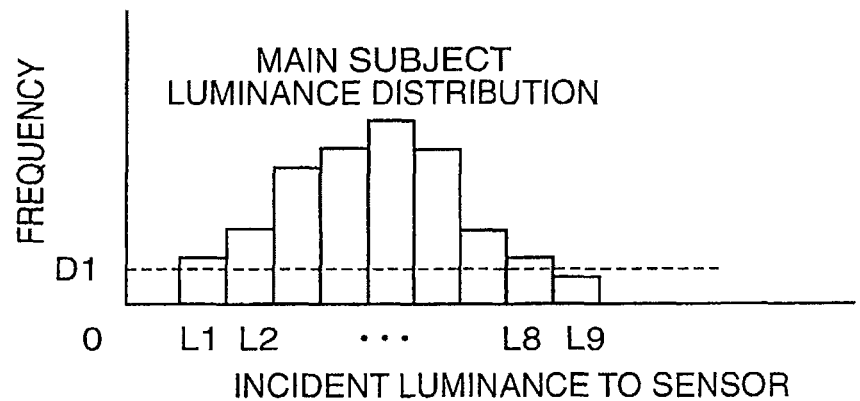
Figure 16B:
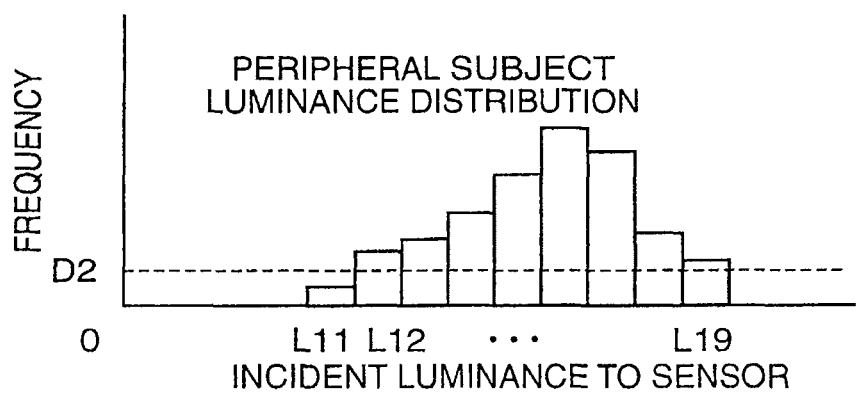

The histogram calculating section 4052 calculates a histogram, namely, distribution of a main subject luminance with respect to each of the detection blocks A through AJ, and calculates a histogram of the main subject luminance in the entirety of the main subject image area 331, namely, a main subject entire luminance histogram, as shown in FIG. 16A, with use of the main subject luminance histograms with respect to the detection blocks A through AJ. Further, the histogram calculating section 4052 calculates a histogram of a peripheral subject luminance with respect to each of the first through sixteenth detection blocks, and calculates a histogram of the peripheral subject luminance in the entirety of the peripheral subject image area 332, namely, a peripheral subject entire luminance histogram, as shown in FIG. 16B, with use of the peripheral subject luminance histograms with respect to the first through sixteenth detection blocks.

Further, the histogram calculating section 4052 calculates the luminance range of the entirety of the main subject image and the luminance range of the entirety of the peripheral subject image with use of the main subject entire luminance histogram and the peripheral subject entire luminance histogram, respectively. In calculating, a so-called "Gaussian pruning" is applied using a specified threshold value. For the main subject, the luminance data is cut back at a threshold value D1 as shown in FIG. 16A, and a range defined by a minimum L1 and a maximum value L8 of luminances having frequencies equal to or above D1 is set as a main subject entire luminance range. Similarly, for the peripheral subject, the luminance data is cut back at a threshold value D2 as shown in FIG. 16B, and a range defined by a minimum value L12 and a maximum value L19 of luminances having frequencies equal to or above D2 is set as a peripheral subject entire luminance range. This Gaussian pruning using the threshold values is applied for reducing errors caused by noise or the like. Although the luminances of the respective luminance histograms shown in FIGS. 16A and 16B are identified by L1 to L19 here for the sake of convenience, they are actually expressed in 256 stages or gradations and can be identified by L1 to L256, for example, in the case of handling image data of eight bits.

The histogram calculating section 4052 has an average luminance calculator 4053 and a maximum/minimum luminance calculator 4054. The average luminance calculator 4053 calculates an average luminance of the main subject image with respect to each of the detection blocks A through AJ, and an average luminance of the peripheral subject image with respect to each of the first through sixteenth detection blocks. The average luminance is calculated with respect to each of the color components R, G, and B. In calculating the average luminances, a histogram of the main subject luminance with respect to each of the detection blocks A through AJ, and a histogram of the peripheral subject luminance with respect to each of the first through sixteenth detection blocks are calculated, and the Gaussian pruning with use of specified threshold values is applied in a similar manner as calculating the main subject entire luminance range and the peripheral subject entire luminance range. The average luminance of the main subject image with respect to each of the detection blocks A through AJ, and the average luminance of the peripheral subject image with respect to each of the first through sixteenth detection blocks are obtained by averaging the luminances after the Gaussian pruning.

The maximum/minimum luminance calculator 4054 calculates a maximum/minimum luminance of the main subject image with respect to each of the detection blocks A through AJ, and a maximum/minimum luminance of the peripheral subject image with respect to each of the first through sixteenth detection blocks. Similarly to the above, the Gaussian pruning with use of predetermined threshold values is applied with respect to the main subject luminance histograms and the peripheral subject luminance histograms which have been calculated with respect to the detection blocks A through AJ, and the first through sixteenth detection blocks, and the maximum/minimum luminance of the main subject image with respect to each of the detection blocks A through AJ, and the maximum/minimum luminance of the peripheral subject image with respect to each of the first through sixteenth detection blocks are calculated based on the luminances or luminance ranges after the Gaussian pruning.

The histogram calculating section 4052 calculates a subject image entire luminance histogram in the entire image sensing area, namely, the image sensing area 330, based on the main subject entire luminance histogram and the peripheral subject entire luminance histogram, so that the subject image entire luminance histogram can be used in judging the saturation by the saturation judging section 4055, which will be described later. The saturation judging section 4055 judges whether output of the image sensor 30 has been saturated at the time of detecting the AE evaluation values, or the AF evaluation values, or the WB evaluation values based on the subject image entire luminance histogram calculated by the histogram calculating section 4052.

Figure 17:
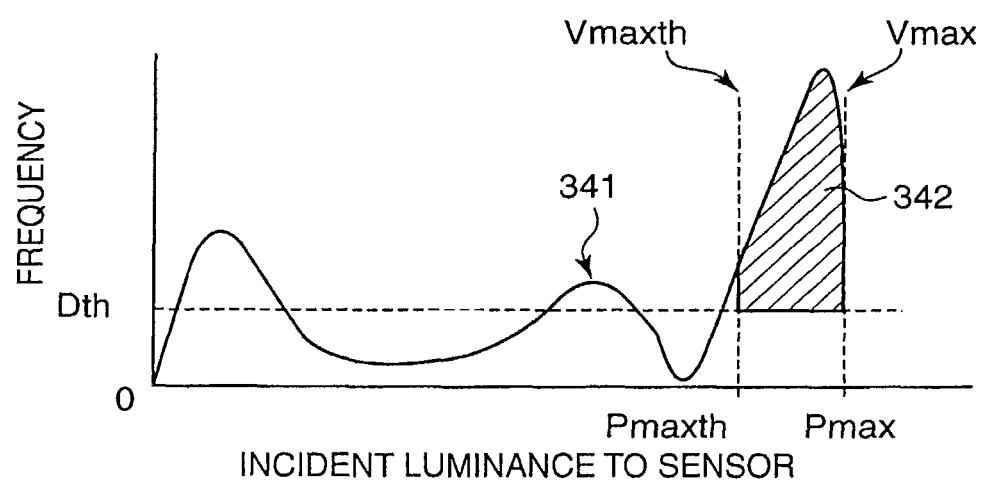
FIG. 17 is a graph showing an example of a subject image entire luminance histogram when the output of the image sensor is saturated.

FIG. 17 is an illustration showing an example of the subject image entire luminance histogram at the time of saturation. In FIG. 17, Pmax represents an incident luminance or a saturation luminance of the image sensor 30 when the image sensor 30 reaches the saturation output level Vmax, which is a physically maximum value in output level of the image sensor 30, and Pmaxth represents an incident luminance or a luminance threshold of the image sensor 30 relative to sensor output Vmaxth, which is set as a threshold value for judging whether the output of the image sensor 30 is saturated or not. Dth represents a frequency or a frequency threshold which has been set as a threshold value for judging whether the output of the image sensor 30 is saturated or not.

The saturation judging section 4055 calculates the total frequency in a hatched area (hereinafter, called as "saturated area 342") indicated by the reference numeral 342 in FIG. 17, wherein the luminance is not smaller than the luminance threshold Pmaxth and not smaller than the frequency threshold Dth, namely, the total number of pixels in the saturated area 342, which is called as "saturated pixel number". The saturation judging section 4055 judges that the output level of the image sensor 30 is saturated if the saturated pixel number is not smaller than a predetermined value. On the other hand, the saturation judging section 4055 judges that the output level of the image sensor 30 is not saturated if the saturated pixel number is smaller than the predetermined value. Alternatively, judgment as to whether the output level of the image sensor 30 is saturated may be made based solely on the frequency of the saturated luminance Pmax, namely, based on the pixel number having the saturated luminance Pmax.

As mentioned above, the evaluation value detector 405 performs the multi-pattern metering, and detects information relating to the average luminances, the maximum/minimum luminances, the luminance histograms, the luminance ranges, or a like parameter, as the AE evaluation values or the AF evaluation values, or the WB evaluation values based on the luminance information or image data in each of the detection blocks of the main subject image area 331 and the peripheral subject image area 332. The data concerning the evaluation values are outputted to the relevant parameter calculators of the calculating section 510. For instance, if the evaluation values are AE evaluation values, the AE evaluation values are outputted to the AE control parameter calculating unit 5110. If the evaluation values are AF evaluation values, the AF evaluation values are outputted to the AF control parameter calculator 513. If the evaluation values are WB evaluation values, the WB evaluation values are outputted to the WB control parameter calculator 514. Upon receiving the respective evaluation values, the respective calculators calculate the control parameters based on the evaluation values.

(AE Control Parameter Calculating Step S2)

In this embodiment, a subject luminance for exposure setting is determined based on the detected AE evaluation values, and the AE control parameter calculating unit 5110 (see FIG. 4) calculates an AE control parameter, so that the output of the image sensor 30 corresponding to the subject luminance for exposure setting is obtained from the linear characteristic area of the image sensor 30. The subject luminance for exposure setting can be arbitrarily determined. However, it is desirable to select the AE evaluation values such as the luminance range and the average luminance of the main subject image, which are acquired from the main subject image, to capture the main subject image with good contrast.

Figure 18A:
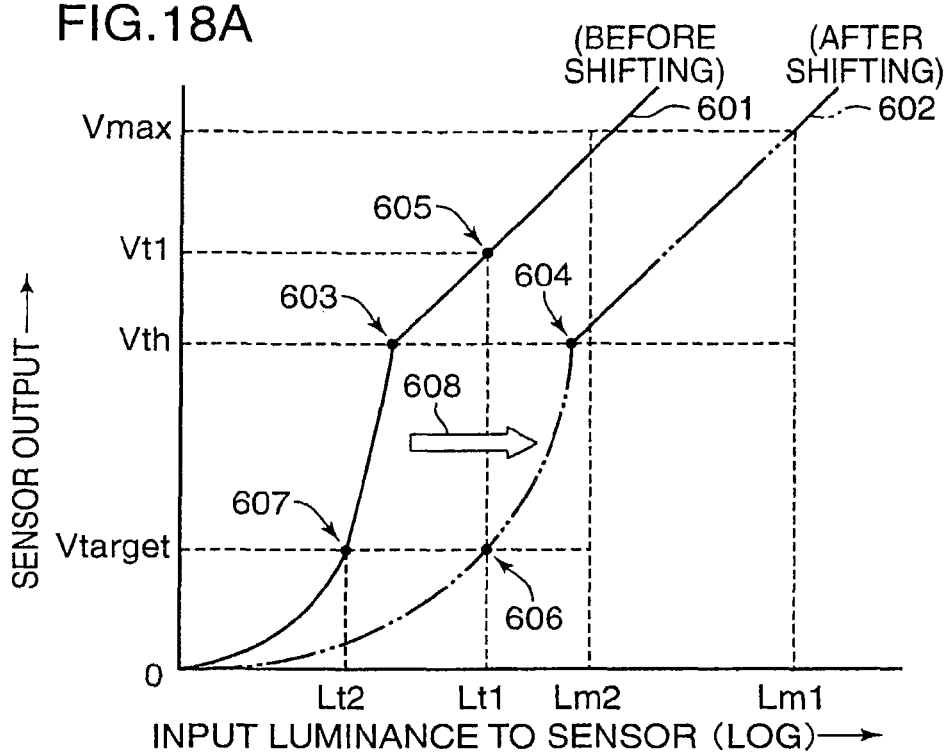
Figure 18B:
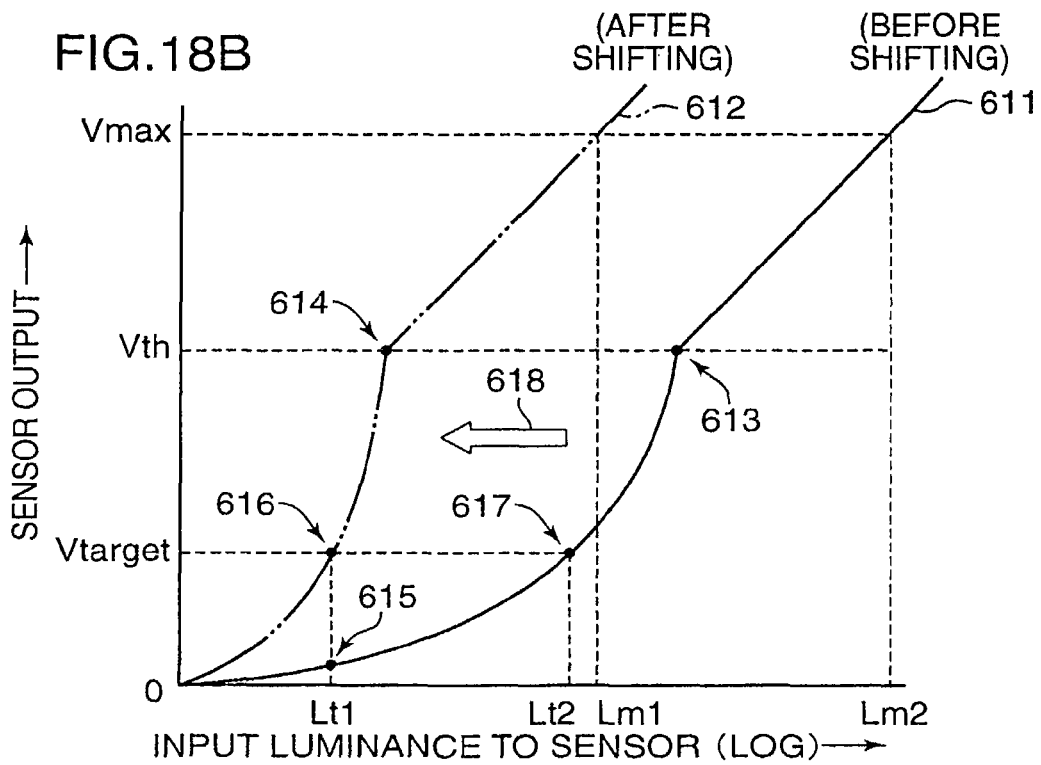
Figure 19:
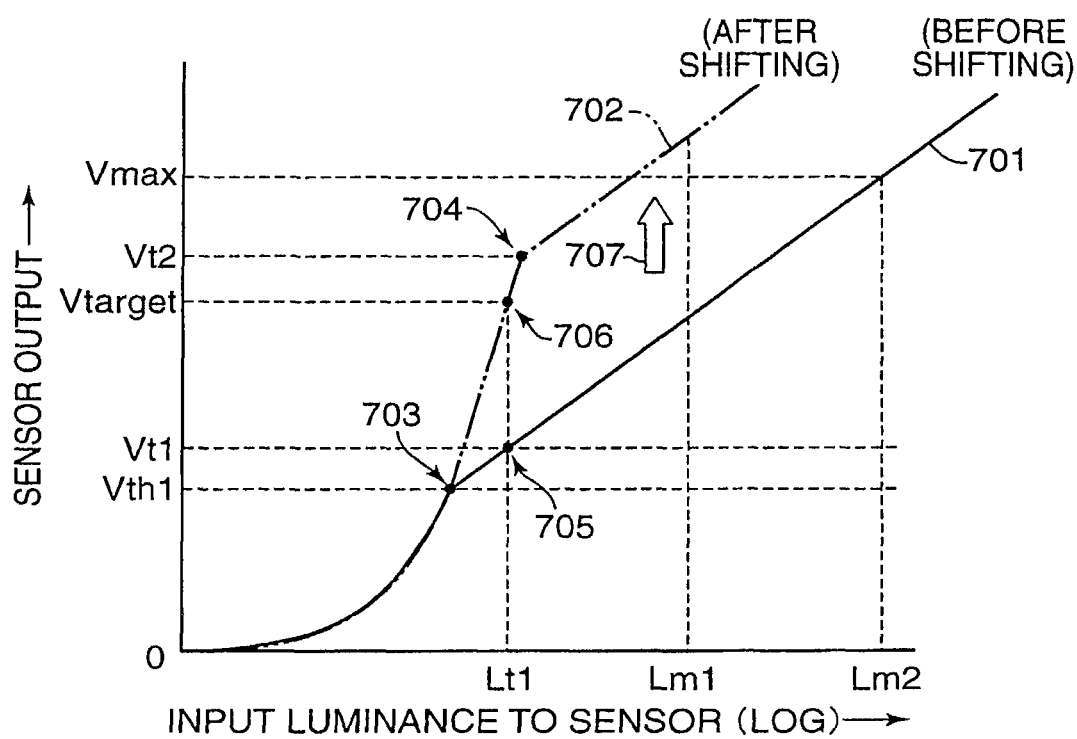
FIG. 19 is a graph for explaining how the photoelectric conversion characteristic of the image sensor is changed if AE control is performed by dynamic range control.

In performing AE control in this embodiment, a method of controlling the exposure amount to the image sensor 30, and a method of controlling the dynamic range are proposed as a method for obtaining the output of the image sensor 30 corresponding to the subject luminance from the linear characteristic area of the image sensor 30. FIGS. 18A through 19 are graphs showing how the photoelectric conversion characteristic of the image sensor 30 is changed in performing AE control. FIGS. 18A and 18B show change of the photoelectric conversion characteristic in performing exposure amount control, and FIG. 19 shows change of the photoelectric conversion characteristic in performing dynamic range control. In FIGS. 18A through 19, the axis of abscissas represents an incident luminance to the image sensor 30, and the axis of ordinate represents an output level of the image sensor 30, wherein the axis of abscissas is represented in terms of log coordinates, namely, log values of incident luminances to the image sensor 30. Throughout the specification and the claims, the incident luminance to the image sensor 30 means a subject luminance that has been incident onto the image sensor 30, and hereinafter, simply called as "luminance".

The exposure amount control and the dynamic range control are performed based on the following controls (A) and (B), respectively.

(A) Exposure amount control based on control of the exposure time of the shutter 23 and/or the image sensor 30, namely, the opening time of the shutter 23 and/or the integration time of the image sensor 30, and/or the aperture area of the diaphragm 22.

(B) Dynamic range control based on control of the photoelectric conversion characteristic of the image sensor 30, specifically, control of the position of the inflection point of the photoelectric conversion characteristic (see FIG. 19).

(Step S2-1) Calculation of Exposure Amount Control Parameter:

First, exposure amount control (A) is described referring to FIGS. 18A and 18B. FIG. 18A shows a case that the subject luminance for exposure setting based on the AE evaluation values is located in the logarithmic characteristic area, and the exposure amount is controlled to conduct an image sensing operation in the linear characteristic area. FIG. 18B shows a case that the subject luminance for exposure setting based on the AE evaluation values is located in a relatively low output level area of the linear characteristic area, and the exposure amount is controlled to conduct an image sensing operation in a relatively high output level area of the linear characteristic area.

In FIG. 18A, a photoelectric conversion characteristic 601 is a photoelectric conversion characteristic of the image sensor 30 at the time of acquiring the AE evaluation values stored in the photoelectric conversion characteristic information storage 516. The photoelectric conversion characteristic 601 is divided into a linear characteristic area and a logarithmic characteristic area, with the inflection point 603, namely, the sensor output Vth, serving as a boundary. The exposure amount control parameter calculator 511 calculates an exposure amount control parameter, namely, an exposure amount setting value for obtaining an exposure amount, based on which the photoelectric conversion characteristic 601 is changed to a photoelectric conversion characteristic 602 capable of obtaining a predetermined sensor output corresponding to the subject luminance for exposure setting. Namely, the exposure amount control parameter calculator 511 calculates an exposure time setting value for controlling the exposure time, and an aperture setting value for controlling the aperture area of the diaphragm 22. In other words, the exposure amount control parameter is calculated based on the subject luminance for exposure setting based on the AE evaluation values, and the photoelectric conversion characteristic 601 stored in the photoelectric conversion characteristic information storage 516.

Here is calculated the photoelectric conversion characteristic 602 in such a manner that the sensor output at the point 605 corresponding to a specified luminance Lt1 for exposure amount setting in the linear characteristic area of the photoelectric conversion characteristic 601 becomes a sensor output Vtarget at the point 606 in the linear characteristic area. In other words, the new photoelectric conversion characteristic 602 is obtained, so that the sensor output, namely, the point 605 corresponding to the luminance Lt1 in the logarithmic characteristic area of the photoelectric conversion characteristic 601 coincides with the point 606 in the linear characteristic area in terms of graphical expression by changing or shifting the photoelectric conversion characteristic 601 to the photoelectric conversion characteristic 602 passing the point 606 in a direction shown by the arrow 608. At this time, the inflection point 603 is shifted in parallel to the inflection point 604, and the sensor output Vth does not change. The sensor output Vtarget is a target output, and is set to a predetermined value. The sensor output Vtarget is stored in the exposure amount control parameter calculator 511 or a like device.

More specifically, the exposure time setting value or the aperture setting value capable of decreasing the exposure amount is calculated in such a manner that the sensor output corresponding to the luminance Lt1 is decreased from Vt1 at the point 605 in the logarithmic characteristic area of the photoelectric conversion characteristic 601 to Vtarget at the point 606, namely, the sensor output is decreased relative to the same magnitude of luminance. In other words, the exposure amount control parameter calculator 511 calculates the exposure time setting value or the aperture setting value capable of decreasing the exposure amount in such a manner that the luminance corresponding to the target output Vtarget is changed from Lt2 at the point 607 to Lt1, namely, the luminance for obtaining the target output Vtarget is not smaller than the predetermined value Lt1 (>Lt2). At the time of decreasing the exposure amount, the opening time of the shutter 23 or the integration time of the image sensor 30 is reduced, and the aperture area of the diaphragm 22 is reduced based on the exposure time setting value or the aperture setting value.

In shifting the photoelectric conversion characteristic from the photoelectric conversion characteristic 601 to the photoelectric conversion characteristic 602, the luminance corresponding to Vmax is increased from Lm2 to Lm1, and consequently, the dynamic range is increased. Vmax is a maximal output value of the image sensor 30, namely, a saturated output level of the image sensor 30. The saturated output level Vmax may be an arbitrarily set value, e.g., a value slightly lower than the actual maximum value.

Next, in FIG. 18B, a photoelectric conversion characteristic 611 is photoelectric conversion characteristic of the image sensor 30 at the time of acquiring the AE evaluation values stored in the photoelectric conversion characteristic information storage 516. Similarly to the photoelectric conversion characteristic 601, the photoelectric conversion characteristic 611 is divided into a linear characteristic area and a logarithmic characteristic area, with the inflection point 613, namely, the sensor output Vth, serving as a boundary.

Referring to FIG. 18B, the subject luminance Lt1 for exposure setting is located in a relatively low output level area at the point 615 in the linear characteristic area of the photoelectric conversion characteristic 611. Accordingly, the exposure control parameter calculator 511 calculates a photoelectric conversion characteristic 612 in such a manner that the sensor output at the point 615 corresponding to the luminance Lt1 in the linear characteristic area of the photoelectric conversion characteristic 611 becomes the target output Vtarget at the point 616. In other words, the new photoelectric conversion characteristic 612 is obtained in such a manner that the sensor output, namely, the point 615 corresponding to the luminance Lt1 in the relatively low output level area of the linear characteristic area of the photoelectric conversion characteristic 611 coincides with the point 616 in a relatively high output level area of the linear characteristic area in terms of graphical expression by changing or shifting the photoelectric conversion characteristic from the photoelectric conversion characteristic 611 to the photoelectric conversion characteristic 612 passing the point 616 in a direction shown by the arrow 618. At this time, the inflection point 613 is shifted in parallel to the inflection point 614, and the sensor output Vth does not change.

More specifically, the exposure time setting value or the aperture setting value capable of increasing the exposure amount is calculated in such a manner that the sensor output corresponding to the luminance Lt1 is increased from the sensor output at the point 615 to the target output Vtarget at the point 616, namely, the sensor output is increased relative to the same magnitude of luminance. In other words, the exposure amount control parameter calculator 511 calculates the exposure time setting value or the aperture setting value capable of increasing the exposure amount in such a manner that the luminance Lt2 at the point 617 corresponding to the target output Vtarget is shifted to Lt1, namely, the luminance for obtaining the target output Vtarget is as small as Lt1 (<Lt2). At the time of increasing the exposure amount, the opening time of the shutter 23 or the integration time of the image sensor 30 is increased, and the aperture ratio of the diaphragm 22 is increased based on the exposure time setting value or the aperture setting value. As the photoelectric conversion characteristic 611 is shifted to the photoelectric conversion characteristic 612, the luminance corresponding to the sensor output Vmax is changed or lowered from Lm2 to Lm1, and consequently, the dynamic range is reduced.

In the aforementioned exposure amount control parameter calculating step, the photoelectric conversion characteristic is not changed or shifted if the photoelectric conversion characteristic at the time of obtaining the AE evaluation values has a feature that the target output Vtarget can be already obtained in relation to the luminance for exposure amount setting as described above. However, in such a case, even if the exposure time setting value and the aperture setting value take the same values as those when the AE evaluation values were obtained last time, the exposure time setting value and the aperture setting value may be calculated this time.

(Step S2-2) Calculation of Dynamic Range Control Parameter:

Next, the dynamic range control (B) is described referring to FIG. 19. FIG. 19 shows a case that the subject luminance for exposure setting based on the AE evaluation values is located in the logarithmic characteristic area, and the dynamic range is controlled to conduct an image sensing operation in the linear characteristic area. Referring to FIG. 19, a photoelectric conversion characteristic 701 is a photoelectric conversion characteristic of the image sensor 30 at the time of acquiring the AE evaluation values stored in the photoelectric conversion characteristic information storage 516. The photoelectric conversion characteristic 701 is divided into a linear characteristic area and a logarithmic characteristic area, with the inflection point 703, namely, the sensor output Vth1, serving as a boundary.

The dynamic range control parameter, namely, the photoelectric conversion characteristic setting value is a control value for the photoelectric conversion characteristic, based on which the photoelectric conversion characteristic 701 is changed to a photoelectric conversion characteristic 702, so that a predetermined sensor output corresponding to a predetermined luminance for setting the dynamic range, namely, the subject luminance for exposure setting is obtained. In other words, the subject luminance is obtained in terms of sensor output in the linear characteristic area. The photoelectric conversion characteristic setting value is calculated by the dynamic range control parameter calculator 512. Namely, the dynamic range control parameter is calculated based on the subject luminance for exposure setting based on the AE evaluation values, and the photoelectric conversion characteristic 701 stored in the photoelectric conversion characteristic information storage 516.

The photoelectric conversion characteristic 702 is calculated to match the sensor output Vt1 at the point 705 in the logarithmic characteristic area corresponding to the luminance Lt1, namely, the subject luminance for exposure setting in the linear characteristic area of the photoelectric conversion characteristic 701 with the target output Vtarget at the point 706 in the linear characteristic area. In other words, the dynamic range control parameter calculator 512 calculates a photoelectric conversion characteristic setting value based on which the photoelectric conversion characteristic 701 is changed or shifted to the new photoelectric conversion characteristic 702 passing the point 706 in a direction shown by the arrow 707. Namely, the new photoelectric conversion characteristic 702 is calculated in such a manner that the sensor output, namely, the point 705 corresponding to the luminance Lt1 in the logarithmic characteristic area of the photoelectric conversion characteristic 701 coincides with the point 706 in the linear characteristic area in terms of graphical expression.

More specifically, the dynamic range control parameter calculator 512 calculates the photoelectric conversion characteristic setting value capable of setting the current photoelectric conversion characteristic 701 having the inflection point 703 to the new photoelectric conversion characteristic 702 having the inflection point 704 whose output level is higher than that of the inflection point 703 by increasing the sensor output corresponding to the inflection point of the photoelectric conversion characteristic from Vth1 to Vth2, namely, by handling the luminance Lt1 in a fixed manner. The calculated photoelectric conversion characteristic setting value is outputted to the dynamic range control signal generator 521, which, in turn, generates a predetermined drive signal. Thereby, the sensor output Vt1 corresponding to the luminance Lt1, which has been obtained from the logarithmic characteristic area of the photoelectric conversion characteristic 701, is obtained from the linear characteristic area of the photoelectric conversion characteristic 702, whereby the target output Vtarget at the point 706 of the linear characteristic area is obtained. As the photoelectric conversion characteristic is shifted from the photoelectric conversion characteristic 701 to the photoelectric conversion characteristic 702, the luminance corresponding to the sensor output Vmax is changed, namely decreased from Lm2 to Lm1, and consequently, the dynamic range is decreased.

In the dynamic range control, it is impossible to control the image sensor 30 in such a manner that an image sensing operation is conducted in a relatively high output level area of the linear characteristic area if the subject luminance for exposure setting is located in a relatively low output level area of the linear characteristic area, whereas such a control is possible in the exposure amount control. This is because characteristic trajectories in the linear characteristic areas of the photoelectric conversion characteristics 701 and 702 do not change even if the inflection point is changed. In view of this, it is preferable to conduct the exposure amount control in combination with the dynamic range control to obtain high contrast.

In the aforementioned dynamic range control parameter calculating step, the photoelectric conversion characteristic is not changed or moved if the photoelectric conversion characteristic at the time of acquiring the AE evaluation values has a feature that the target output Vtarget corresponding to the luminance for exposure setting is obtained from the linear characteristic area. However, in such a case, even if the exposure time setting value and the aperture setting value take the same values as those when the AE evaluation values were obtained last time, the exposure time setting value and the aperture setting value may be calculated this time.

In this way, by AE control through the exposure amount control (A) and/or the dynamic range control (B), it is possible to capture the main subject image with an appropriate luminance for exposure amount setting in the linear characteristic area of the photoelectric conversion characteristic and to attain a predetermined sensor output.

(Detailed Description on Exposure Amount Control Parameter Calculating Process)

In this section, calculation of an exposure amount control parameter, namely, an exposure time setting value and an aperture setting value to be implemented by the exposure amount control parameter calculator 511 based on the AE evaluation values detected by the evaluation value detector 405 is described in detail in the case where the exposure amount control shown in FIG. 18A is conducted.

Figure 20:
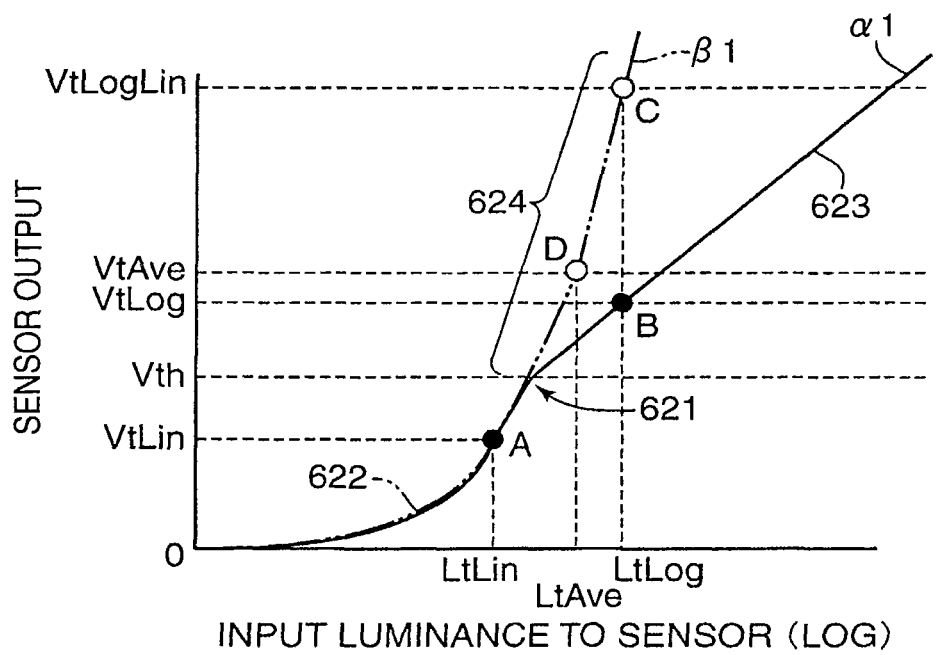
FIG. 20 is a graph for explaining a linear conversion process in calculating an exposure amount control parameter.

FIG. 20 is an illustration showing an example of a calculation process for matching the sensor output corresponding to the luminance Lt1 in FIG. 18A, namely, the luminance for exposure amount setting, with the target output Vtarget. Referring to FIG. 20, the curve denoted by the reference numeral α1 represents a photoelectric conversion characteristic at the time of acquiring the AE evaluation values. The photoelectric conversion characteristic α1 is divided into a linear characteristic area 622 and a logarithmic characteristic area 623, with the inflection point 621, namely, the sensor output Vth, serving as a boundary. The curve denoted by the reference numeral 131 represents a photoelectric conversion characteristic comprised of a linear characteristic area in its entirety, which is obtained by converting the logarithmic characteristic area 623 in the photoelectric conversion characteristic α1 to a linear characteristic area 624.

In FIG. 20, the luminance LtLin at the point A is an average luminance in the linear characteristic area 622 of the photoelectric conversion characteristic α1, with its sensor output VtLin corresponding to the luminance LtLin. The luminance LtLog at the point B is an average luminance in the logarithmic characteristic area 623 of the photoelectric conversion characteristic α1, with its sensor output VtLog corresponding to the luminance LtLog. First, data conversion is conducted, so that the point B corresponding to the luminance LtLog in the logarithmic characteristic area of the photoelectric conversion characteristic α1 is shifted to the point C in the linear characteristic area 624, namely, the sensor output VtLog corresponding to the luminance LtLog in the logarithmic characteristic area 623 coincides with the sensor output VtLogLin in the linear characteristic area 624. By implementing this data conversion, all the data in the photoelectric conversion characteristic α1 can be handled as data in the linear characteristic area 624. The data conversion from the logarithmic characteristic area 623 of the photoelectric conversion characteristic α1 to the linear characteristic area 624 of the photoelectric conversion characteristic β1 is performed with use of a lookup table stored in the LUT storage 518. Then, the sensor output VtAve at the point D is calculated by implementing the following equation, with use of the sensor output VtLin at the point A and the sensor output VtLogLin at the point C. The luminance LtAve corresponding to the sensor output VtAve corresponds to the luminance Lt1 for exposure amount setting in FIG. 18A, namely, the subject luminance for exposure setting.

$$VtAve = (VtLin \cdot k1) + (VtLogLin \cdot (1-k1))$$

where k1=m/(m+n), m: total number of pixels used in calculation of luminance LtLin at point A, and n: total number of pixels used in calculation of luminance LtLog at point B.

In this way, the sensor outputs VtLin and VtlogLin are calculated based on the luminances LtLin and LtLog, and the sensor output VtAve is calculated based on the sensor outputs VtLin and VtLogLin.

Next, the following computation is implemented to obtain a gain (Gain) of the exposure amount for making the sensor output VtAve coincident with the target output Vtarget shown in FIG. 18A, a gain Gt of the exposure time and a gain Gs of the aperture value based on the exposure amount gain (Gain), an exposure time T2 based on the exposure time gain Gt, and an aperture area S2 based on the aperture gain Gs. Calculation of the gains Gt and Gs with use of the respective equations is performed according to the flowchart shown in FIG. 21.

$$Gain = Vtarget/VtAve$$

$$Gt \cdot Gs = Gain$$

<Equations for Calculating the Exposure Time Gain>

$$Tmax/T1 = Gtmax \text{ (maximum gain of the exposure time)}$$

$$Tmin/T1 = Gtmin \text{ (minimum gain of the exposure time)}$$

$$Gain/Gtmax = GGtmax \text{ (gain for compensating for insufficiency at the maximum gain)}$$

$$Gain/Gtmin = GGtmin \text{ (gain for compensating for insufficiency at the minimum gain)}$$

$$T2 = T1 \cdot Gt$$

where T1: exposure time at the time of detecting the AE evaluation values,

T2: exposure time after the AE correction,

Tmax: maximum exposure time of the image sensor 30, and

Tmin: minimum exposure time of the image sensor 30.

<Equations for Calculating the Aperture Gain>

$$Smax/S1 = Gsmax \text{ (maximum gain of the aperture value)}$$

$$Smin/S1 = Gsmin \text{ (minimum gain of the aperture value)}$$

$$Gain/Gsmax = GGsmax \text{ (gain for compensating for insufficiency at the maximum gain)}$$

$$Gain/Gsmin = GGsmin \text{ (gain for compensating for insufficiency at the minimum gain)}$$

$$S2 = S1 \cdot Gs$$

where S1: aperture area at the time of detecting the AE evaluation values,

S2: aperture area after the AE correction,

Smax: maximum aperture ratio of the diaphragm 22, and

Smin: minimum aperture ratio of the diaphragm 22.

Figure 21:
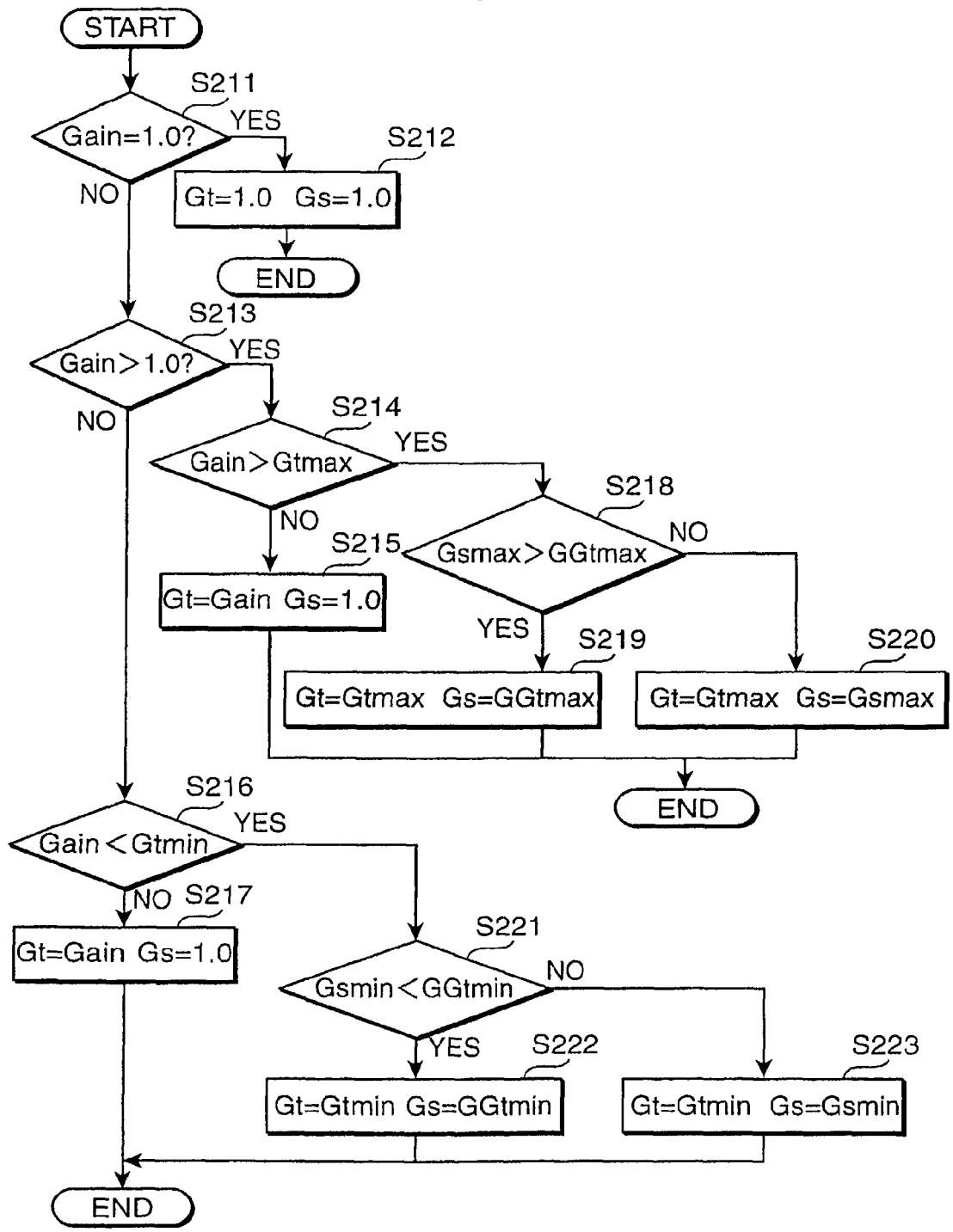
FIG. 21 is a flowchart showing an example of a flow of calculating the exposure amount control parameter.

As shown in FIG. 21, if VtAve is equal to Vtarget, namely, if the exposure amount gain (Gain)=1.0, and there is no need of exposure amount control, namely, no change of the exposure amount control parameter (YES in Step S211), the exposure time gain Gt=1.0, and the aperture gain Gs=1.0 (Step 212). Accordingly, the exposure time and the aperture area are not changed. On the other hand, if Gain 1.0 (NO in Step S211), and Gain>1.0 (YES in Step S213), and Gain≦Gtmax (NO in Step S214), namely, if the exposure amount gain (Gain) is larger than 1.0, exposure amount control is necessary, and the exposure amount gain (Gain) can be handled by the exposure time gain Gt, namely, Gt≦Gtmax, then, Gt=Gain, and Gs=1.0 (Step S215).

If Gain≦1.0 (NO in Step S213), and Gain≧Gtmin (NO in Step S216), similarly to Step S215, the exposure amount gain (Gain) is smaller than 1.0, exposure amount control is necessary, and the exposure amount gain (Gain) can be handled by the exposure time gain Gt, namely, Gt≧Gtmin, then, Gt=Gain, and Gs=1.0 (Step S217).

If Gain>Gtmax (YES in Step S214), and Gsmax>GGtmax (YES in Step S218), then Gt=Gtmax, and Gs=GGtmax (Step S219). In Step S219, the exposure amount gain (Gain) is larger than the maximum exposure time gain Gtmax, and it is impossible to handle the exposure amount gain (Gain) by the exposure time gain Gt without changing the aperture gain Gs (=1.0). Accordingly, insufficiency of the exposure time gain Gt with respect to the exposure amount gain (Gain) is handled, namely, compensated for by changing the aperture gain Gs. The gain GGtmax for compensating for insufficiency at the maximum exposure time gain Gtmax is used as the aperture gain Gs. The gain GGtmax is used in the above control because the gain GGtmax is smaller than the maximum aperture gain Gsmax, namely, there is no need of using the maximum aperture gain Gsmax. Thus, there is no need of calculating a gain for controlling the diaphragm 22 by implementing the equation relating to the aperture value.

If Gain<Gtmin (YES in Step S216), and Gsmin<GGtmin (YES in Step S221), then, Gt=Gtmin, and Gs=GGtmin (Step S222). In this case, similarly to Step S219, the exposure amount gain (Gain) is smaller than the minimum exposure time gain Gtmin, and accordingly, it is impossible to handle the exposure amount gain (Gain) by the exposure time gain Gt without changing the aperture gain Gs (=1.0). Accordingly, insufficiency of the exposure time gain Gt with respect to the exposure amount gain (Gain) is handled, namely, compensated for by changing the aperture gain Gs. The gain GGtmin for compensating for insufficiency at the minimum exposure time gain Gtmin is used as the aperture gain Gs. The gain GGtmin is used in the above control because the gain GGtmin is smaller than the minimum aperture gain Gsmin, namely, there is no need of using the minimum aperture gain Gsmin. In this arrangement, similar to the above case, there is no need of calculating a gain for controlling the diaphragm 22 by implementing the equation relating to the aperture value.

If Gsmax≦GGtmax (NO in Step S218), Gt=Gtmax, and Gs=Gsmax (Step S220). Further, if Gsmin≧GGtmin (NO in Step S221), Gt=Gtmin, and Gs=Gsmin (Step S223). If GGtmax≧Gsmax in Step S220, the maximum aperture gain Gsmax is used as the aperture gain Gs. Similarly, if GGtmin≦Gsmin in Step S223, the minimum aperture gain Gsmin is used as the aperture gain Gs.

In this embodiment, as shown in the flowchart of FIG. 21, the exposure time gain Gt is prioritized in selecting a control parameter for obtaining the exposure amount gain (Gain), namely, exposure time control is prioritized. Alternatively, the aperture gain Gs may be prioritized, namely, aperture control may be prioritized. Further, in this embodiment, the exposure time gain Gt and the aperture gain Gs are calculated by using a single luminance Lt1 for exposure amount setting. Alternatively, two or more luminances for exposure amount setting may be used for the calculation. In such an altered arrangement, the average value of the exposure time gains Gt, and the average value of the aperture gains Gs, or the maximum/minimum value of the exposure time gains Gt, and the maximum/minimum value of the aperture gains Gs may be used.

Thus, the exposure time gain Gt and the aperture gain Gs are calculated, and the exposure time T2 after the AE correction, and the aperture area S2 after the AE correction are calculated based on the exposure time gain Gt and the aperture gain Gs, respectively. Then, the exposure time setting value for the image sensor 30 or for the shutter 23, and the aperture setting value for the diaphragm 22 are calculated based on the exposure time T2, and the aperture area S2, respectively, by data conversion with use of the corresponding lookup tables. The exposure time setting value and the aperture setting value obtained by the data conversion are stored in the photoelectric conversion information storage 516. Alternatively, the exposure time setting value and the aperture setting value obtained when the AE evaluation values were acquired last time may be renewed by the newly obtained corresponding setting values. The same idea is applicable to the photoelectric conversion characteristic setting value, which will be described in the following.

The shutter control signal generator 523 and the aperture control signal generator 525 generate control signals to the shutter driver 61 and the aperture driver 63, which make it possible to set the exposure time, namely, the integration time of the image sensor 30 or the shutter 23 to the exposure time T2, and to set the aperture area of the diaphragm 22 to the aperture area S2, based on the exposure time setting value and the aperture setting value calculated in the exposure amount control parameter calculator 511, respectively.

Next, described is an exemplified process for calculating the sensor output VtLin corresponding to the linear characteristic area average luminance LtLin, and the sensor output VtLog corresponding to the logarithmic characteristic area average luminance LtLog shown in FIG. 20. First, a process for calculating the sensor output level VtLin corresponding to the linear characteristic area average luminance LtLin is described. An average luminance (called as "block linear average luminance") in the linear characteristic area with respect to each of the detection blocks A through AJ in the main subject image area 331 shown in FIG. 15 is calculated based on the subject luminance information detected from each of the detection blocks A through AJ. The block linear average luminance is calculated with use of an average (called as "color linear average") in the linear characteristic area with respect to each of the color components R, G, and B. Specifically, color linear averages of the color component R which have been obtained from the blocks A through AJ are calculated as AveRA, AveRB, . . . , and AveRAJ, respectively. Similarly, color linear averages of the color component G which have been obtained from the blocks A through AJ are calculated as AveGA, AveGB, . . . , and AveGAJ, respectively, and color linear averages of the color component B which have been obtained from the blocks A through AJ are calculated as AveBA, AveBB, . . . , and AveBAJ, respectively. Then, a block linear average luminance with respect to each of the blocks A through AJ is calculated in accordance with the following color space conversion equation, with use of the color linear averages of the respective color components R, G, and B. For instance, a block linear average luminance AveYA is obtained by implementing the following equation where AveYA represents a block linear average luminance in the detection block A.

$$AveYA = AveRA \cdot K1 + AveGA \cdot K2 + AveBA \cdot K3$$

where K1, K2, and K3 are coefficients used in color space conversion from RGB to YCbCr, and K1=0.2989, K2=0.5866, and K3=0.1145, respectively.

Calculation is implemented with respect to the detections blocks B through AJ in a similar manner as the calculation is implemented with respect to the detection block A. Thus, block linear average luminances AveYA, AveYB, . . . , and AveYAJ are calculated in the respective blocks A through AJ. Then, an average luminance with respect to the entirety of the block linear average luminances AveYA, AveYB, . . . , and AveYAJ is calculated, and set as MainY. The average luminance MainY is the sensor output VtLin corresponding to the linear characteristic area average luminance LtLin.

On the other hand, the sensor output VtLog corresponding to the logarithmic characteristic area average luminance LtLog is calculated in a similar manner as calculating the sensor output VtLin. Specifically, an average luminance (called as "block log average luminance") in the logarithmic characteristic area with respect to each of the detection blocks A through AJ in the main subject image area 331 shown in FIG. 15 is calculated based on the subject luminance information detected from each of the detection blocks A through AJ. The block log average luminance is calculated with use of an average (called as "color log average") in the logarithmic characteristic area with respect to each of the color components R, G, and B. Specifically, color log averages of the color component R which have been obtained from the blocks A through AJ are calculated as AveRLogA, AveRLogB, . . . , and AveRLogAJ, respectively. Similarly, color log averages of the color component G which have been obtained from the blocks A through AJ are calculated as AveGLogA, AveGLogB, . . . , and AveGLogAJ, respectively, and color log averages of the color component B which have been obtained from the blocks A through AJ are calculated as AveBLogA, AveBLogB, . . . , and AveBLogAJ, respectively.

The color log averages in the logarithmic characteristic area with respect to the respective color components R, G, and B are temporarily converted to linear data by data conversion to corresponding values in the linear characteristic area with use of a lookup table stored in the LUT storage 518. Similarly to the above, the block log average luminances AveYLogA, AveYLogB, . . . , and AveYLogAJ in the respective detection blocks A through AJ are calculated in accordance with the color space conversion equation in a similar manner as mentioned above, with use of the linear data. Then, an average luminance with respect to the entirety of the block log average luminances AveYlogA, AveYLogB, . . . , and AveYLogAJ is calculated, and set as MainYLog. The average luminance MainYLog is the sensor output VtLogLin corresponding to the logarithmic characteristic area average luminance LtLog. Alternatively, the color linear averages or the color log averages in the respective detection blocks A through AJ with respect to the respective color components R, G, and B may be obtained by calculating a luminance histogram in the linear characteristic area or in the logarithmic characteristic area with respect to each of the detection blocks A through AJ, applying the Gaussian pruning to the luminance histograms, and averaging the respective luminances after the Gaussian pruning.

The following is a modified process for calculating the Gain as the exposure amount control parameter, which has been described referring to FIGS. 20 and 21. First, a maximum luminance (called as "color maximum value") in each of the detection blocks A through AJ in the main subject image area 331 is calculated with respect to each of the color components R, G, and B. Specifically, the color maximum values of the color component R in the detection blocks A through AJ are calculated as MaxRA, MaxRB, . . . , and MaxRAJ, respectively. Similarly, the color maximum values of the color component G in the detection blocks A through AJ are calculated as MaxGA, MaxGB, . . . , and MaxGAJ, respectively, and the color maximum values of the color component B in the detection blocks A through AJ are calculated as MaxBA, MaxBB, . . . , and MaxBAJ, respectively. Then, a maximum block luminance in each of the detection blocks A through AJ is calculated in accordance with the following color space conversion equation with use of the maximum luminance with respect to each of the color components R, G, and B. For instance, a maximum block luminance MaxYA is obtained by implementing the following equation where MaxYA represents a maximum block luminance in the detection block A.

$$Max YA = Max RA \cdot K1 + Max GA \cdot K2 + Max YA \cdot K3$$

where K1=0.2989, K2=0.5866, and K3=0.1145, respectively, which is the same as in obtaining the block linear average luminance.

Calculation is implemented with respect to the detections blocks B through AJ in a similar manner as the calculation is implemented with respect to the detection block A. Thus, maximum block luminances MaxYA, MaxYB, . . . , and MaxYAJ are calculated in the respective blocks A through AJ. Then, a maximum luminance with respect to the entirety of the maximum block luminances MaxYA, MaxYB, . . . , and MaxYAJ is calculated, and set as MaxY. The maximum luminance MaxY is a maximum luminance in the main subject image area 331. The maximum luminance MaxY is the sensor output VtAve2 corresponding to the luminance Ltmax shown in FIG. 22.

Similarly, a minimum luminance (called as "color minimum value") in each of the detection blocks A through AJ is calculated with respect to each of the color components R, G, and B, and the calculated color minimum values are set as MinRA, MinRB, . . . , and MinRAJ in case of the color component R; MinGA, MinGB, . . . , and MinGAJ in case of the color component G; and MinBA, MinBB, . . . , and MinBAJ in case of the color component B. Then, minimum block luminances MinYA, MinYB, . . . , and MinYAJ are calculated with respect to the respective detection blocks A through AJ in accordance with the color space conversion equations in a similar manner as mentioned above, with use of the minimum luminances with respect to the color components R, G, and B. Subsequently, a minimum value (called as "minimum luminance in the main subject image area 331") with respect to the entirety of the minimum block luminances MinYA, MinYB, . . . , and MinYAJ is calculated, and set as MinY. The minimum luminance MinY is the sensor output VtAve1 corresponding to the luminance Ltmin shown in FIG. 22.

A color space conversion is conducted after the color maximum values and the color minimum values located in the logarithmic characteristic area are similarly converted into values in the linear characteristic area using a lookup table. Alternatively, the color maximum values or the color minimum values in the respective detection blocks A through AJ with respect to the respective color components R, G, and B may be obtained by calculating a luminance histogram with respect to each of the detection blocks A through AJ, applying the Gaussian pruning to the luminance histograms, and performing a predetermined computation with use of the luminances after the Gaussian pruning.

Alternatively, as shown in FIG. 22, it is possible to calculate a gain, namely, Vtarget1/VtAve1 (called as "first gain"), so that the sensor output VtAve1 corresponding to the luminance Ltmin attains a predetermined target output Vtarget1, to calculate a gain, namely, Vtarget2/VtAve2 (called as "second gain"), so that the sensor output VtAve2 corresponding to the luminance Ltmax attains a predetermined target output Vtarget2, to select a smaller gain between the first gain and the second gain, and to execute the flowchart in FIG. 21 for calculating the exposure time gain Gt and the aperture gain Gs.

Further alternatively, it is possible to select a larger gain between the first gain and the second gain, or to perform computation with use of the first gain or the second gain exclusively, in place of comparing the first gain with the second gain for selection. Further alternatively, it is possible to use an average of the first gain and the second gain.

Alternatively, it is possible to calculate the minimum luminance MinY and the maximum luminance MaxY based on the entire luminance histogram with respect to the entirety of the detection blocks A through AJ, which is obtained by integrating the luminance histograms with respect to the detection blocks A through AJ. In such an altered arrangement, the luminance range in the entire luminance histogram is calculated by applying the Gaussian pruning in a similar manner as mentioned above, and the minimum luminance MinY and the maximum luminance MaxY are calculated based on the luminance range. Alternatively, it is possible to obtain one of the maximum and minimum luminances based on the luminance and the luminance range of the other one of the maximum and minimum luminances. For instance, the minimum luminance MinY=maximum luminance MaxY−luminance range, and the maximum luminance MaxY=minimum luminance MinY+luminance range.

(Detailed Description on Dynamic Range Control Parameter Calculating Process)

Next, a process for calculating a dynamic range control parameter, namely, a photoelectric conversion characteristic setting value by the dynamic range control parameter calculator 512 based on the AE evaluation values detected by the evaluation value detector 405 in the dynamic range control as shown in FIG. 19 is described in detail.

Figure 23A:
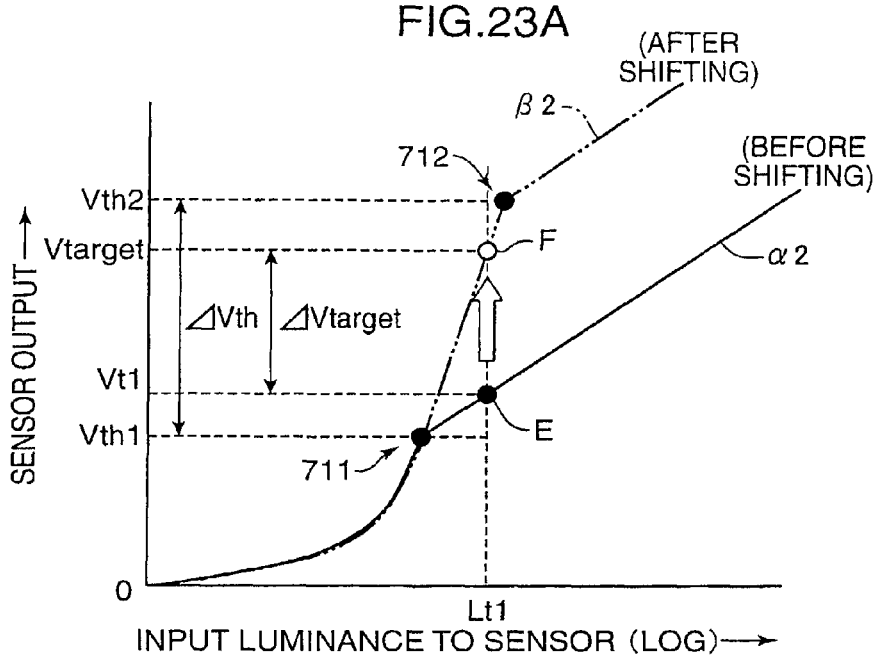
Figure 23B:
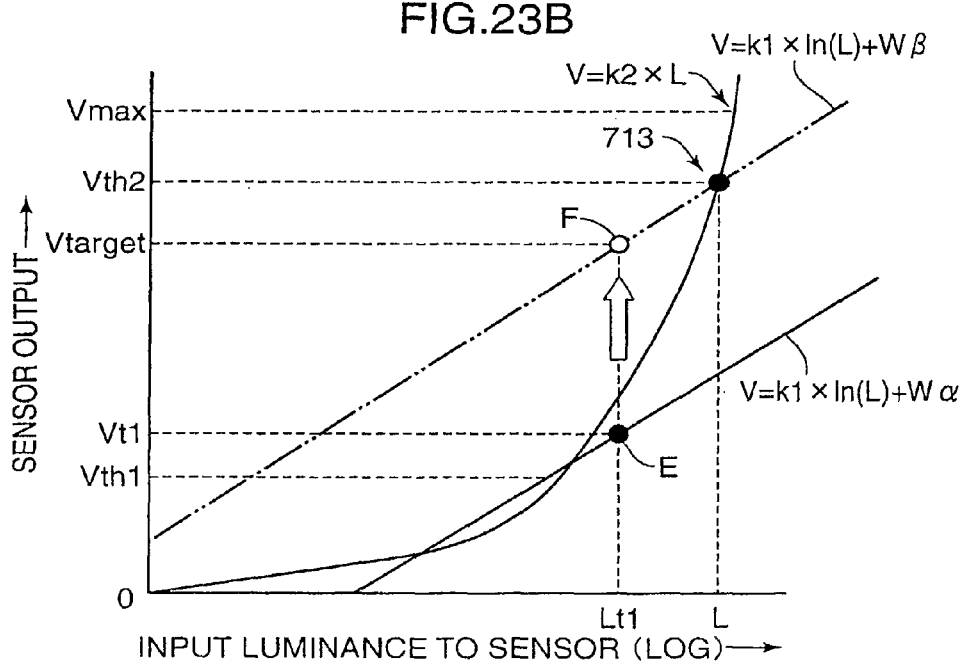

FIGS. 23A and 23B are illustrations each for explaining a process for calculating the position of an inflection point of a photoelectric conversion characteristic after shifting of the photoelectric conversion characteristic, wherein FIG. 23A shows a case that the photoelectric conversion characteristic is changed to attain a predetermined sensor output corresponding to the luminance Lt1, and FIG. 23B shows a case that the photoelectric conversion characteristic is modeled.

Referring to FIG. 23A, the reference numeral α2 denotes a photoelectric conversion characteristic having an inflection point 711 before shifting, and the reference numeral β2 denotes a photoelectric conversion characteristic having an inflection point 712 after shifting. The luminance Lt1 is a subject luminance for exposure setting as in the case of FIG. 19, and Vth1 and Vth2 are sensor outputs corresponding to the inflection points 711 and 712, respectively. In FIG. 23A, the photoelectric conversion characteristic is changed, so that the sensor output corresponding to the luminance Lt1 is shifted from the sensor output Vt1 at the point E on the photoelectric conversion characteristic α2 to the target output Vtarget at the point F on the photoelectric conversion characteristic β2. In this case, the photoelectric conversion characteristic α2 is shifted to the photoelectric conversion characteristic β2 by a changed amount ΔVth, whereby the sensor output Vth1 at the inflection point 711 becomes the sensor output Vth2 at the inflection point 712.

The sensor output Vth2 is obtained by using the equation: ΔVtarget=Vtarget−Vt1 where ΔVtarget represents a sensor output difference between the points E and F. A process for calculating the sensor output Vth2 is described. As shown in FIG. 23B, a linear characteristic area and a logarithmic characteristic area in each of the photoelectric conversion characteristics α2 and β2 are expressed in graph-based modeling in terms of the following functions, namely, mathematical equations.

Function by Modeling the Linear Characteristic Area:

$V = K2 \cdot L$ (common for the photoelectric conversion characteristics α2 and β2)

Function by Modeling the Logarithmic Characteristic Area:

$V = K1 \cdot \ln(L) + W\alpha$ (in case of the photoelectric conversion characteristic α2)

$V = K1 \cdot \ln(L) + W\beta$ (in case of the photoelectric conversion characteristic β2)

where K1 and K2 each represents a constant, L represents an incident luminance to the image sensor 30 along the axis of abscissas in FIG. 23B, and Wα and Wβ each represents an intercept.

Since the sensor output difference ΔVtarget is represented by ΔVtarget=Wα−Wβ, the equation: $V = K1 \cdot \ln(L) + W\beta$ is expressed by the following equation:

$V = K1 \cdot \ln(L) + W\alpha + \Delta V\text{target}$

Vth2 is a sensor output at an intersection 713 of the above modeling equation and the modeling equation: V=K2·L. Accordingly, the sensor output Vth2 corresponding to the luminance L is calculated by obtaining the value "L" that satisfies the following simultaneous equation of these two equations for calculating the intersection 713 or coordinates, namely, by obtaining the luminance L shown in FIG. 23B.

$K1 \cdot \ln(L) + W\alpha + \Delta V\text{target} = K2 \cdot L$

In this embodiment, the sensor output Vth2 is set higher than the target output Vtarget corresponding to the subject luminance Lt1 to obtain the target output Vtarget from the linear characteristic area. If, however, the calculated output level Vth2 exceeds the saturated output level Vmax, the photoelectric conversion characteristic of the image sensor 30 consists of a linear characteristic area without inclusion of a logarithmic characteristic area.

A setting value for the image sensor 30 corresponding to the calculated sensor output Vth2, namely, a photoelectric conversion characteristic setting value for changing the photoelectric conversion characteristic, with which the inflection point of the photoelectric conversion characteristic is shifted to the point corresponding to the sensor output Vth2, is calculated by data conversion for making the sensor output Vth1 coincident with the sensor output Vth2 with use of a lookup table. The photoelectric conversion characteristic setting value calculated by the data conversion is stored in the photoelectric conversion characteristic information storage 516. The dynamic range control signal generator 521 generates a control signal to the timing generating circuit 31 to change the position of the inflection point of the photoelectric conversion characteristic of the image sensor 30 in a manner as mentioned above based on the photoelectric conversion characteristic setting value calculated by the dynamic range control parameter calculator 512.

The following is an example of a process for calculating the sensor output level Vt1 corresponding to the luminance Lt1 for dynamic range setting shown in FIGS. 23A and 23B. First, similarly to the calculation of the sensor output level VtLog corresponding to the logarithmic characteristic area average luminance LtLog shown in FIG. 20, a logarithmic characteristic area average luminance in the main subject image area 331 constituted of the detection blocks A through AJ shown in FIG. 15 is calculated, and a logarithmic characteristic area average luminance in the peripheral subject image area 332 constituted of the first through sixteenth detection blocks is calculated, as in the case of calculating the logarithmic characteristic area average luminance in the main subject image area 331. Then, a larger logarithmic characteristic area average luminance is selected between the logarithmic characteristic area average luminances in the main subject image area 331 and in the peripheral subject image area 332, and the sensor output level corresponding to the selected logarithmic characteristic area average luminance is set to Vt1.

Alternatively, the following arrangement is proposed. A sensor output corresponding to the linear characteristic area average luminance, which is obtained in a similar manner as obtaining the linear characteristic area average luminance shown in FIG. 20, is calculated in the main subject image area 331 and in the peripheral subject image area 332, as well as the logarithmic characteristic area average luminances. An entire characteristic area average luminance is calculated with respect to each of the main subject image area 331 and the peripheral subject image area 332 by averaging the linear characteristic area average luminance and the logarithmic characteristic area average luminance in each of the main subject image area 331 and the peripheral subject image area 332. Then, a sensor output corresponding to a larger entire characteristic area average luminance between the entire characteristic area average luminances in the main subject image area 331 and in the peripheral subject image area 332 is set as a sensor output corresponding to the luminance Lt1. If the entire characteristic area average luminances are identical to each other in the main subject image area 331 and in the peripheral subject image area 332, a sensor output corresponding to any of the entire characteristic area average luminances may be set as a sensor output corresponding to the luminance Lt1. The same idea is applicable to the control mentioned in the following sections.

Alternatively, the sensor output corresponding to the luminance Lt1 may be obtained from the logarithmic characteristic area average luminance in the main subject image area 331, or from the entire characteristic area average luminance comprised of the logarithmic characteristic area average luminance and the linear characteristic area average luminance in the main subject image area 331, or may be obtained from the logarithmic characteristic area average luminance in the peripheral subject image area 332, or from the entire characteristic area average luminance comprised of the logarithmic characteristic area average luminance and the linear characteristic area average luminance in the peripheral subject image area 332.

The following is a modified process for calculating the sensor output corresponding to the luminance Lmax. First, similarly to the calculation of the sensor output corresponding to the maximum luminance Ltmax or MaxY as shown in FIG. 22, the maximum luminance in the main subject image area 331 is calculated. Likewise, the maximum luminance in the peripheral subject image area 332 is calculated in a similar manner as calculating the maximum luminance in the main subject image area 331. Then, a larger maximum luminance is selected between the maximum luminances in the main subject image area 331 and in the peripheral subject image area 332, and the sensor output level corresponding to the selected maximum luminance is obtained, and the luminance corresponding to the sensor output level is set as the luminance Lt1. Alternatively, it is possible to obtain the sensor output corresponding to the luminance Lt1 based on the maximum luminance in the main subject image area 331, or to obtain the sensor output corresponding to the luminance Lt1 based on the maximum luminance in the peripheral subject image area 332.

As described in the section referring to FIG. 17, the control of locating the main subject average luminance in the linear characteristic area is performed based on a judgment of the saturation judging section 4055 (see FIG. 14) that the output level of the image sensor 30 is not saturated. Alternatively, the above control may be performed irrespective of a judgment as to whether saturation is detected by the saturation judging section 4055, in light of esteeming image quality of the main subject image. However, it is possible to temporarily change the photoelectric conversion characteristic or the integration time to prevent prompt saturation in shooting a subject image which may cause saturation by performing control of locating the main subject average luminance in the linear characteristic area.

(Step S3-1) Setting of Exposure Amount Control Parameter:

After calculation of the exposure amount control parameter for AE control according to the process described in Step S2-1, AE control is executed based on the exposure amount control parameter to perform actual shooting. In case of shooting a still image, actual shooting is performed after performing AE control based on the AE evaluation values acquired from an image captured by preliminary shooting. In case of shooting a moving image, the image sensing is performed successively after performing the AE control based on the AE evaluation values acquired from an image captured immediately before.

Specifically, the exposure amount control parameter calculated by the exposure amount control parameter calculator 511 of the main controller 50 is outputted to the control signal generating section 520. Upon receiving the exposure amount control parameter, the respective elements in the control signal generating section 520 generate control signals for operating the timing generating circuit 30 and the driving section 60, which in turn, generate drive signals for causing the respective elements to perform actual exposure amount control operation. More specifically, the sensor exposure time control signal generator 522 of the control signal generating section 520 generates a control signal to the image sensor 30, so that a predetermined exposure time can be secured in accordance with the exposure amount control parameter, and sends the control signal to the timing generating circuit 31. The control signal is, for instance, a signal, which makes it possible to set the time $\Delta S$ for making the signal $\phi VPS$ for the image sensor 30 to attain a middle potential M in the timing chart shown in FIG. 9 to an appropriate value based on the exposure amount control parameter, namely, a signal that makes it possible to optimize the integration time from the timing t1 when the resetting of the parasitic capacitance of the photodiode PD is ended to the timing t2 when the readout of the video signal of the next frame image is started. The timing generating circuit 31 generates a timing signal for controlling the exposure time of the image sensor 30 in accordance with the inputted control signal to drive the image sensor 30.

Similarly to the sensor exposure time control signal generator 522, the shutter control signal generator 523 generates a control signal for controlling a shutter speed or a shutter opening time of the shutter 23 according to the exposure time based on the exposure amount control parameter. The control signal is sent to the shutter driver 61 of the driving section 60. Upon receiving the control signal, the shutter driver 61 generates a drive signal for driving the shutter 23 based on the control signal to cause the shutter 23 to perform a shutter opening operation according to the exposure amount control parameter.

Similarly to the shutter control signal generator 523, the aperture control signal generator 525 generates a control signal for setting the aperture area of the diaphragm 22 based on the exposure amount control parameter. The control signal is sent to the aperture driver 63. Upon receiving the control signal, the aperture driver 63 generates a drive signal for driving the diaphragm 22 based on the control signal to cause the diaphragm 22 to perform an aperture area setting operation according to the exposure amount control parameter.

As mentioned above, there are three kinds of controls as the exposure amount control, i.e., the integration time control, specifically, driving control of the image sensor 30 by the timing generating circuit 31, shutter speed control, and aperture control. All the three controls may be performed altogether. However, it is desirable to prioritize the electronic-circuitry-based exposure amount control by the timing generating circuit 31, as described referring to the flowchart shown in FIG. 21, in the point of achieving the control in a short time.

(Step S3-2) Setting of Dynamic Range Control Parameter:

In case of performing AE control according to the embodiment of the invention by dynamic range control, the dynamic range control parameter calculated in the dynamic range control parameter calculator 512 of the main controller 50 is outputted to the control signal generating section 520. Upon receiving the dynamic image control parameter, the control signal generator 521 generates a control signal for causing the relevant elements to perform actual dynamic range control operation.

Specifically, the dynamic range control signal generator 521 generates a control signal to the image sensor 30 to control the switching point of the output level, namely, the inflection point, for switching the photoelectric conversion characteristic from a linear characteristic area to a logarithmic characteristic area depending on the photoelectric conversion characteristic setting value of the image sensor 30 which has been calculated in the dynamic range control parameter calculator 512, and sends the control signal to the timing generating circuit 31. The control signal is, for instance, a control signal, based on which the signal φVPS for the image sensor 30 in the timing chart shown in FIG. 9 is desirably set in accordance with the calculated dynamic range control parameter.

More specifically, in view of the fact that the inflection point is changed by controlling the intensity of the voltage VPH or the duration of the time ΔT in the signal φVPS, the dynamic range control signal generator 521 generates a control signal for controlling the signal φVPS based on the dynamic range control parameter, and sends the control signal to the timing generating circuit 31. Upon receiving the control signal, the timing generating circuit 31 generates a timing signal to control the dynamic range of the image sensor 30 to drive the image sensor 30 in a predetermined photoelectric conversion characteristic state.

As mentioned above, the operation of the digital camera 1 has been described by primarily focusing on AE control. In the actual digital camera 1, AF control and WB control are performed as well as AE control. Similarly to AE control, AF control can be performed based on the AF evaluation values acquired from the image captured by the image sensor 30. For instance, it is possible to calculate the AF evaluation value by a so-called "hill-climbing search technique", wherein luminance histograms obtained from the detection blocks O, P, U, and V of the main subject image area 331 shown in FIG. 14 are utilized, and a peak point at which the contrast to the luminance at an adjacent point is maximum is detected by the evaluation value detector 405. In this case, it is desirable to detect the AF evaluation value from each of the linear characteristic area and the logarithmic characteristic area of the image sensor 30 so as to utilize the features of the respective characteristic areas. For instance, it is desirable to use the AF evaluation value obtained from the logarithmic characteristic area for rough metering in AF control, and to use the AF evaluation value obtained from the linear characteristic area for precise metering.

The AF evaluation values detected by the evaluation value detector 405 are sent to the AF control parameter calculator 513 of the main controller 50. The AF control parameter calculator 513 calculates an AF control parameter corresponding to the AF evaluation value, and sends the AF control parameter to the zoom/focus control signal generator 524. Upon receiving the AF control parameter, the zoom/focus control signal generator 524 generates a control signal corresponding to the inputted AF control parameter, and sends the control signal to the zoom/focus driver 62. Upon receiving the control signal, the zoom/focus driver 62 generates a drive signal corresponding to the control signal to drive the lens group 21 in the lens barrel 20 for focusing based on the drive signal.

Similarly to AF control, WB control can be performed based on the WB evaluation values acquired from the image captured by the image sensor 30. In this case, it is desirable to detect the WB evaluation values from each of the linear characteristic area and the logarithmic characteristic area of the image sensor 30, as in the case of the AF evaluation values. Specifically, the WB evaluation values are detected from neutral images based on the captured image. It is desirable to prepare two kinds of images as the neutral images, wherein one is obtained from the linear characteristic area, and the other is obtained from the logarithmic characteristic area, and to detect R, G, B levels, namely, R-Log, G-Log, B-Log, R-Lin, G-Lin, and B-Lin based on the two images. The evaluation value detector 405 detects the WB evaluation values, and sends the WB evaluation values to the white balance controller 406, which, in turn, performs WB correction to achieve optimal color balance.

In the digital camera 1 performing the aforementioned AE control according to the embodiment of the invention, an image signal of a target subject is constantly acquired from the linear characteristic area of the image sensor 30, and also, a predetermined dynamic range is secured by utilizing the logarithmic characteristic area. For instance, even if a subject luminance is low, an image signal having a high contrast is obtained from the linear characteristic area, and a dynamic range having a high luminance area is secured from the logarithmic characteristic area. Thus, this arrangement enables to cause the image sensor to attain an optimal sensing output and video output commensurate with the amount of a subject light image.

By implementing the aforementioned signal processing, the processed image is temporarily stored in an image memory or in the memory card 412, or displayed on the LCD section 106 as a monitor image. In this way, the sensing operation by the digital camera 1 is completed.

Second Embodiment

In the following a second embodiment of the invention is described referring to FIGS. 24 through 29.

The second embodiment is different from the first embodiment in the AE controlling method. The AE control in the first embodiment is performed by the exposure amount control as shown in FIGS. 18A and 18B, and by the dynamic range control as shown in FIG. 19. The exposure amount control (A) is performed based on control of the exposure time, namely, the integration time of the image sensor 30, or the opening time of the shutter 23, and based on control of the aperture value, namely, the aperture area of the diaphragm 22, and the dynamic range control (B) is performed based on control of the photoelectric conversion characteristic, namely, the position of the inflection point, as summarized below.

(A) Exposure amount control based on exposure time control, i.e., control of the integration time or the shutter opening time, or based on aperture control, i.e., control of the aperture area of the diaphragm; and (B) Dynamic range control based on control of the photoelectric conversion characteristic, i.e., control of the position of the inflection point On the other hand, in AE control of the second embodiment, as summarized in [A] through [C], exposure amount control is performed in such a manner that exposure amount control based on aperture control, and exposure amount control based on control of the integration time or the shutter opening time are performed independently of each other, and dynamic range control is performed by controlling the photoelectric conversion characteristic, namely, the position of the inflection point, as in the case of the first embodiment.

[A] Exposure amount control based on aperture control, namely, control of the aperture area of the diaphragm;

[B] Dynamic range control based on control of the photoelectric conversion characteristic, namely, control of the position of the inflection point; and

Figure 24:
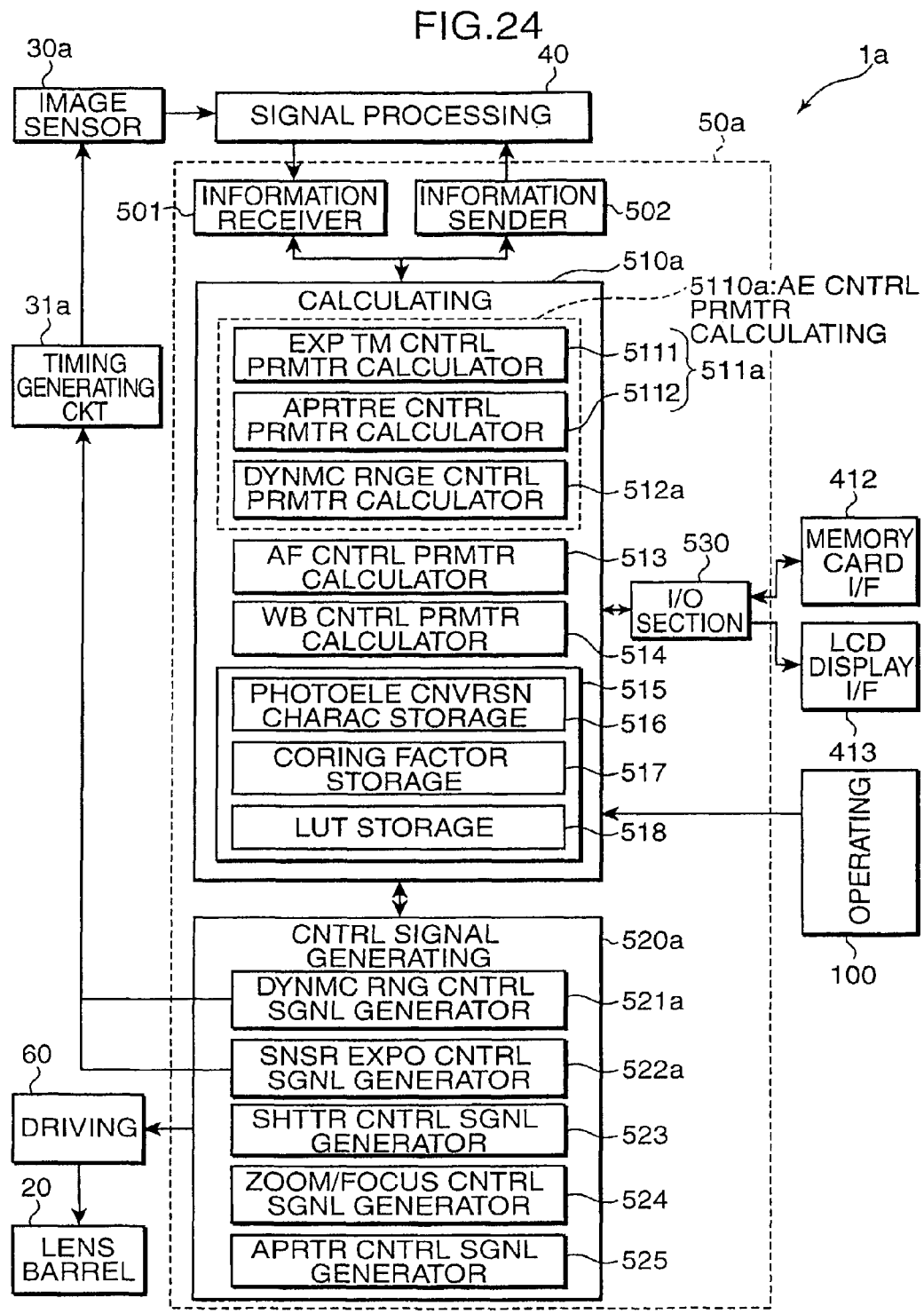
FIG. 24 is a functional block diagram for explaining functions of a main controller equipped in a digital camera as a second embodiment of the invention.

[C] Exposure amount control based on exposure time control, namely, control of the integration time or the shutter opening time The second embodiment is different from the first embodiment in the AE controlling method, specifically, as shown in FIG. 24, in that a digital camera 1a as the second embodiment has an image sensor 30a, a main controller 50a comprised of a calculating section 510a and a control signal generating section 520a, and a timing generating circuit 31a. Elements in the second embodiment that are equivalent or identical to those in the first embodiment are denoted by the same reference numerals, and description thereof is omitted herein.

Figure 25:
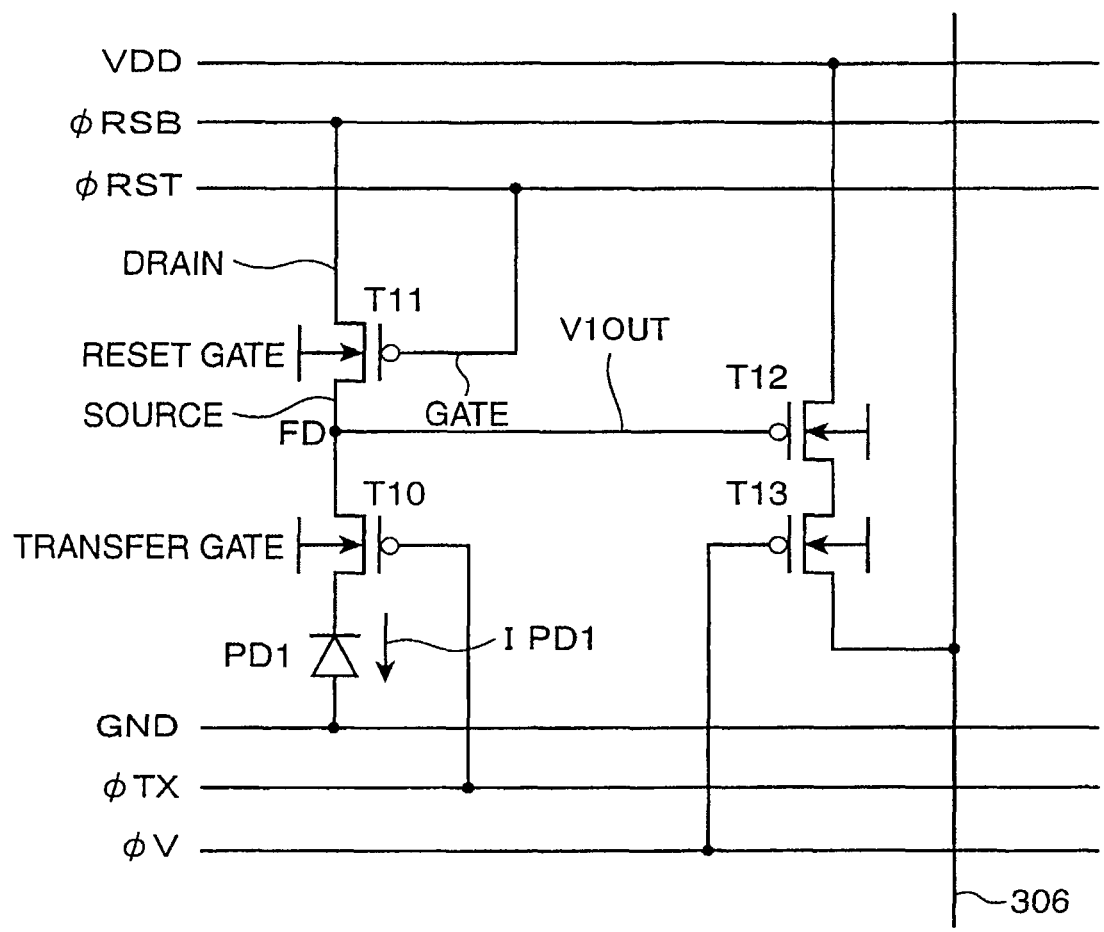
FIG. 25 is a circuitry diagram showing an exemplified arrangement of each pixel constituting an image sensor of the digital camera shown in FIG. 24.

First, the image sensor 30a is described in detail. FIG. 25 is an exemplified circuitry arrangement of each pixel in the image sensor 30a of the digital camera 1a as the second embodiment. The pixels in the image sensor 30a correspond to the pixels G11 through Gmn in the first embodiment, as shown in FIG. 7. As shown in FIG. 25, each of the pixels G11 through Gmn of the image sensor 30a comprises a photodiode PD1, transistors T10 through T13 each comprised of a metal oxide semiconductor field effect transistor (MOSFET), and a floating diffusion (FD). An n-channel MOSFET is adopted as the transistors T10 through T13. The symbols VDD, φRSB, φRST, φTX, and φV represent signals or voltages to the respective transistors T10 through T13, and GND represents the ground.

The photodiode PD1 is a light sensing section or a photoelectric conversion section, and outputs an electrical signal or a photocurrent IPD1 commensurate with the amount of incident light from a subject. The transistor T12 and each of constant current sources corresponding to the constant current sources shown in FIG. 7 constitute an amplifying circuit, which is a source follower circuit i.e. a source follower amplifier to amplify a voltage V1OUT, which will be described later, namely, to conduct current amplification. The transistor T13 is a transistor for reading out a signal, and serves as a switch which is turned on and off in response to a voltage or a signal φV applied to the gate thereof. Specifically, the source of the transistor T13 is connected to an output signal line unit 306 corresponding to the output signal line unit 306 shown in FIG. 7, and the electric current which has been amplified by the transistor T12 is drawn to the output signal line unit 306, as an output current when the transistor T13 is turned on.

The transistor T10 is operated as a switch which is turned on and off in response to a voltage applied to the gate thereof, and functions as a so-called transfer gate, which performs switching of transferring/non-transferring the photocurrent IPD1 or the electric charge generated in the photodiode PD1 to the FD in response to turning on and off, namely, high and low of the gate potential of the transistor T10. The photocurrent PID1 generated in the photodiode PD1 flows to the parasitic capacitance of the photodiode PD1 for accumulating electric charge to thereby generate a voltage in accordance with the accumulated electric charge. If the transistor T10 is in an ON state at this time, the electric charge i.e. a negative charge accumulated in the parasitic capacitance is transferred to the FD. The FD is a charge holder which temporarily holds the electric charge i.e. a signal charge, and serves as a capacitor which converts the charge into a voltage, namely, performs charge-voltage conversion.

The transistor T11 i.e. a reset gate transistor performs switching of applying/non-applying a reset bias to the FD in response to turning on and off, namely, high and low of the gate voltage of the transistor T11. For instance, if the transistor T11 is in an ON state, the transistor T10 is also kept in an ON state, and accordingly, a reset bias is applied between φRSB and GND, with the transistor T11, the FD, the transistor T10, and the photodiode PD1 being interposed therebetween. Also, by setting the gate voltage to a middle potential (called as "Mid potential" or "Mid"), which will be described later, a linear conversion and a log conversion are implemented, respectively, by charge-voltage conversion by the FD and the transistor T11 of converting the charge which is transferred from the photodiode PD1 to the FD, namely, a current flowing in the FD, into a voltage.

Specifically, a reset current corresponding to the Mid potential flows in the transistor T11 to thereby cause the source of the transistor T11 to attain a potential corresponding to the reset current. If the potential attained by the charge transferred from the photodiode PD1 to the FD is smaller than the source potential of the transistor T11 corresponding to the Mid potential, namely, if the subject luminance for an image sensing is low, i.e., the subject image is dark, and the amount of light to be incident onto the photodiode PD1 is small, charge-voltage conversion as the linear conversion is performed by the FD. On the other hand, if the potential attained by the charge transferred from the photodiode PD1 to the FD exceeds the source potential of the transistor T11, namely, the subject luminance for the image sensing is high i.e. the subject image is bright, and the amount of light to be incident onto the photodiode PD1 is large, charge-voltage conversion as the log conversion is performed by the transistor T11.

By performing the above operations, a voltage as a linear output obtained by integration of the photocurrent IPD1 in the FD, or a voltage as a log output obtained by current-voltage conversion in accordance with the photocurrent IPD1 in the transistor T11 is generated at the connection node of the FD and the transistor T12, namely, at the output V1OUT. Specifically, the output value in the linear characteristic area of the photoelectric conversion characteristic is an integrated value of the photocurrent IPD1 in the FD. However, in a certain area of the logarithmic characteristic area where the potential by the charge accumulated in the FD exceeds the source current of the transistor T11 i.e. a reset gate, a current equivalent to the photocurrent IPD1 flows in the transistor T11, and a voltage obtained by current-voltage conversion of the photocurrent IPD1 in the transistor T11 is generated as the output value in the FD. The current-voltage conversion in the transistor T11 corresponds to the log conversion. Therefore, as will be described later, the output value in the linear characteristic area has an integration effect in the FD and in the parasitic capacitance, and the gradient of the linear characteristic area is changed in accordance with the exposure time of the image sensor 30a. On the other hand, the output value in the logarithmic characteristic area does not have an integration effect in the FD or in the parasitic capacitance. Therefore, the photoelectric conversion characteristic in the logarithmic characteristic area is fixed or unchanged independently of the exposure time of the image sensor 30a. In other words, there is no time factor in the logarithmic characteristic area.

Subsequently, in response to turning on of the transistor T13, an amplified current corresponding to the respective voltages is drawn from the transistor T12 to the output signal line unit 306 via the transistor T13, as an output current. Thus, in the second embodiment, the image sensor 30a i.e. each pixel has a circuitry arrangement provided with the FD, namely, a transfer gate and a reset gate to the FD, unlike the image sensor 30 which has the integration circuit comprised of the capacitor C and the transistor T3. This arrangement enables to obtain an output signal which is acquired by linear conversion or log conversion commensurate with the subject luminance or the incident luminance to the image sensor 30a.

As compared with the image sensor 30, the image sensor 30a has a simplified circuitry arrangement. For instance, the image sensor 30a has a circuitry arrangement excluding the integration circuit comprised of the capacitor C and the transistor T3. This arrangement enables to increase the aperture ratio to the image sensor 30a to thereby improve sensitivity or sensor output to the light incident onto the image sensing plane of the image sensor 30a.

Figure 26A:
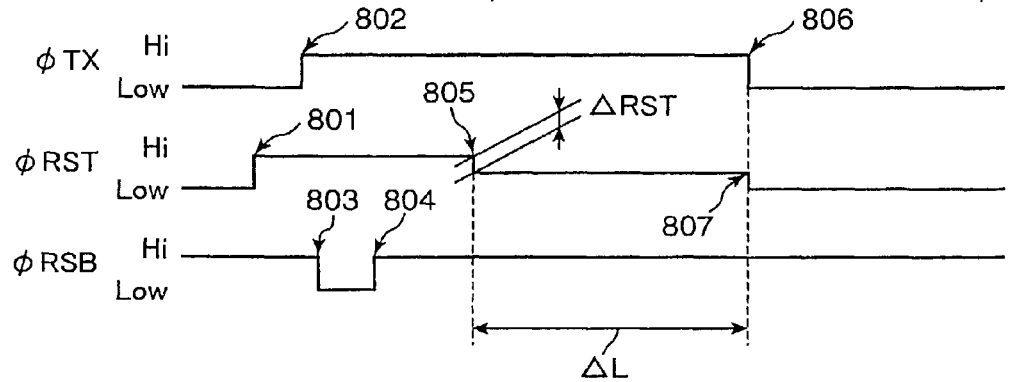
Figure 26B:
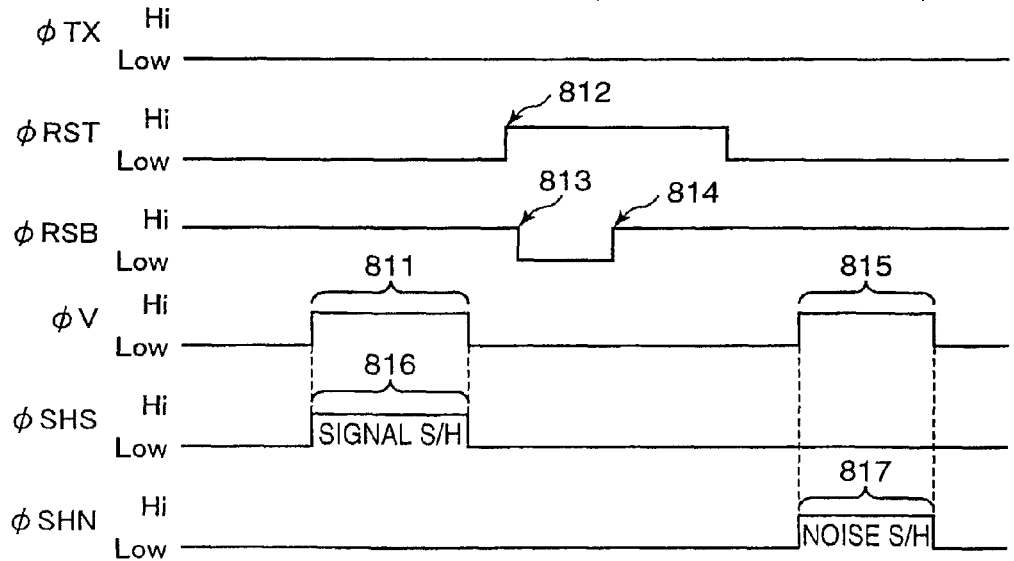

FIGS. 26A and 26B are examples of timing charts relating to an image sensing operation of each pixel in the image sensor 30a shown in FIG. 25. FIG. 26A is a timing chart relating to a charge accumulation or an exposing operation of all the pixels in a vertical blank period, and FIG. 26B is a timing chart relating to a charge sweeping operation of pixels in each row by vertical scanning in a horizontal blank period after termination of the charge accumulation. In this embodiment, in light of polarities of the n-channel MOSFET, the transistor is turned on when the respective signals are set high (Hi), and turned off when the respective signals are set low (Low).

First, referring to FIG. 26A, the signal φRST is set Hi at the timing indicated by the arrow 801, and the signal φTX is set Hi at the timing indicated by the arrow 802. Thereby, the reset bias is applied to the FD. Then, in response to temporary setting of the signal φRSB to Low at the timing indicated by the arrow 803 during a period when both of the signals φRST and φTX are set Hi, the potential of the FD is brought to a state where high luminance light is allowed to be incident, namely, a state where electric charge accumulation is started from 0. Then, a resetting operation or a refresh operation to the FD is performed by returning or setting the potential of the FD to Hi at the timing indicated by the arrow 804 with respect to all the pixels. By conducting the resetting operation to the FD, the electric charge in the FD is stabilized.

Thereafter, the signal φRST to the gate of the transistor T11 is changed from Hi to Mid with respect to all the pixels simultaneously at the timing indicated by the arrow 805 to perform electric charge accumulation in the FD, and voltage conversion of the accumulated charge by the linear conversion or the log conversion in the period when the signal φRST is set to Mid, namely, during a time period from the timing indicated by the arrow 805 to the timing indicated by the arrow 806. At this time, a ratio of the linear conversion or the log conversion is changed according to a difference ΔRST between Hi and Mid of the signal φRST.

Specifically, as the potential difference ΔRST is increased, the sensor output level Vth at the inflection point of the photoelectric conversion characteristic of the image sensor 30a is increased, namely, the ratio of the linear characteristic area in the photoelectric conversion characteristic is increased, in other words, the ratio of the logarithmic characteristic area is decreased. On the other hand, as the potential difference ΔRST is decreased, the sensor output level Vth at the inflection point of the photoelectric conversion characteristic of the image sensor 30a is decreased, namely, the ratio of the linear characteristic area in the photoelectric conversion characteristic is decreased, in other words, the ratio of the logarithmic characteristic area is increased. Thus, the output level at the inflection point of the photoelectric conversion characteristic of the image sensor 30a, namely, the position of the inflection point is controlled by controlling the potential difference ΔRST, as explained in the section referring to FIG. 11. This control corresponds to the control shown in FIG. 29, which will be described later.

The control of the potential difference ΔRST, namely, the Mid level, can be regarded as a control of changing the position of the inflection point, while keeping the gradients in the linear characteristic area and the logarithmic characteristic area unchanged, namely, a control of changing the switching point or offset from the linear characteristic to the log characteristic.

Referring back to FIG. 26A, in a state that the signal φTX is set Hi, the period from the timing when the signal φRST is changed from Hi to Mid to the timing when the signal φTX is changed from Hi to Low, and the signal φRST is changed from Mid to Low, namely, a period during which the signal φRST is set Mid, is set as a time ΔL. The time ΔL corresponds to an exposure time or an integration time of each pixel in the image sensor 30a, namely, an electric charge accumulation time, i.e., an accumulation time ΔL. Control of the duration of the time ΔL is performed by a sensor exposure time control signal generator 522a via the timing generating circuit 31a, which will be described later. Control of the magnitude of the ΔRST, namely, control of the potential level of the signal φRST from Hi to Mid is performed by a dynamic range control signal generator 521a via the timing generating circuit 31a, which will be described later.

Subsequently, the charge which has been accumulated in the FD for the charge accumulation time ΔL is held, namely, the charge accumulation is terminated with respect to all the pixels simultaneously by setting the signal φTX from Hi to Low at the timing indicated by the arrow 806, and by setting the signal φRST from Mid to Low at the timing indicated by the arrow 807.

Next, referring to FIG. 26B, after the charge accumulation with respect to all the pixels is terminated in FIG. 26A, the transistor T13 is turned on in response to setting of the signal φV for a pixel in a certain row selected by vertical scanning of a vertical scanning circuit corresponding to the vertical scanning circuit 301 shown in FIG. 7 to Hi at the timing indicated by the arrow 811. Thereby, the charge accumulated in the FD of each pixel in the selected row is read out or swept to a corresponding vertical signal line corresponding to the output signal lines 306-1, 306-2, . . . , and 306-m shown in FIG. 7. The charge readout operation at the timing indicated by the arrow 811 is started in response to termination of the charge accumulation at the timing indicated by the arrow 806 or 807 shown in FIG. 26A. The readout signal charge is transferred along the vertical signal line for temporary holding in each sample hold circuit of a selection circuit 308 corresponding to the selection circuit 308 shown in FIG. 7.

Thereafter, the signal φRST for each pixel in the selected row is changed from Low to Hi at the timing indicated by the arrow 812, and simultaneously, the signal φRSB for each pixel in the selected row is changed from Hi to Low at the timing indicated by the arrow 813 to set the potential of the FD to a state where high luminance light is allowed to be incident. Then, the signal φRSB is returned or set Hi at the timing indicated by the arrow 814 while keeping the signal φRST Hi, and the FD is reset to a value corresponding to the threshold value of the reset gate or the transistor T11. In response to setting the signal φV Hi at the timing indicated by the arrow 815 in this state, a noise signal is read out to the vertical signal line, and is held in a noise sample hold circuit provided in a correction circuit 309 corresponding to the correction circuit 309 shown in FIG. 7, which will be described later.

The signals φSHS and φSHN shown in FIG. 26B are sample hold control signals in a sample hold circuit for signal in the selection circuit 308, and in the sample hold circuit for noise in the correction circuit 309, respectively, which will be described later. As indicated by the reference numerals 816 and 817, during periods respectively indicated by the reference numerals 811 and 815 when the signal φV is set Hi, a signal i.e. an image signal, and a noise i.e. a noise signal are sample-held based on the sample hold control signals in the respective sample hold circuits of the selection circuit 308 and the correction circuit 309, as shown by "SIGNAL S/H" and "NOISE S/H" in FIG. 26B. Then, an image signal whose threshold variation of the reset gate has been removed is acquired with respect to each pixel in each row by calculating a difference between the image signal and the noise signal generated by the sample holding operations, namely, by subtracting the noise signal from the image signal. The signal φTX is constantly set Low during a horizontal blank period.

Referring back to FIG. 24, similarly to the first embodiment, an AE control parameter calculating unit 5110a in the main controller 50a of the digital camera 1a calculates a control parameter for setting the optimal exposure amount and the photoelectric conversion characteristic or the dynamic range of the image sensor 30a for an image sensing operation so as to perform exposure control i.e. AE control commensurate with a subject luminance. In the second embodiment, control parameters regarding the respective controls [A], [B], and [C] are calculated. The AE control parameter calculating unit 5110a includes an exposure amount control parameter calculator 511a comprised of an exposure time control parameter calculator 5111 and an aperture control parameter calculator 5112, and a dynamic range control parameter calculator 512a.

The exposure time control parameter calculator 5111 calculates a control parameter for optimizing the exposure time, and calculates an exposure time setting value according to a subject luminance, based on the AE evaluation values detected by an evaluation value detector 405, and photoelectric conversion characteristic information of the image sensor 30a obtained at the time of acquiring the AE evaluation values stored in a photoelectric conversion characteristic information storage 516. The exposure time setting value is a value for controlling the exposure time or the integration time of the image sensor 30a, or the opening time of a shutter 23 to set an exposure amount, based on which the photoelectric conversion characteristic is changed to obtain a predetermined sensor output corresponding to a predetermined luminance for exposure amount setting.

The aperture control parameter calculator 5112 calculates a control parameter for optimizing the aperture value. Similarly to the exposure time setting value, the aperture control parameter calculator 5112 calculates an aperture setting value according to a subject luminance based on the AE evaluation values detected by the evaluation value detector 405, and the photoelectric conversion characteristic information of the image sensor 30a obtained at the time of acquiring the AE evaluation values stored in the photoelectric conversion characteristic information storage 516. The aperture setting value is a value for controlling the aperture value, namely, the aperture area of the diaphragm 22 to set an exposure amount based on which the photoelectric conversion characteristic is changed to obtain a predetermined sensor output corresponding to a predetermined luminance for exposure amount setting.

The dynamic range control parameter calculator 512a calculates a control parameter for optimizing the photoelectric conversion characteristic, namely, the dynamic range of the image sensor 30a according to the subject luminance. The dynamic range control parameter calculator 512a calculates a photoelectric conversion characteristic setting value for controlling the position of the inflection point of the photoelectric conversion characteristic, so that the image sensor 30a acquires the photoelectric conversion characteristic i.e. the dynamic range, based on which a saturated output level corresponding to the subject luminance for dynamic range setting is obtained. The photoelectric conversion characteristic information of the image sensor 30a obtained at the time of acquiring the AE evaluation values stored in the photoelectric conversion characteristic information storage 516 is referred to in calculating the photoelectric conversion characteristic setting value.

The exposure amount control parameter, namely, the exposure time control parameter and the aperture control parameter, and the dynamic range control parameter respectively calculated by the exposure amount control parameter calculator 511a and the dynamic range control parameter calculator 512a of the main controller 50a are outputted to a control signal generating section 520a. Upon receiving the control parameters, respective elements in the control signal generating section 520a generate control signals for operating the timing generating circuit 31a and a driving section 60, which, in turn, generate drive signals for causing the relevant elements to perform actual exposure amount control operation. The control signal generating section 520a in the second embodiment is different from the control signal generating section 520 in the first embodiment in that a dynamic range control signal generator 521a and a sensor exposure time control signal generator 522a are operated to drive the image sensor 30a in the second embodiment.

Specifically, the dynamic range control signal generator 521a generates a drive signal to the timing generating circuit 31a, namely, to the image sensor 30a for controlling the output level at the inflection point at which the photoelectric conversion characteristic is switched from a linear characteristic area to a logarithmic characteristic area based on the photoelectric conversion characteristic setting value of the image sensor 30a calculated by the dynamic range control parameter calculator 512a, and sends the drive signal to the timing generating circuit 31a. As mentioned above, the inflection point is changed by controlling the photoelectric conversion characteristic of the image sensor 30a by the potential difference ΔRST of the signal φRST for the image sensor 30a between Hi and Mid. Thus, the dynamic range of the image sensor 30a is controlled in accordance with the subject luminance by controlling the drive signal to the timing generating circuit 31a so as to control the magnitude of the difference ΔRST or the Mid level of the signal φRST. The timing generating circuit 31a generates a timing signal for controlling the dynamic range of the image sensor 30a based on a drive signal corresponding to the inputted difference ΔRST to drive the image sensor 30a.

The sensor exposure time control signal generator 522a generates a drive signal to the timing generating circuit 31a for securing a necessary exposure time based on the exposure time setting value calculated by the exposure time control parameter calculator 511, and sends the drive signal to the timing generating circuit 31a. As mentioned above, the drive signal is a control signal for optimizing the accumulation time ΔL, with which the signal φRST for the image sensor 30a is set to the middle potential Mid based on the exposure time setting value. The timing generating circuit 31a generates a timing signal for controlling the exposure time of the image sensor 30a based on the drive signal corresponding to the inputted accumulation time ΔL in a similar manner as mentioned above, and drives the image sensor 30a.

The aperture setting value calculated by the aperture control parameter calculator 5112 is outputted to the aperture control signal generator 525, which, in turn, generates a drive signal to the driving section 60 for setting the aperture area of the diaphragm 22 based on the aperture setting value, and sends the drive signal to the driving section 60. Similarly to the aperture control signal generator 525, the shutter control signal generator 523 generates a control signal for setting the shutter speed of the shutter 23 in accordance with the exposure time based on the exposure time setting value calculated by the exposure time control parameter calculator 5111, and sends the control signal to the driving section 60.

Figure 27:
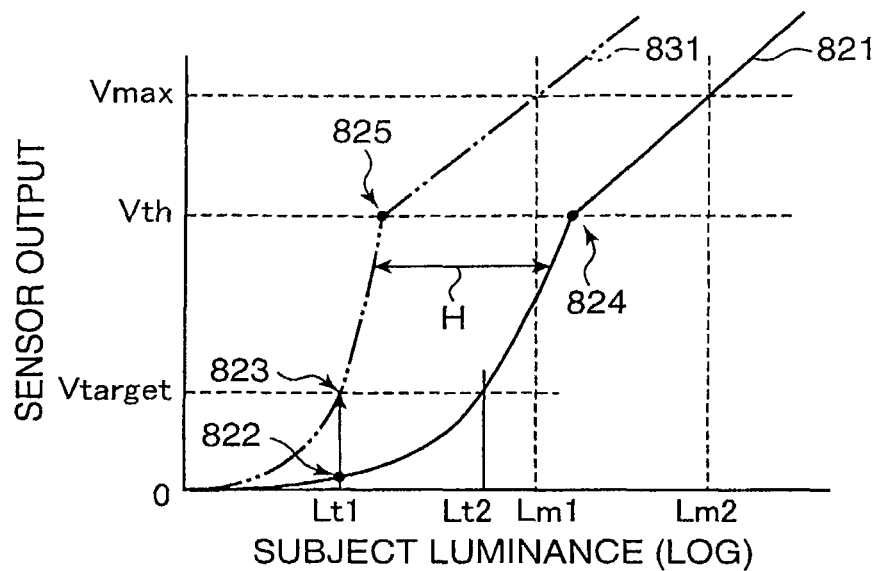
FIG. 27 is a graph showing how the photoelectric conversion characteristic of the image sensor is changed in performing aperture-control-based exposure amount control [A].
Figure 28:
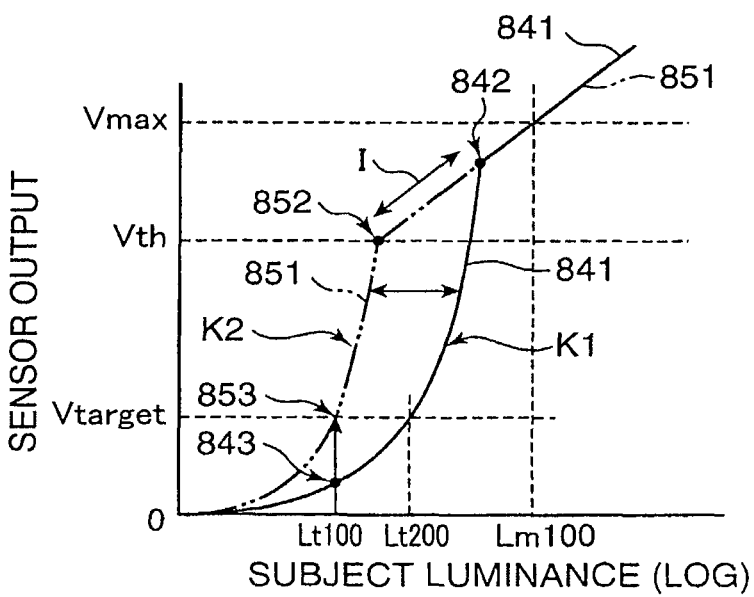
FIG. 28 is a graph showing how the photoelectric conversion characteristic of the image sensor is changed in performing exposure-time-control-based exposure amount control [C].
Figure 29:
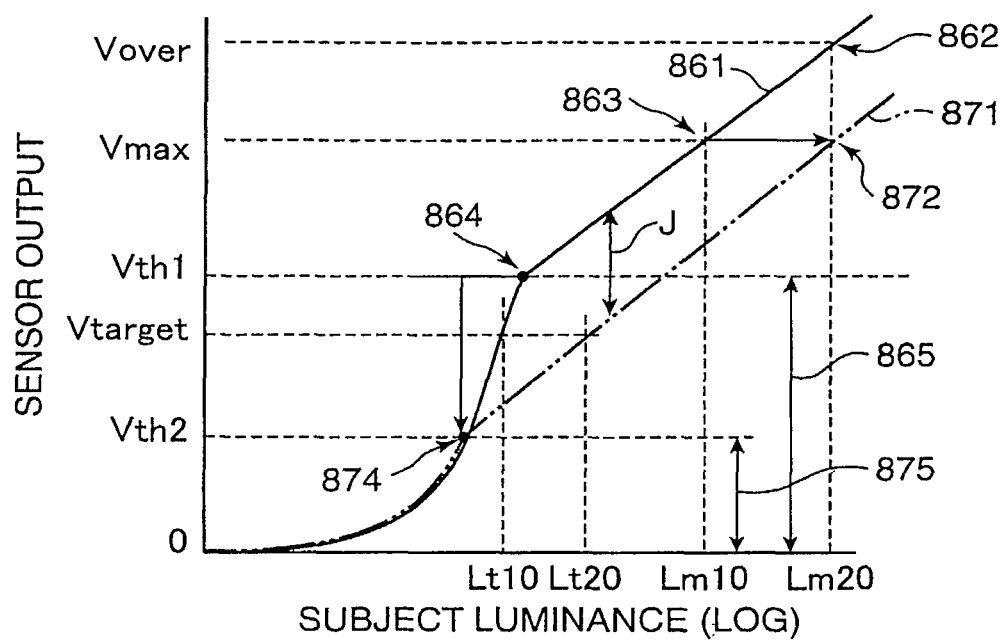
FIG. 29 is a graph showing how the photoelectric conversion characteristic of the image sensor is changed in performing photoelectric-conversion-characteristic-control-based dynamic range control [B].

Next, the aperture-control-based exposure amount control [A], the photoelectric-conversion-characteristic-based dynamic range control [B], and the exposure-time-controlbased exposure amount control [C] in the AE control according to the second embodiment are described referring to FIGS. 27 through 29.

FIG. 27 is a graph showing how the photoelectric conversion characteristic of the image sensor 30a is changed in case of performing the control [A]. Unlike the first embodiment in which the axes of abscissas in the photoelectric conversion characteristic graphs (see FIGS. 18A and 18B) represent "incident luminance to the image sensor", the axis of abscissas in FIG. 27 represents "subject luminance". This is the same for the graphs shown in FIGS. 28 and 29. In the second embodiment, the luminance in the axis of abscissas is a subject luminance itself, namely, an absolute luminance, in place of a sensor input luminance obtained as a result of exposure of the image sensor to a subject light image for a certain time, namely, an integration time or a shutter opening time, which includes a time factor. The axis of ordinate in the second embodiment represents a sensor output, as in the case of the first embodiment.

As shown in FIG. 27, the entirety of the photoelectric conversion characteristic of the image sensor 30a is changed or shifted in one of the directions shown by the arrows H by controlling the aperture value, namely, the aperture area of the diaphragm 22. In this case, the photoelectric conversion characteristic is shifted in the leftward direction of the arrows H from a photoelectric conversion characteristic 821 to a photoelectric conversion characteristic 831 by increasing the aperture area of the diaphragm 22. On the other hand, the photoelectric conversion characteristic is shifted in the rightward direction of the arrows H by decreasing the aperture area of the diaphragm 22. Specifically, similarly to the controls shown in FIGS. 18A and 18B in the first embodiment, for instance, calculated is the photoelectric conversion characteristic 831 in such a manner that the sensor output corresponding to a predetermined luminance Lt1 for exposure amount setting in the linear characteristic area of the photoelectric conversion characteristic 821 becomes a target output Vtarget, namely, the sensor output level corresponding to the luminance Lt1 is increased from the point 822 to the point 823. In this case, the inflection point 824 is shifted in parallel to the inflection point 825, and the sensor output Vth does not change. In other words, the photoelectric conversion characteristic is changed in such a manner that the subject luminance for obtaining the target output Vtarget is changed or lowered from Lt2 to Lt1. It is possible to change the sensor output obtained in relation to a subject luminance as an absolute luminance by changing the aperture area of the diaphragm 22 independently of the exposure time, i.e., free of the exposure time, by handling the subject luminance as mentioned above. Thus, the AE control can be performed in such a manner as to change the entirety of the photoelectric conversion characteristic, as shown in FIG. 27.

The aperture area of the diaphragm 22 necessary for changing the photoelectric conversion characteristic in such a manner that the sensor output corresponding to the luminance Lt1 for exposure amount setting becomes Vtarget is calculated as in the case of the first embodiment. Specifically, as explained in the section referring to FIGS. 20 and 22, an exposure amount gain (Gain) is calculated by implementing the equation: Gain=Vtarget/VtAve, an exposure time gain Gt and an aperture gain Gs are calculated based on the Gain by implementing the equation: Gain=Gt·Gs according to the flowchart shown in FIG. 21, and an exposure time T2 and an aperture area S2 are calculated based on the exposure time gain Gt and the aperture gain Gs. The aperture area S2 obtained by the calculation corresponds to the aperture area used in the exposure amount control in FIG. 27, and the setting value for obtaining the aperture area corresponds to the aperture setting value.

The aperture control parameter calculator 5112 in the calculating section 510a calculates the aperture area of the diaphragm 22. The exposure time is automatically calculated in the course of calculating the aperture area. Alternatively, the exposure time control parameter calculator 5111 may perform interim computation, namely, calculation of the exposure time gain Gt and the aperture gain Gs in the course of calculating the aperture area, and then, the aperture control parameter calculator 5112 may calculate the aperture area based on the calculated aperture gain Gs.

Similarly to the first embodiment, it is possible to obtain a main subject luminance and a peripheral subject luminance by implementing multi-pattern metering by a multi-pattern metering section 4051 to obtain information such as a luminance histogram, and a maximum/minimum luminance by a histogram calculator 4052 and a maximum/minimum luminance calculator 4054, respectively, and to calculate luminance information such as the luminance Lt1 to be used in the above calculation based on the information. The same operation is performed in the controls [B] and [C] as in the control [A].

FIG. 28 is a graph showing how the photoelectric conversion characteristic of the image sensor 30a is changed in case of performing the control [C]. In the first embodiment, the linear characteristic area and the logarithmic characteristic area, namely, the entirety of the photoelectric conversion characteristic is changed by controlling the exposure time (see FIG. 18A). In the second embodiment, the sensor output obtained by the log conversion with respect to the subject luminance does not change even if the exposure time or the integration time is changed in light of the property of the image sensor 30a. Namely, there is no time factor regarding the exposure time in the logarithmic characteristic area in the second embodiment. Accordingly, in the second embodiment, the gradient of the linear characteristic area is changed without changing the logarithmic characteristic area, namely, without changing the position and the gradient of the logarithmic characteristic area, by changing the exposure time.

Referring to FIG. 28, the gradient K1 in the linear characteristic area of a photoelectric conversion characteristic 841 shown by the solid line is changed to the gradient K2 in the linear characteristic area of a photoelectric conversion characteristic 851 shown by the two-dotted-chain line by changing the exposure time, and vice versa. In this case, the linear characteristic area in the photoelectric conversion characteristic is moved leftward, namely, the gradient of the linear characteristic area is shifted from K1 to K2 by increasing the exposure time. On the other hand, the linear characteristic area of the photoelectric conversion characteristic is moved rightward by decreasing the exposure time. In this way, the gradient of the linear characteristic area is changed, but the logarithmic characteristic area is unchanged. Accordingly, the photoelectric conversion characteristic is shifted from the photoelectric conversion characteristic 841 to the photoelectric conversion characteristic 851 in such a manner that the position of the inflection point of the linear characteristic area and the logarithmic characteristic area is apparently shifted from the inflection point 842 to the inflection point 852, for instance, in the obliquely downward direction corresponding to one of the arrows I along the gradient of the logarithmic characteristic area. The ratio of the linear characteristic area to the logarithmic characteristic area in the photoelectric conversion characteristic is changed by changing the gradient of the linear characteristic area, namely, by apparently shifting the position of the inflection point.

Specifically, for instance, the sensor output corresponding to the luminance Lt100 is increased from the sensor output level at the point 843 in the photoelectric conversion characteristic 841 to the sensor output level Vtarget at the point 853 in the photoelectric conversion characteristic 851 by controlling the exposure time. The sensor output is increased according to increase of the exposure time, even if the subject luminance is the same. In other words, the photoelectric conversion characteristic is changed in such a manner that the subject luminance for obtaining the target output Vtarget is changed or lowered from the luminance Lt200 in the photoelectric conversion characteristic 841 to the luminance Lt100 in the photoelectric conversion characteristic 851.

The exposure time control is performed by control of the integration time, namely, the accumulation time $\Delta L$ of the image sensor 30$a$ and/or the opening time i.e. the shutter speed of the shutter 23. The integration time of the image sensor 30$a$ or the opening time of the shutter 23 necessary for changing the photoelectric conversion characteristic such that the sensor output corresponding to the luminance Lt100 for exposure amount setting becomes the target output Vtarget is calculated as in the case of the control [A]. Specifically, an exposure amount gain (Gain) is calculated by implementing the equation: Gain=Vtarget/VtAve, an exposure time gain Gt and an aperture gain Gs are calculated based on the Gain by implementing the equation: Gain=Gt·Gs, and an exposure time T2 and an aperture area S2 are calculated based on the exposure time gain Gt and the aperture gain Gs. The exposure time T2 obtained by the calculation corresponds to the exposure time to be used in the exposure amount control in FIG. 28, and the setting value for obtaining the exposure time corresponds to the exposure time setting value.

The exposure time control parameter calculator 5111 calculates the exposure time setting value. The aperture area is automatically calculated in the course of calculating the exposure time setting value. Alternatively, the aperture control parameter calculator 5112 may perform interim computation, namely, calculation of the exposure time gain Gt and the aperture gain Gs in the course of calculating the exposure time, and then, the exposure time control parameter calculator 5111 may calculate the exposure time based on the calculated exposure time gain Gt.

In this way, it is possible to change the linear characteristic area while keeping the dynamic range unchanged, namely, without changing the subject luminance Lm100 corresponding to the sensor output saturation level Vmax in FIG. 28, by performing exposure amount control based on which the linear characteristic area is changed while keeping the logarithmic characteristic area unchanged through control of the exposure time.

In other words, the control [C] makes it possible to implement the following control. For instance, if a user wishes to increase the exposure amount in the entirety of a subject image, namely, to obtain a bright image from an image captured in a dark place, the control [A] is performed (see FIG. 27), wherein the entirety of the photoelectric conversion characteristic is changed to increase the dynamic range. Further, for instance, if the user wishes to control the exposure amount such as contrast or brightness in an image area of a low luminance, although a satisfactory dynamic range is secured, the control [C] is executed. In this way, the arrangement provides high latitude in selecting the exposure amount controlling method, and consequently, enables to perform the AE control with high precision. Alternatively, the digital camera 1$a$ may have an arrangement of performing the control [A], or an arrangement of performing the control [C], in other words, the exposure amount control may be performed by either one of the aperture control and the exposure time control.

FIG. 29 is a graph showing how the photoelectric conversion characteristic of the image sensor 30$a$ is changed in case of performing the control [B]. In this control, the dynamic range is controlled by controlling the photoelectric conversion characteristic, namely, the sensor output Vth at the inflection point. Specifically, as in the case of the first embodiment shown in FIG. 19, the position of the inflection point is shifted, for example, from the inflection point 864 corresponding to the sensor output Vth1 to the inflection point corresponding to the sensor output Vth to decrease the sensor output corresponding to the subject luminance Lm20 for dynamic range setting from the sensor output Vover at the point 862 in a photoelectric conversion characteristic 861 to the sensor output Vmax i.e. the saturated output level of the image sensor 30$a$ at the point 872 in a photoelectric conversion characteristic 871, in other words, to increase the maximum luminance capable of obtaining the sensor output Vmax from the luminance Lm10 at the point 863 to the luminance Lm20 at the point 872, namely, to increase the dynamic range. In this case, the logarithmic characteristic area is shifted in parallel to the area before the shifting in one of the directions indicated by the arrows J, namely, in the sensor output axis direction in a state that the gradient does not change by changing the inflection point.

In this way, the photoelectric conversion characteristic setting value regarding control of the position of the inflection point for dynamic range control is calculated by the dynamic range control parameter calculator 512$a$. A process for calculating the photoelectric conversion characteristic setting value is the same as described referring to FIG. 23 in the first embodiment. Specifically, an inflection point e.g. the inflection point 874 in FIG. 29 corresponding to Vth2 of the photoelectric conversion characteristic after shifting is calculated to secure a necessary dynamic range by modeling the linear characteristic area and the logarithmic characteristic area of the photoelectric conversion characteristic, and a control value for changing the photoelectric conversion characteristic, based on which the inflection point e.g. the inflection point 864 corresponding to Vth1 of the photoelectric conversion characteristic before shifting becomes the inflection point after the shifting is calculated as the photoelectric conversion characteristic setting value.

The dynamic range control signal generator 521$a$ generates a control signal for changing the output level Vth at the inflection point based on the calculated photoelectric conversion characteristic setting value, namely, a signal for controlling the difference $\Delta$RST i.e. the Mid level of the signal $\phi$RST. The output level at the inflection point in the photoelectric conversion characteristic of the image sensor 30$a$ is controlled by controlling the difference $\Delta$RST. Referring to FIG. 29, if the output level at the inflection point 864 in the photoelectric conversion characteristic 861 is shifted to the sensor output 865 by the difference $\Delta$RST, the sensor output is decreased from the sensor output 865 to the sensor output 875 by decreasing the difference $\Delta$RST, for instance. As a result, the position of the inflection point is shifted to the inflection point 874 in the photoelectric conversion characteristic 871. Conversely, the inflection point is shifted from the inflection point 874 to the inflection point 864 by increasing the difference $\Delta$RST. In this way, the control [B] is realized by control of the difference $\Delta$RST.

Similarly to the first embodiment, in the second embodiment, it is possible to implement control of the photoelectric conversion characteristic i.e. the position of the inflection point based on the photoelectric conversion characteristic setting value if a saturation judging section 4055 (see FIG. 14) judges that the output level of the image sensor 30a is not saturated, and to lower the output level at the inflection point by the changed amount $\Delta$Vth based on the saturated pixel number if the saturation judging section 4055 judges that the output level of the image sensor 30a is saturated (see FIG. 23A). Specifically, it is possible to change the photoelectric conversion characteristic in such a manner as to increase the dynamic range, so that an image is captured at a higher luminance side.

In the AE control by the respective controls [A], [B], and [C] in the second embodiment, similarly to the first embodiment, the AE control is performed to obtain the sensor output corresponding to a predetermined subject luminance for exposure setting from the linear characteristic area of the image sensor, namely, to sense the subject luminance for exposure setting in the linear characteristic area. In case of the control [A], if the subject luminance for exposure setting i.e. for the exposure amount setting is Lt1, for instance in FIG. 27, the control [A] is performed to obtain the photoelectric conversion characteristic 831, so that the target output Vtarget corresponding to the luminance Lt1 is obtained from the linear characteristic area.

In the above case, similarly to the first embodiment, if the sensor output corresponding to the luminance Lt1 is located in the logarithmic characteristic area before the control [A] is performed, namely, in FIG. 27, if the sensor output corresponding to the luminance Lt1 is located in the logarithmic characteristic area of the photoelectric conversion characteristic 831, exposure amount control i.e. aperture control of decreasing the aperture value, namely, decreasing the aperture area is conducted to obtain the photoelectric conversion characteristic, so that the sensor output corresponding to the luminance Lt1 is located in the linear characteristic area, namely, the entirety of the photoelectric conversion characteristic 831 is shifted in the rightward direction of the arrows H.

Exposure amount control of increasing the aperture area is performed to obtain the photoelectric conversion characteristic, so that the sensor output is located in a relatively high output level area e.g. at the point 823, namely, the photoelectric conversion characteristic is shifted from the photoelectric conversion characteristic 821 to the photoelectric conversion characteristic 831, if the sensor output corresponding to the luminance Lt1 is located in a relatively low output level area, e.g., the sensor output corresponding to the luminance Lt1 is located at such a low level as the point 822 in the linear characteristic area. In this way, the control [A] is performed in such a manner that the output of the image sensor 30a corresponding to the subject luminance for exposure setting is located in a relatively high output level area in the linear characteristic area. This arrangement enables to increase the contrast even from a low luminance subject image. The control of changing the photoelectric conversion characteristic, so that the target output Vtarget is located in the linear characteristic area, is executed by the aperture control parameter calculator 5112 based on the aperture setting value.

In the control [C], referring to FIG. 28, if the subject luminance for exposure setting i.e. for exposure amount setting is Lt100, for instance, exposure amount control by exposure time control, namely, control of the integration time or control of the shutter opening time is performed to obtain the photoelectric conversion characteristic 851, so that the target output Vtarget corresponding the luminance Lt100 is located in the linear characteristic area. In this case, similarly to the control [A], if the sensor output corresponding to the luminance Lt100 is obtained from the logarithmic characteristic area e.g. the sensor output corresponding to the luminance Lt100 is located in the logarithmic characteristic area of the photoelectric conversion characteristic 851, exposure amount control, namely, exposure time control to shorten the exposure time is performed to locate the sensor output corresponding to the luminance Lt100 in the linear characteristic area, namely, to shift the linear characteristic area rightward by changing the gradient of the linear characteristic area from K2 to K1, for instance. Further, if the sensor output corresponding to the luminance Lt1 is located in a relatively low output level area of the linear characteristic area, for instance, if the sensor output corresponding to the luminance Lt100 is as low as the point 843 in the linear characteristic area, exposure amount control of increasing the exposure time is performed to change the photoelectric conversion characteristic, so that the sensor output is located in a relatively high output level area e.g. at the point 853, namely, the photoelectric conversion characteristic is changed from the photoelectric conversion characteristic 821 to the photoelectric conversion characteristic 831, namely, to change the gradient of the linear characteristic area from K1 to K2. In this way, the control [C] is performed in such a manner that a sensor output corresponding to the subject luminance for exposure setting is located in a relatively high output level area in the linear characteristic area. This arrangement enables to increase the contrast even from a low luminance subject image. The control of changing the photoelectric conversion characteristic, so that the target output Vtarget is located in the linear characteristic area is executed by the exposure time control parameter calculator 5111 based on the exposure time setting value.

In the control [B], referring to FIG. 29, for instance, if the subject luminance for exposure setting i.e. for dynamic range setting is Lt10, dynamic range control, namely, photoelectric conversion characteristic control of obtaining the photoelectric conversion characteristic is performed, so that the target output Vtarget corresponding to the luminance Lt10 is located in the linear characteristic area. In this case, the photoelectric conversion characteristic is changed from the photoelectric conversion characteristic 871 to the photoelectric conversion characteristic 861. Specifically, control of changing the position of the inflection point from the inflection point 874 to the inflection point 864, namely, control of setting the inflection point to a high output level of the image sensor is performed. The control of changing the photoelectric conversion characteristic, so that the target output Vtarget is located in the linear characteristic area, is executed by the dynamic range control parameter calculator 512a based on the photoelectric conversion characteristic setting value.

In the AE control parameter calculating step in each of the controls [A], [B], and [C], the photoelectric conversion characteristic is not changed or shifted if the photoelectric conversion characteristic obtained at the time of acquiring the AE evaluation values has a feature that the target output Vtarget can be already obtained in relation to the luminance for exposure amount setting as described above. However, in such a case, even if the aperture setting value, the exposure time setting value, or the photoelectric conversion characteristic setting value takes the same value as the corresponding value when the AE evaluation values were obtained last time, the aperture setting value, the exposure time setting value, or the photoelectric conversion characteristic setting value may be calculated this time.

In this way, implementing the AE control in such a manner that the controls [A], [B], and [C] are executable independently of each other, namely, the aperture-control-based exposure amount control [A] and/or the exposure-time-control-based exposure amount control [C], and/or the photoelectric conversion characteristic-control-based dynamic range control [B] are executable, enables to sense a luminance of a main subject image for exposure setting i.e. exposure amount setting in the linear characteristic area of the photoelectric conversion characteristic, while securing a predetermined sensor output level. Alternatively, the AE control may be performed by using one of the controls [A], [B], and [C], namely, by singly performing the control [A], [B], or [C], or by combined control of these controls [A], [B], and [C] to sense a luminance for exposure setting in the linear characteristic area. For instance, the dynamic range control [B] may be performed in addition to the aperture-control-based exposure time control [A] and/or the exposure-time-control-based exposure time control [C]. The above arrangements enable to achieve AE control having high latitude by independent control of the control [A] and/or the control [C], and/or the control [B], and to achieve efficient AE control depending on the combination of these three controls [A], [B] and [C].

In the foregoing, the preferred embodiments of the invention have been fully described. The invention is not limited to the above. For instance, the following modifications (I) through (VII) are applicable.

(I) In the first embodiment, the p-channel MOSFET is used in each of the pixels of the image sensor 30. Alternatively, an n-channel MOSFET may be used. In the second embodiment, the n-channel MOSFET is used in each of the pixels of the image sensor 30a. Alternatively, a p-channel MOSFET may be used.

(II) As far as an image sensor can implement the operations as shown in the image sensors according to the first and second embodiments, any image sensor may be used. For instance, in the first embodiment, the entirety of the photoelectric conversion characteristic is changed in relation to the aperture control and the exposure time control, as the exposure amount control. In the second embodiment, although the entirety of the photoelectric conversion characteristic is changed in relation to the aperture control, observing the exposure time control, the linear characteristic area has an integration effect, and the photoelectric conversion characteristic in the linear characteristic area is changed in relation to the exposure time, but the logarithmic characteristic area does not have an integration effect, and the photoelectric conversion characteristic in the logarithmic characteristic area is not changed irrespective of change of the exposure time. In both of the first and second embodiments, however, dynamic range control based on control of the position of the inflection point is performed.

(III) In the first or the second embodiment, the subject luminance is detected by the image sensor 30 or by the image sensor 30a. Alternatively, the subject luminance i.e. the AE evaluation values may be detected with use of a metering device which is provided independently of the image sensor 30 or the image sensor 30a, such as a device for metering the subject luminance according to multi-pattern metering with use of plural light receiving elements. However, it is desirable to detect the subject luminance or the AE evaluation values based on an image signal obtained from an image actually captured by the image sensor 30 or by the image sensor 30a in light of simplifying the mechanism of the image sensing apparatus.

(IV) The first (second) embodiment is constructed such that the image sensing apparatus comprises the shutter 23 and the image sensor 30 (image sensor 30a) to control the exposure time. Alternatively, it is possible to provide either one of the shutter 23 and the image sensor 30 (image sensor 30a) to control the exposure time.

(V) In the first embodiment, the setting values for the image sensor 30, the shutter 23, and the diaphragm 22, which are obtained by data conversion with respect to the exposure time T2 and the aperture area S2 with use of the lookup tables, are set as the exposure time setting value and the aperture setting value, respectively. Alternatively, it is possible to set the exposure time gain Gt and the aperture gain Gs, or the exposure time T2 and the aperture area S2, as the exposure time setting value and the aperture setting value, respectively. Likewise, the output level Vth2 or the changed amount ΔVth at the inflection point may be set as the photoelectric conversion characteristic setting value. Similarly to the first embodiment, in the second embodiment, it is possible to set the exposure time gain Gt and the aperture gain Gs as the exposure time setting value and the aperture setting value, respectively, and to set the output level at the inflection point as the photoelectric conversion characteristic setting value.

(VI) In the first and second embodiments, RGB data is used as image data for calculating evaluation values. Alternatively, it is possible to use image data other than the RGB data, such as complementary color image data and monochromatic image data.

(VII) Dividing the image sensing area 330, namely area dividing may be performed e.g. by a spot metering system or by a partial metering system using a central part, in place of the multi-pattern metering. Further alternatively, the block arrangement concerning the image sensing area 330 comprised of the main subject image area 331 and the peripheral subject image area 332 may be other than the arrangement as shown in FIG. 15. Further, in the first and second embodiments, the evaluation value is calculated with respect to each of the blocks. Alternatively, it is possible to calculate evaluation values in each of two blocks of the image sensing area 330 consisting of the main subject image area 331 and the peripheral subject image area 332. Further alternatively, it is possible to divide the image sensing area 330 into three or more blocks, in place of dividing the image sensing area 330 into the main subject image area 331 and the peripheral subject image area 332, to calculate evaluation values based on luminance information in each of the blocks, and to perform AE control based on the evaluation values. As a further altered form, it is possible to calculate a single evaluation value in the image sensing area 330 without dividing the image sensing area 330 into blocks, and to perform AE control based on the single evaluation value. Further alternatively, it is possible to arbitrarily set the blocks in the image sensing area 330 as mentioned above in response to user's manipulation/instruction.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. An image sensing apparatus comprising:
   an image sensor which generates an electrical signal commensurate with an amount of incident light, and has a photoelectric conversion characteristic comprised of a linear characteristic area, where the electrical signal is outputted after being linearly converted in relation to the amount of incident light, and a logarithmic characteris- tic area, where the electrical signal is outputted after being logarithmically converted in relation to the amount of incident light;

an exposure evaluation value detector configured to detect an exposure evaluation value based on luminance information acquired from a subject in sensing an image of the subject; and an exposure controller configured to acquire a setting value for exposure based on the exposure evaluation value detected by the exposure evaluation value detector to control exposure of the image sensing apparatus, wherein the exposure controller is configured to determine a subject luminance for exposure setting based on the exposure evaluation value, and is configured to control the exposure such that an output of the image sensor corresponding to the subject luminance for exposure setting is obtained from the linear characteristic area of the photoelectric conversion characteristic of the image sensor;

the exposure controller including:

an exposure amount controller configured to control an exposure amount; and a dynamic range controller configured to control the photoelectric conversion characteristic of the image sensor, wherein the dynamic range controller preferentially controls the photoelectric conversion characteristic;

wherein if the subject luminance for exposure setting is lower than a predetermined value, the exposure amount controller controls the exposure amount in combination with the control of the photoelectric conversion characteristic by the dynamic range controller.

2. The image sensing apparatus according to claim 1, wherein the exposure evaluation value is detected, by the exposure evaluation value detector, each from a main subject image area, and a peripheral subject image area of an image sensing area of the image sensor, the image sensing area being comprised at least of the main subject image area, and the peripheral subject image area located in a periphery of the main subject image area, and the subject luminance for exposure setting is selected from the exposure evaluation value detected in the main subject image area.

3. The image sensing apparatus according to claim 1, wherein the exposure controller includes a photoelectric conversion characteristic information storage which stores the photoelectric conversion characteristic of the image sensor acquired at the time of detecting the exposure evaluation value by the exposure evaluation value detector.

4. The image sensing apparatus according to claim 1, wherein the exposure amount controller includes a photoelectric conversion characteristic information storage which stores the photoelectric conversion characteristic of the image sensor acquired at the time of detecting the exposure evaluation value detected by the exposure evaluation value detector, and an exposure amount control parameter calculator which calculates a control parameter for optimizing the exposure amount, and the exposure amount control parameter calculator calculates an exposure amount control parameter based on the exposure evaluation value detected by the exposure evaluation value detector, and the photoelectric conversion characteristic stored in the photoelectric conversion characteristic information storage.

5. The image sensing apparatus according to claim 1, wherein the exposure amount is controlled in such a manner that the output of the image sensor corresponding to the subject luminance for exposure setting is outputted from a relatively high output level area in the linear characteristic area.

6. The image sensing apparatus according to claim 1, wherein the dynamic range controller includes a photoelectric conversion characteristic information storage which stores the photoelectric conversion characteristic of the image sensor acquired at the time of detecting the exposure evaluation value by the exposure evaluation value detector, and a dynamic range control parameter calculator which calculates a control parameter for optimizing the photoelectric conversion characteristic of the image sensor according to the subject luminance, and the dynamic range control parameter calculator calculates a dynamic range control parameter based on the exposure evaluation value detected by the exposure evaluation value detector, and the photoelectric conversion characteristic stored in the photoelectric conversion characteristic information storage.

7. The image sensing apparatus according to claim 1, wherein the image sensor is configured in such a manner as to execute photoelectric conversion in the logarithmic characteristic area independently of an exposure time, the image sensing apparatus further comprises a diaphragm, the exposure amount controller includes an aperture controller which controls the exposure amount based on an aperture setting value relating to control of an aperture area of the diaphragm, and/or an exposure time controller which controls the exposure amount based on an exposure time setting value relating to control of the exposure time to the image sensor, and the exposure amount controller controls the exposure amount by the aperture controller and/or the exposure time controller in such a manner that the output of the image sensor corresponding to the subject luminance for exposure setting is obtained from the linear characteristic area of the image sensor, the aperture controller and the exposure time controller being configured to control the exposure amount independently of each other.

8. The image sensing apparatus according to claim 7, wherein the exposure amount is controlled in such a manner that the output of the image sensor corresponding to the subject luminance for exposure setting is obtained from a relatively high output level area in the linear characteristic area of the image sensor.

9. An image sensing apparatus comprising:

an image sensor which generates an electrical signal commensurate with an amount of incident light, and has a photoelectric conversion characteristic comprised of a linear characteristic area, where the electrical signal is outputted after being linearly converted in relation to the amount of incident light, and a logarithmic characteristic area, where the electrical signal is outputted after being logarithmically converted in relation to the amount of incident light;

an exposure evaluation value detector configured to detect an exposure evaluation value based on luminance information acquired from a subject in sensing an image of the subject; and an exposure controller configured to acquire a setting value for exposure based on the exposure evaluation value detected by the exposure evaluation value detector to control exposure of the image sensing apparatus, the exposure controller including an exposure amount controller configured to control an exposure amount and a dynamic range controller configured to control the photoelectric conversion characteristic of the image sensor, wherein the exposure controller is configured to determine a subject luminance for exposure setting based on the exposure evaluation value, and is configured to control the exposure by using at least one of the exposure amount controller and the dynamic range controller such that an output of the image sensor corresponding to the subject luminance for exposure setting is obtained from the linear characteristic area of the photoelectric conversion characteristic of the image sensor, wherein the exposure evaluation value is detected, by the exposure evaluation value detector, each from a main subject image area, and a peripheral subject image area of an image sensing area of the image sensor, wherein the subject luminance for exposure setting is selected from the exposure evaluation value detected in the main subject image area; and wherein if the subject luminance for exposure setting is lower than a predetermined value, the exposure amount controller controls the exposure amount in combination with the control of the photoelectric conversion characteristic by the dynamic range controller.

10. An image sensing apparatus comprising:

an image sensor which generates an electrical signal commensurate with an amount of incident light, and has a photoelectric conversion characteristic comprised of a linear characteristic area, where the electrical signal is outputted after being linearly converted in relation to the amount of incident light, and a logarithmic characteristic area, where the electrical signal is outputted after being logarithmically converted in relation to the amount of incident light;

an exposure evaluation value detector configured to detect an exposure evaluation value based on luminance information acquired from a subject in sensing an image of the subject; and an exposure controller configured to acquire a setting value for exposure based on the exposure evaluation value detected by the exposure evaluation value detector to control exposure of the image sensing apparatus, the exposure controller including an exposure amount controller configured to control an exposure amount and a dynamic range controller configured to control the photoelectric conversion characteristic of the image sensor, wherein the exposure controller is configured to determine a subject luminance for exposure setting based on the exposure evaluation value, and is configured to control the exposure by using at least one of the exposure amount controller and the dynamic range controller such that an output of the image sensor corresponding to the subject luminance for exposure setting is obtained from the linear characteristic area of the photoelectric conversion characteristic of the image sensor, wherein the exposure controller further includes a photoelectric conversion characteristic information storage configured to store the photoelectric conversion characteristic of the image sensor acquired at the time of detecting the exposure evaluation value by the exposure evaluation value detector; and wherein if the subject luminance for exposure setting is lower than a predetermined value, the exposure amount controller controls the exposure amount in combination with the control of the photoelectric conversion characteristic by the dynamic range controller.

11. The image sensing apparatus according to claim 10, wherein the exposure amount controller includes an exposure amount control parameter calculator which calculates a control parameter for optimizing the exposure amount, and the exposure amount control parameter calculator calculates an exposure amount control parameter based on the exposure evaluation value detected by the exposure evaluation value detector, and the photoelectric conversion characteristic stored in the photoelectric conversion characteristic information storage.

12. The image sensing apparatus according to claim 10, wherein the dynamic range controller includes a dynamic range control parameter calculator which calculates a control parameter for optimizing the photoelectric conversion characteristic of the image sensor according to the subject luminance, and the dynamic range control parameter calculator calculates a dynamic range control parameter based on the exposure evaluation value detected by the exposure evaluation value detector, and the photoelectric conversion characteristic stored in the photoelectric conversion characteristic information storage.

* * * * *